INVENTORS
WARREN J. SCHIESER
JOHN P. CONNERS

BY- MAHONEY, MILLER & RAMBO
BY
ATTORNEYS

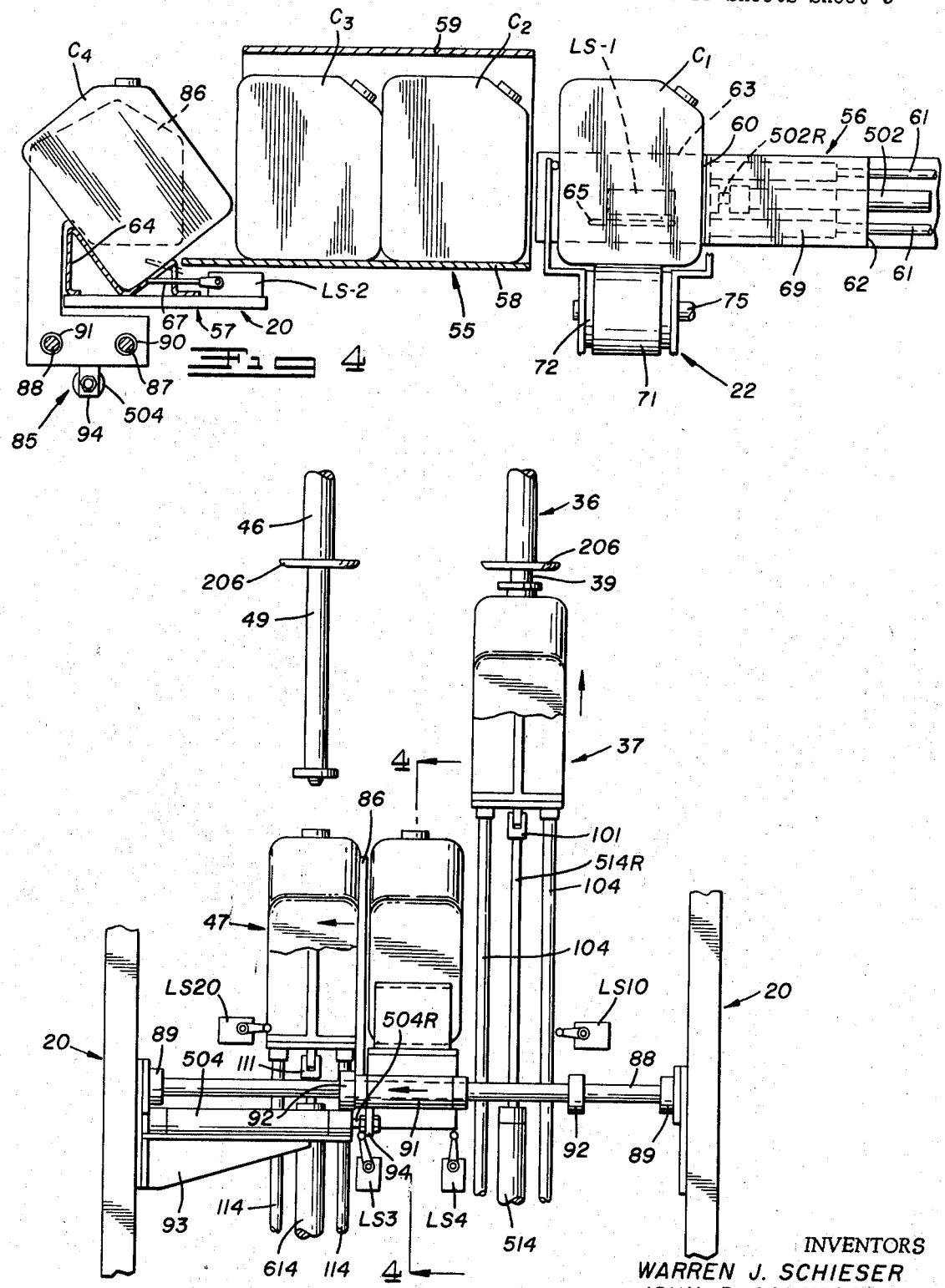

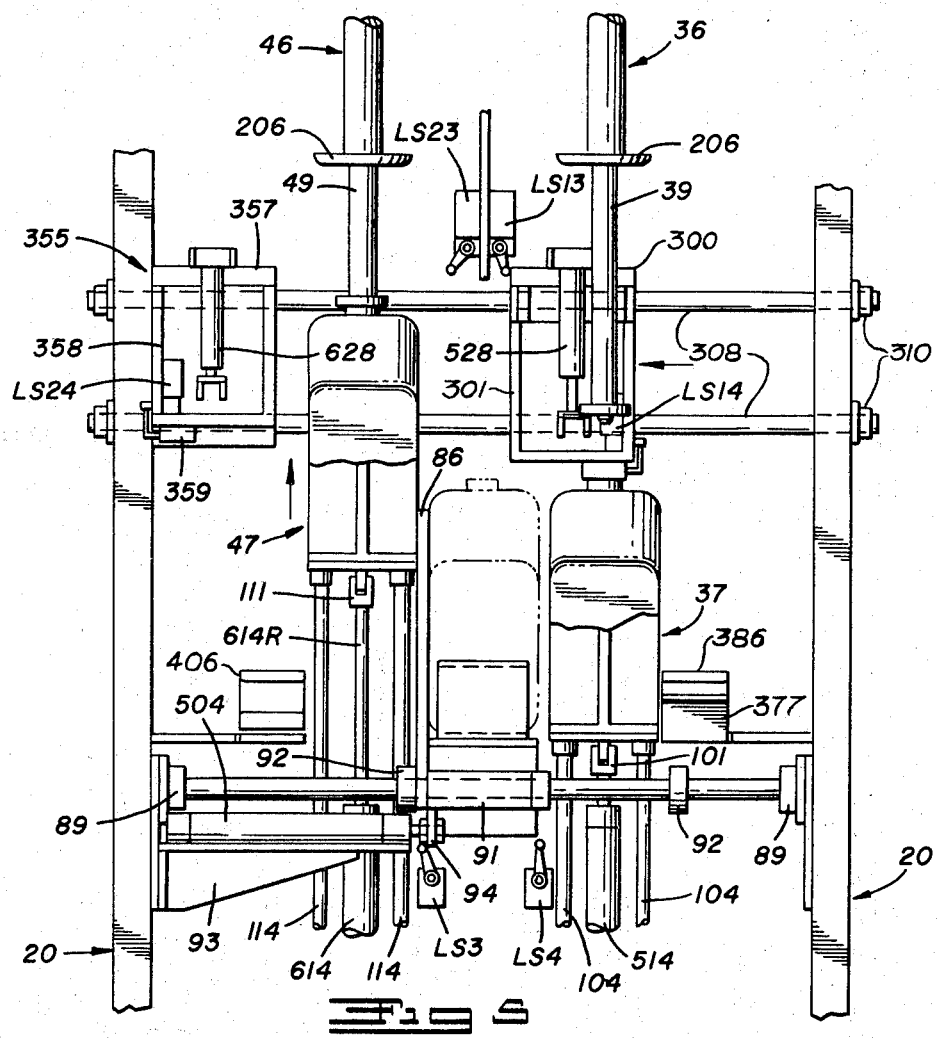
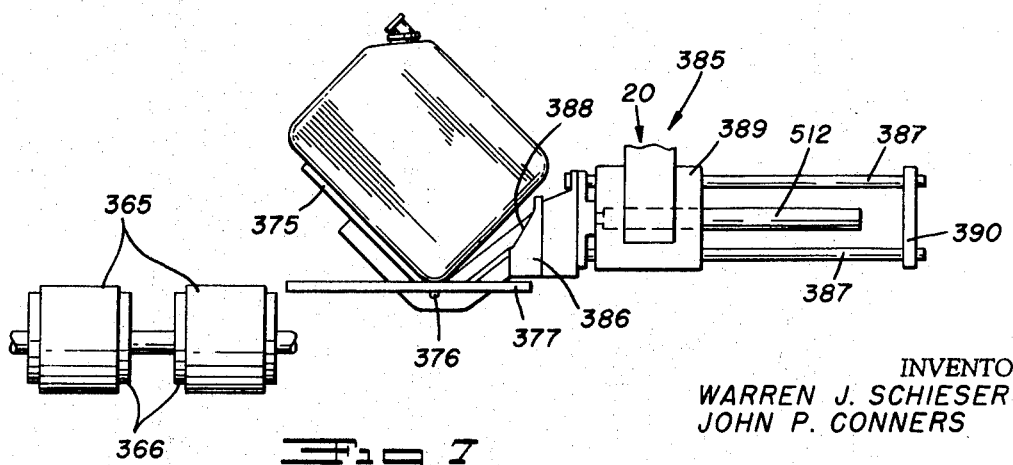

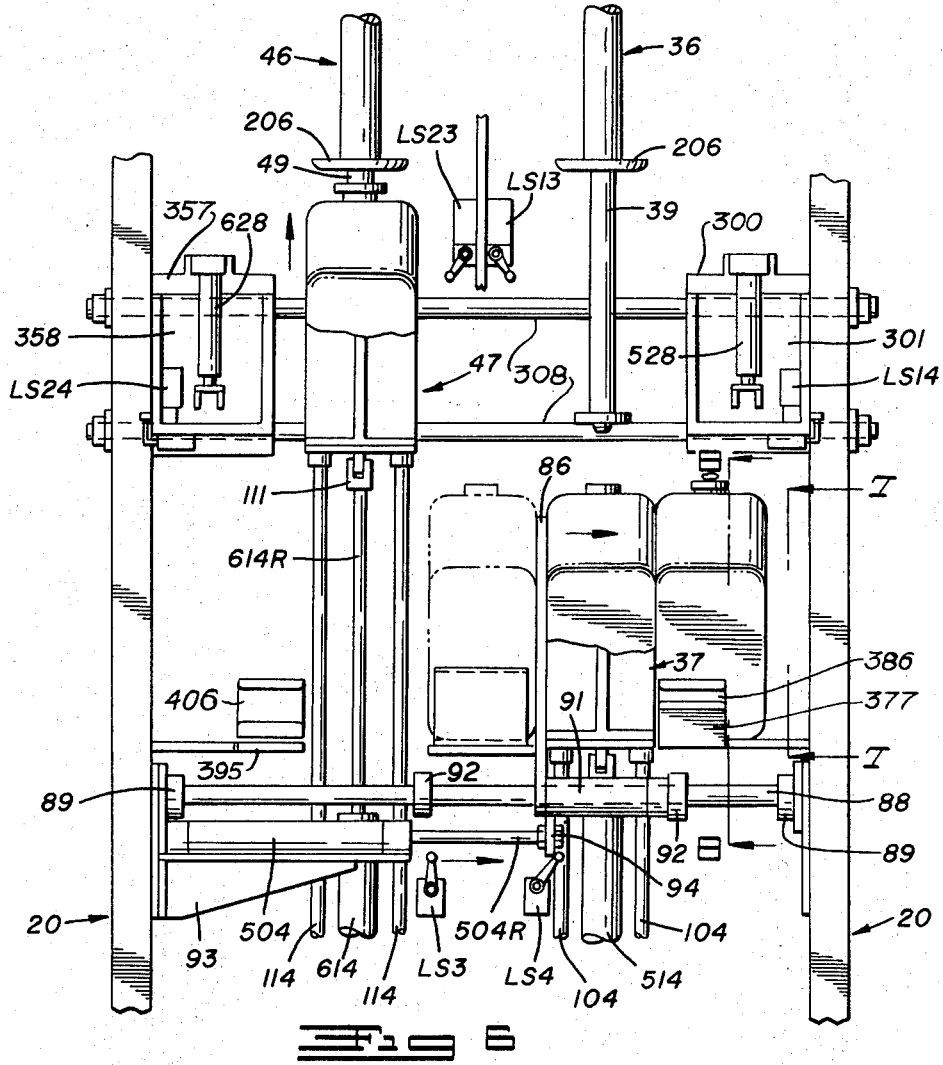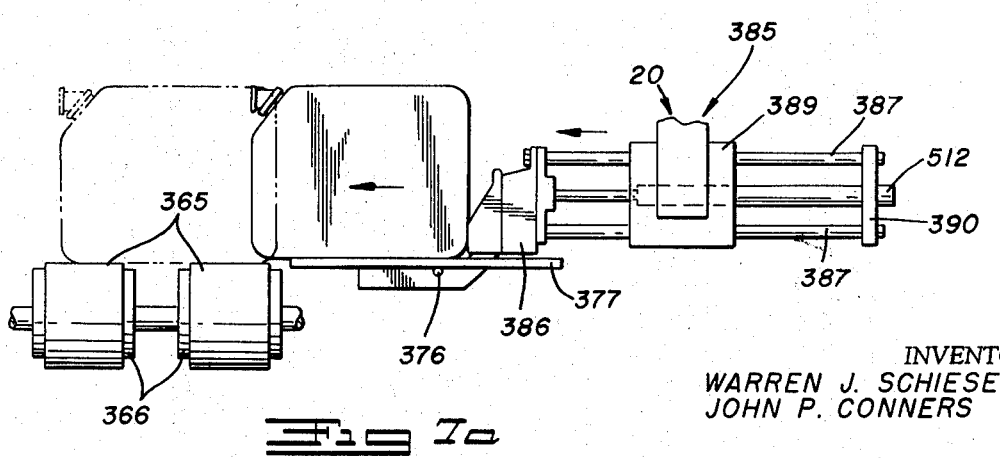

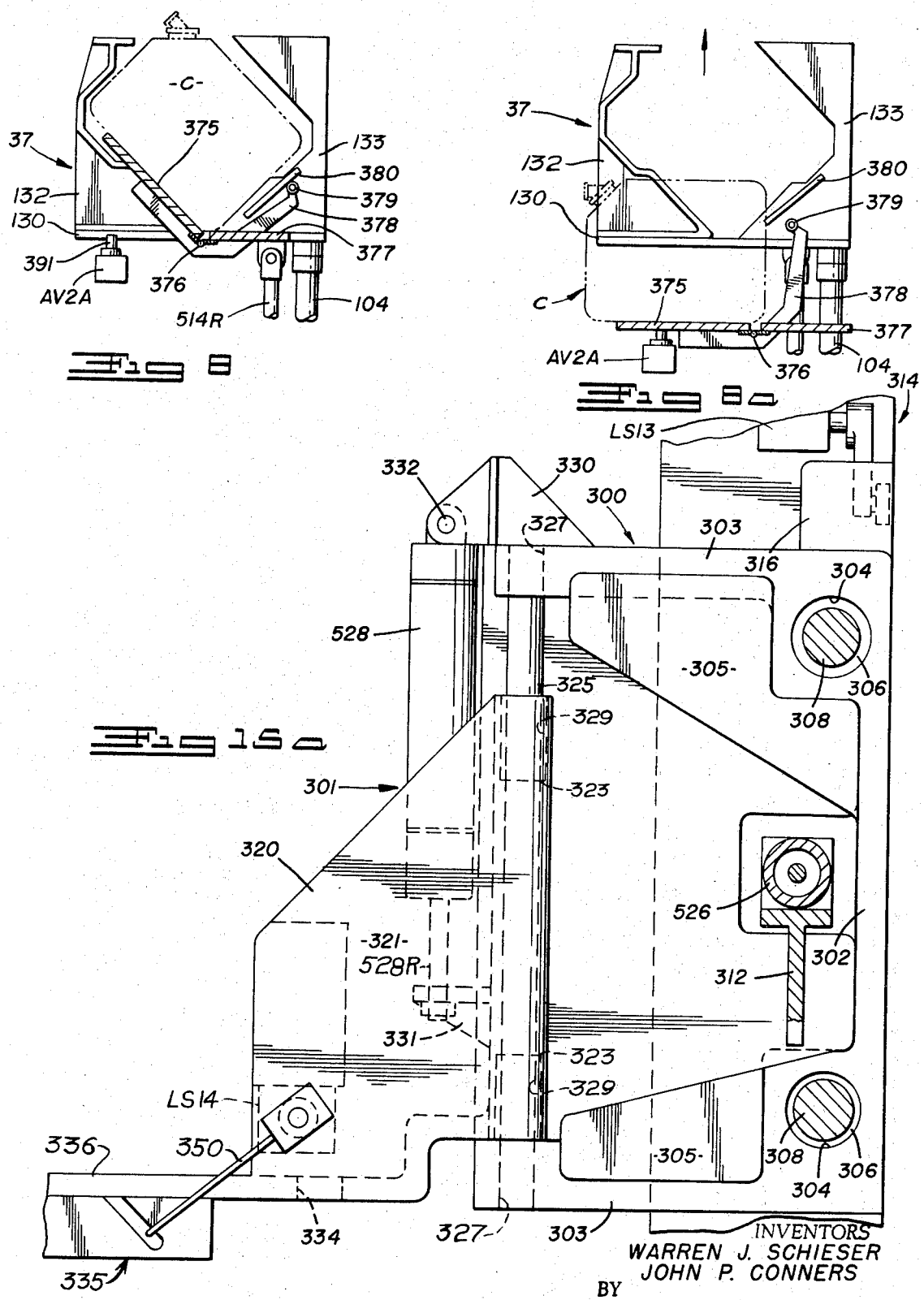

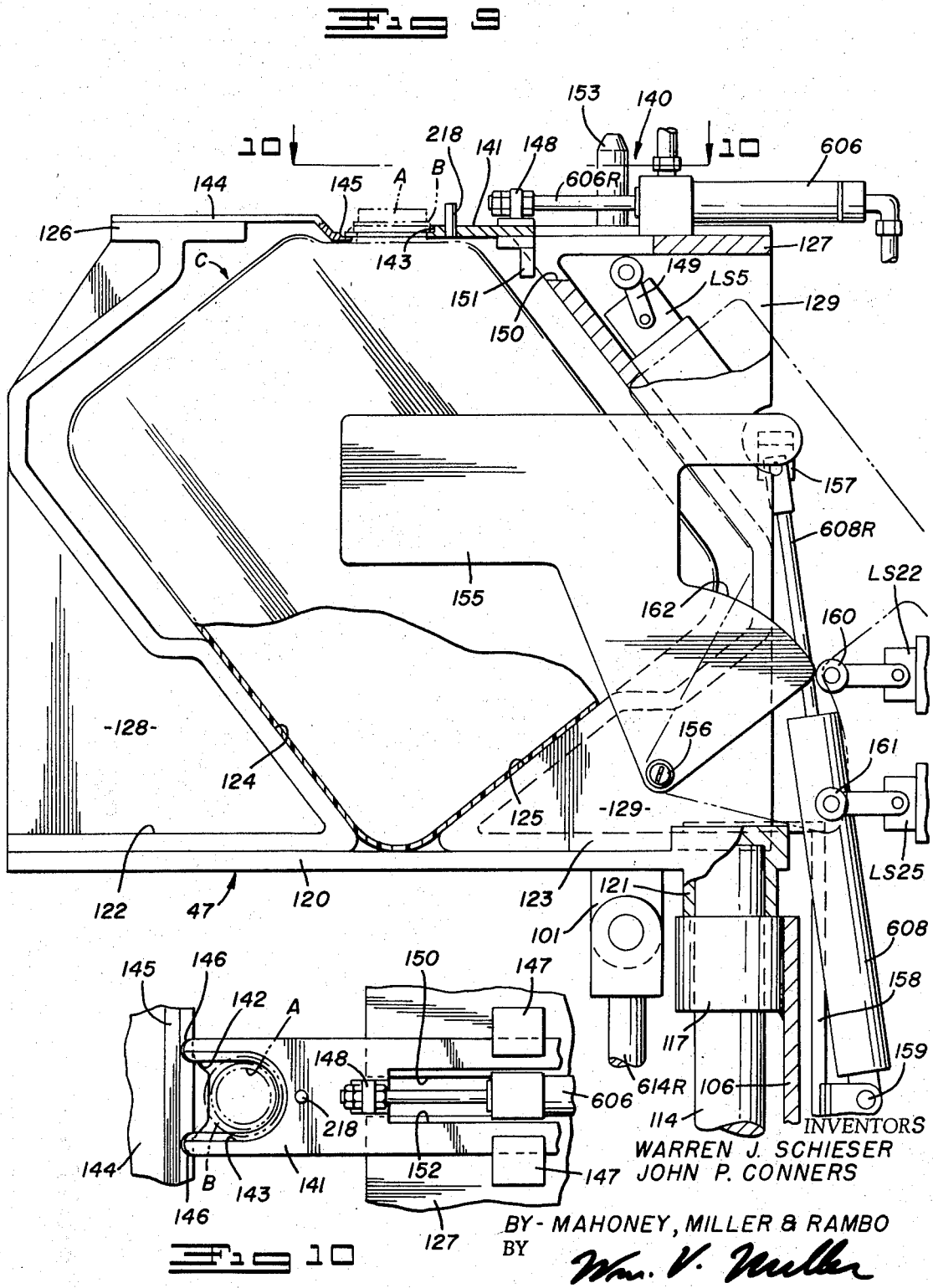

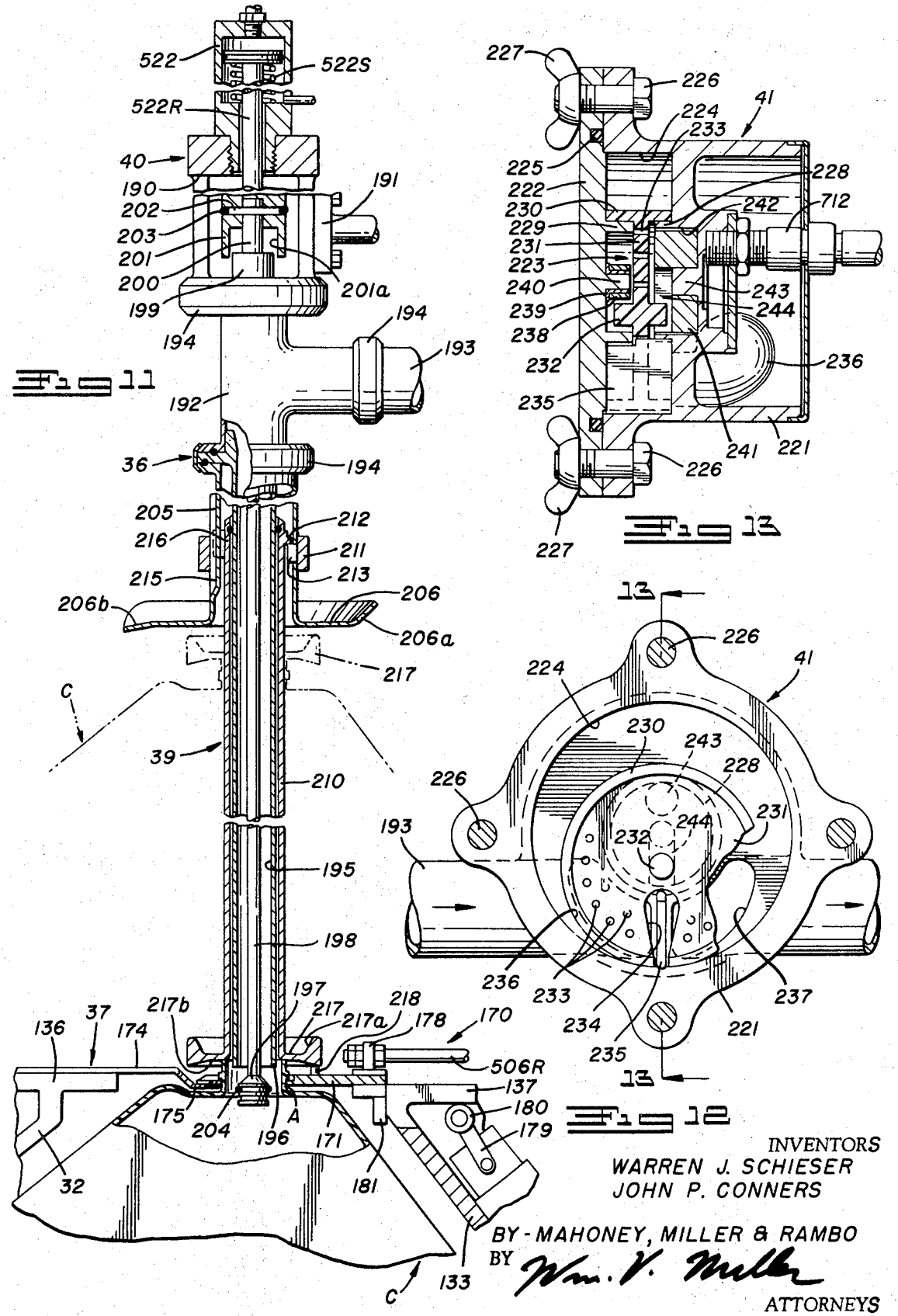

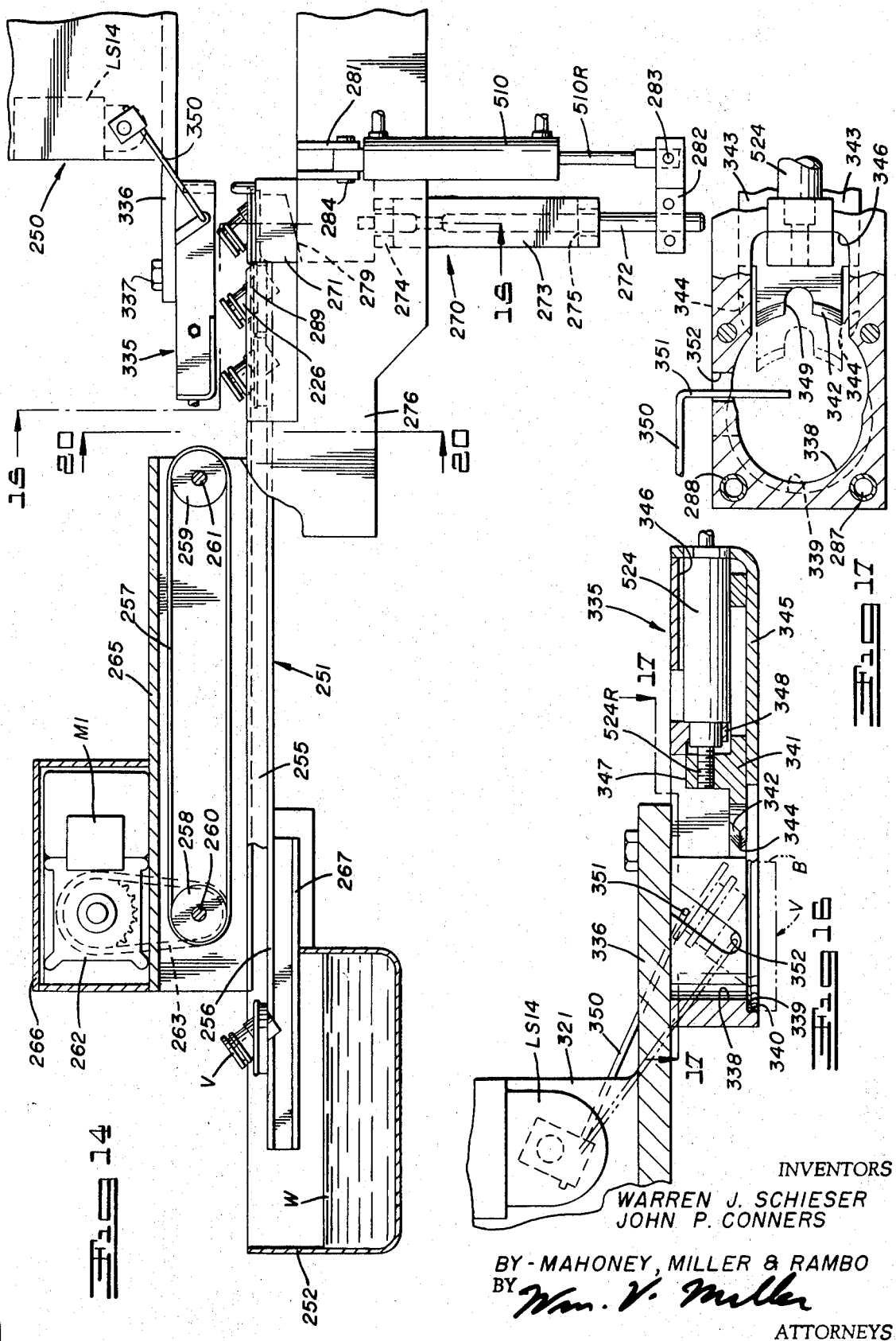

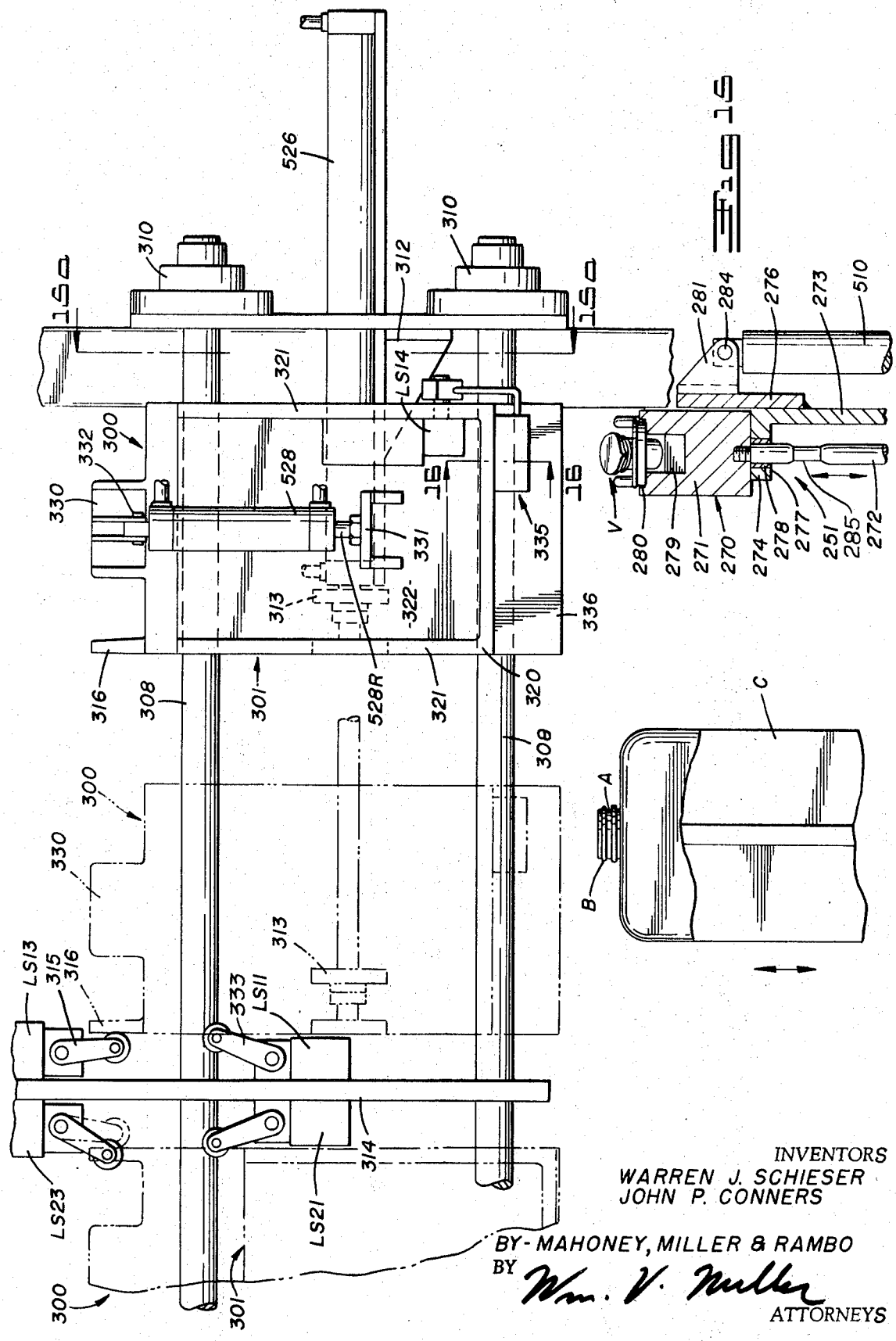

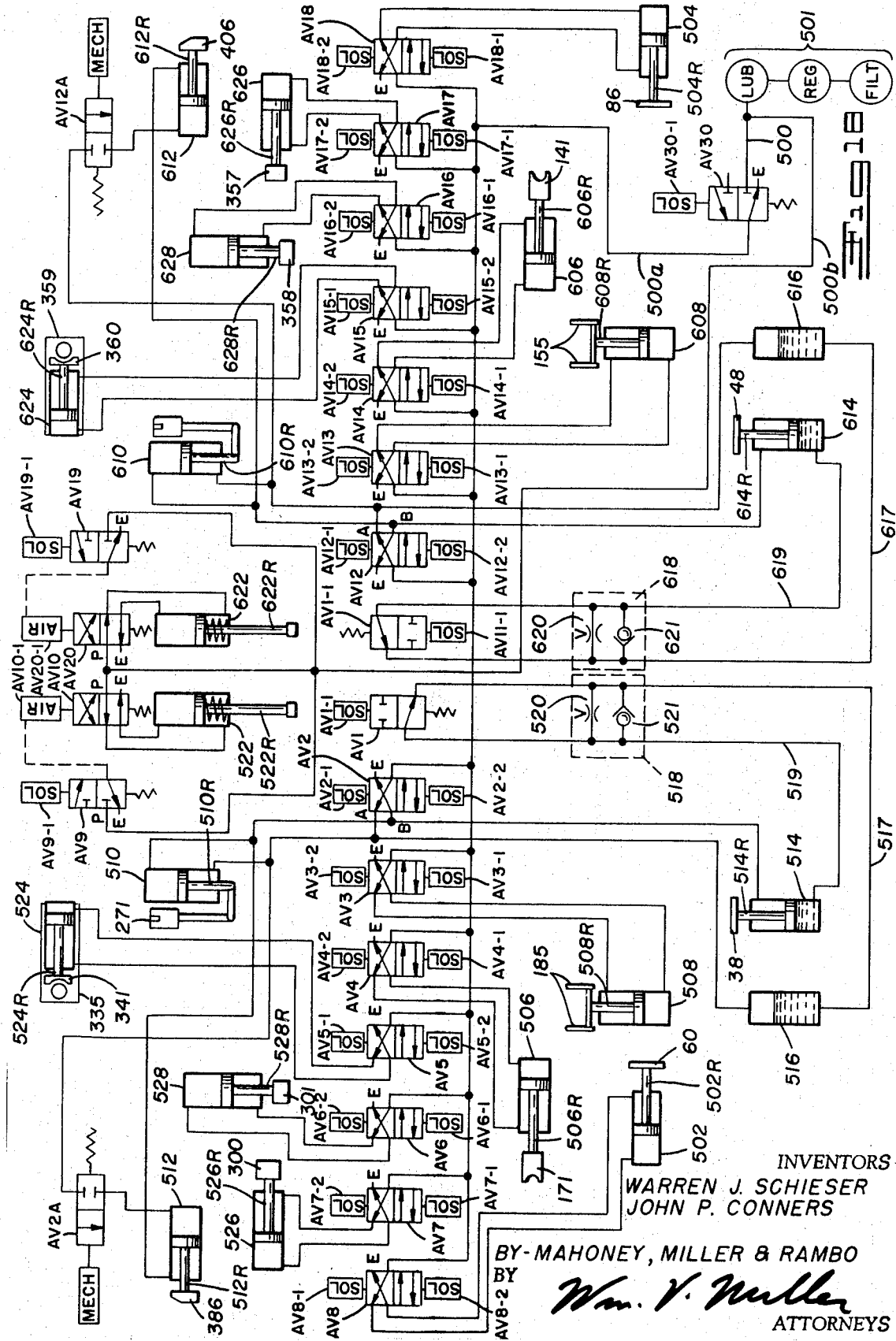

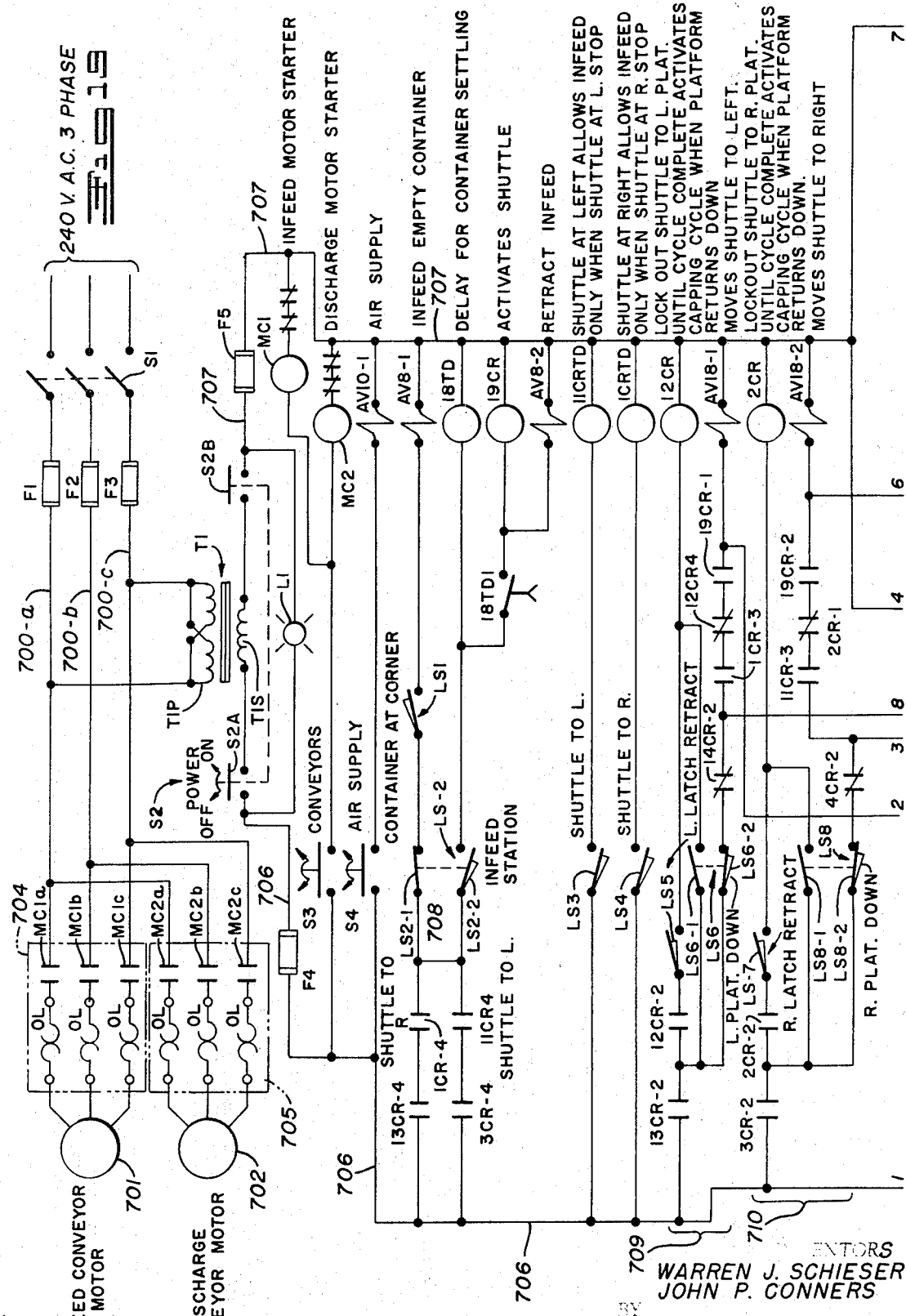

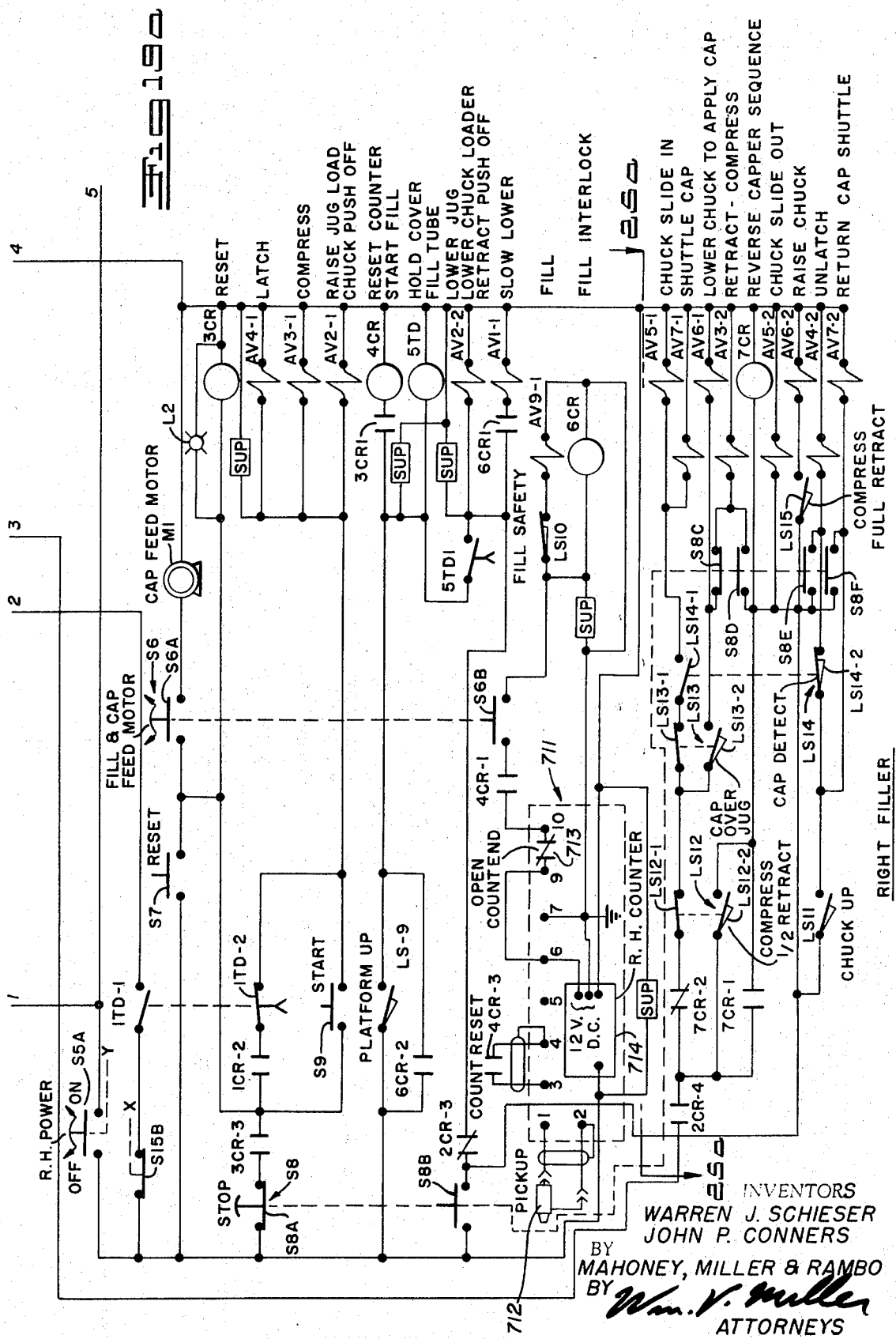

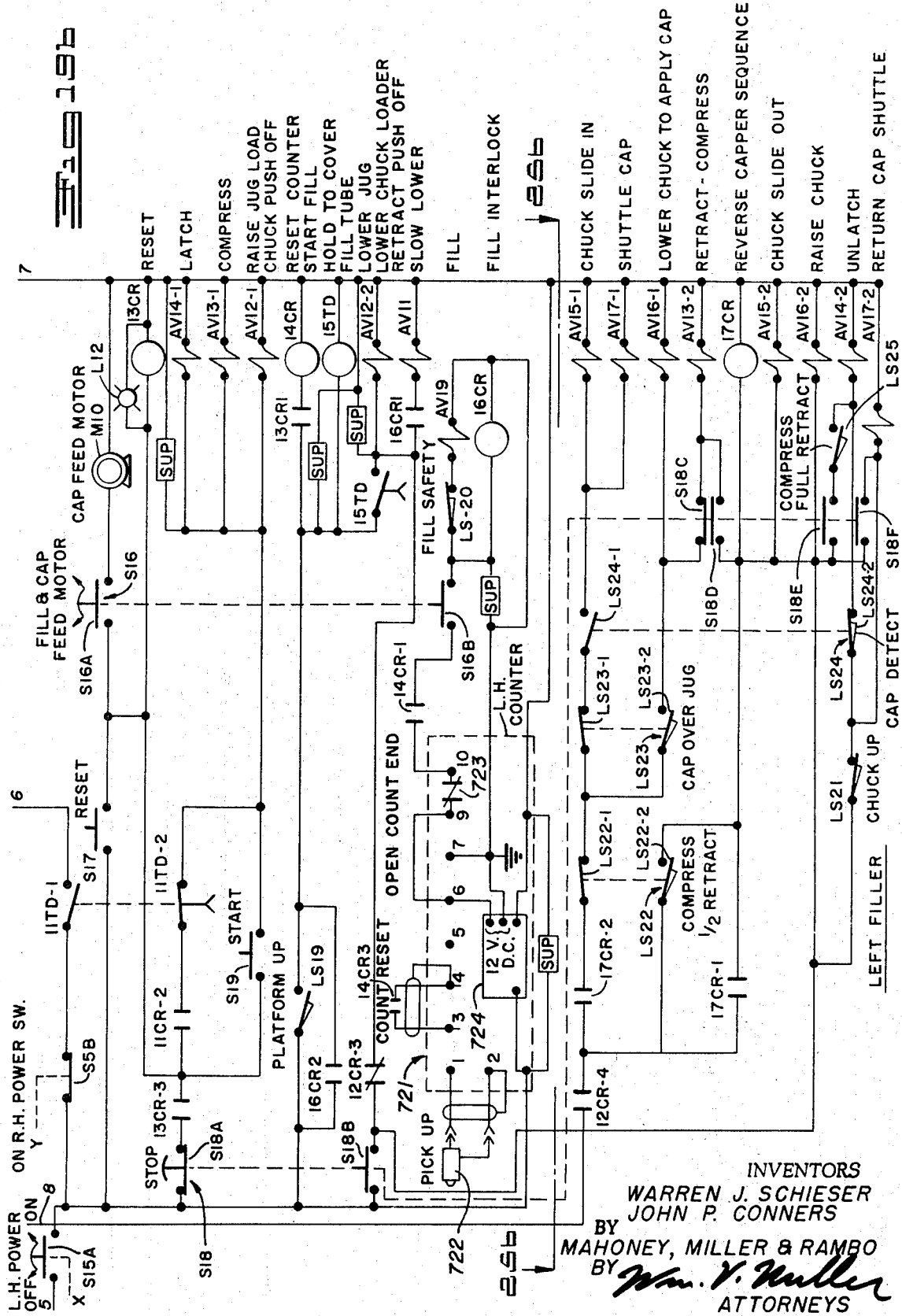

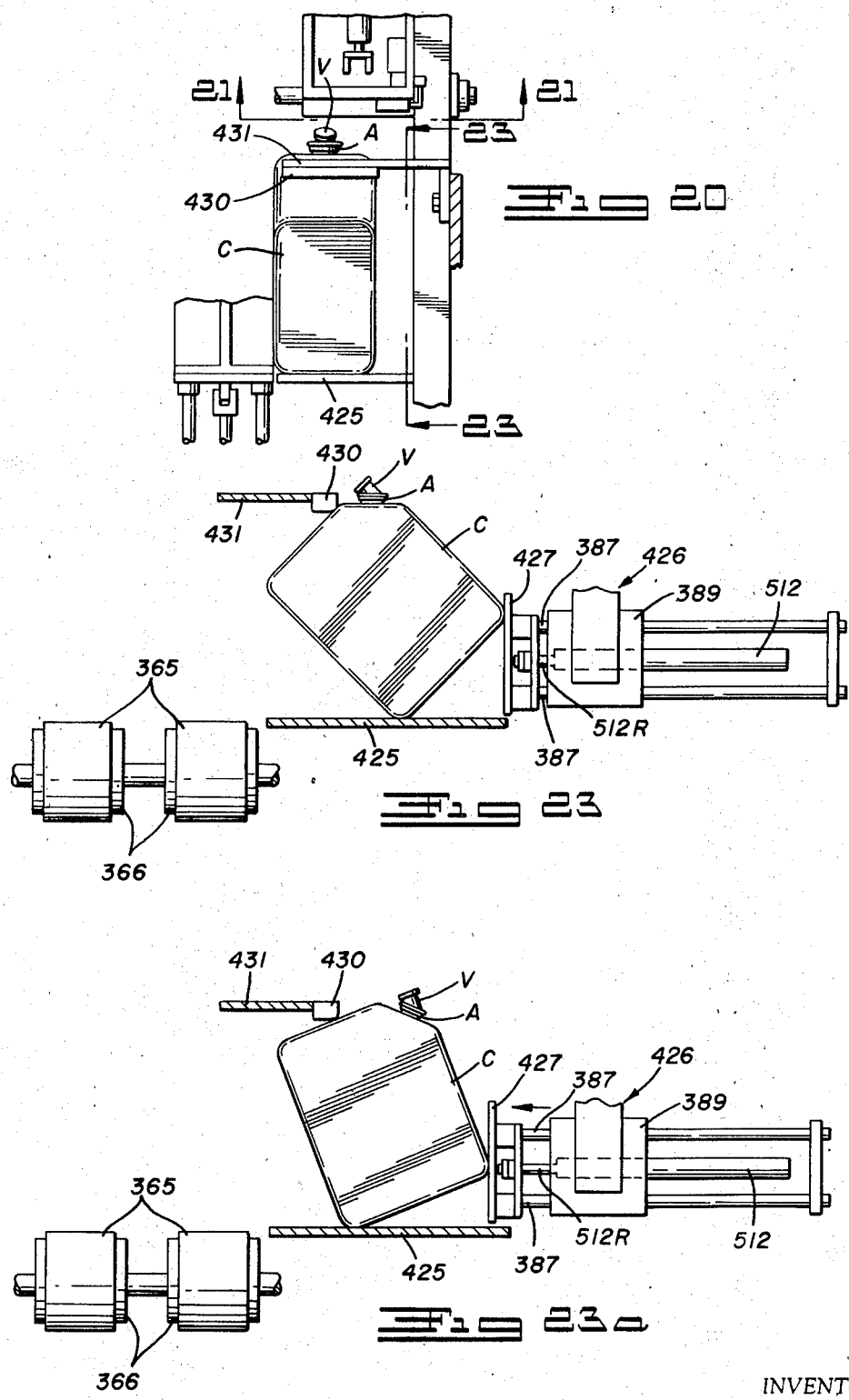

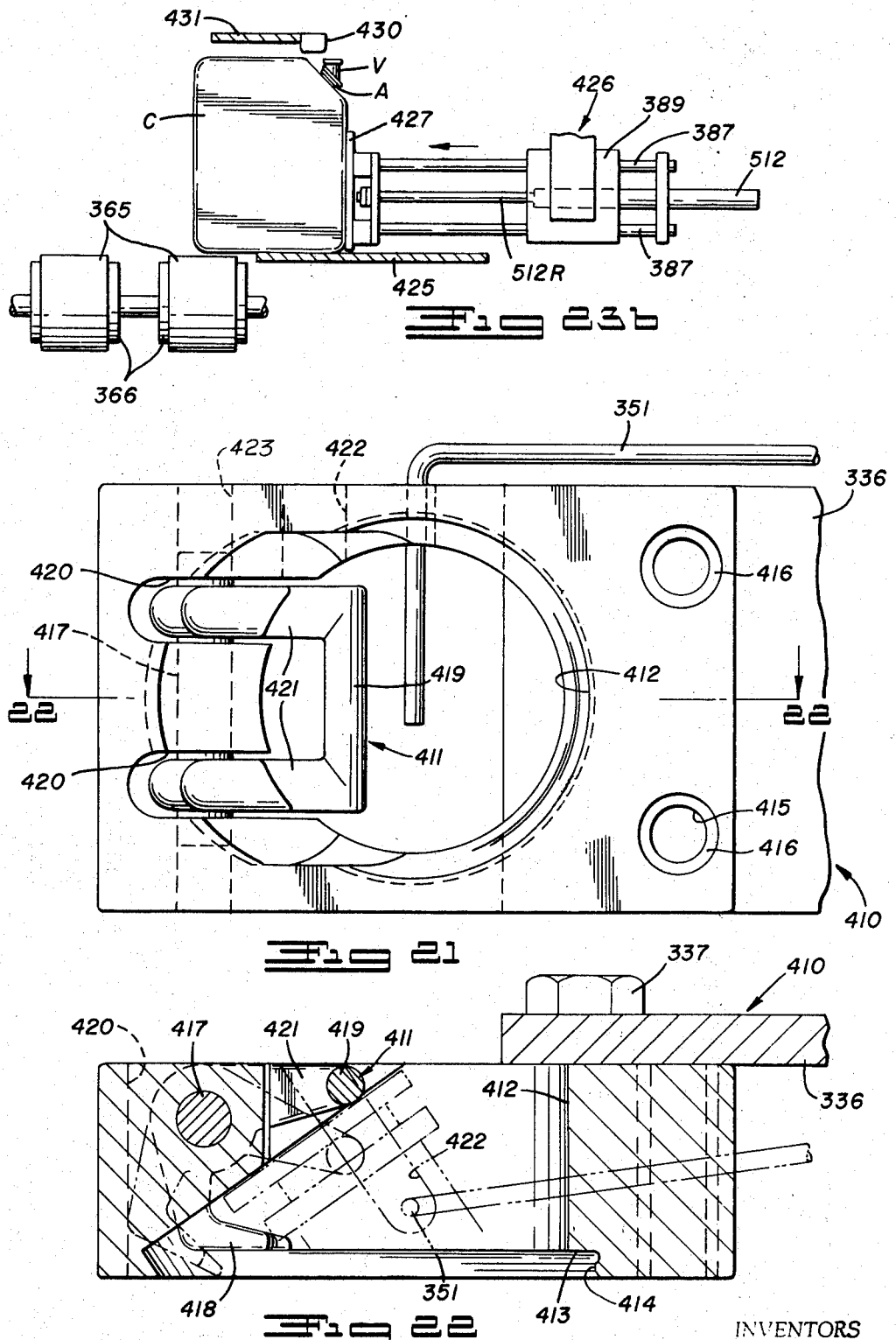

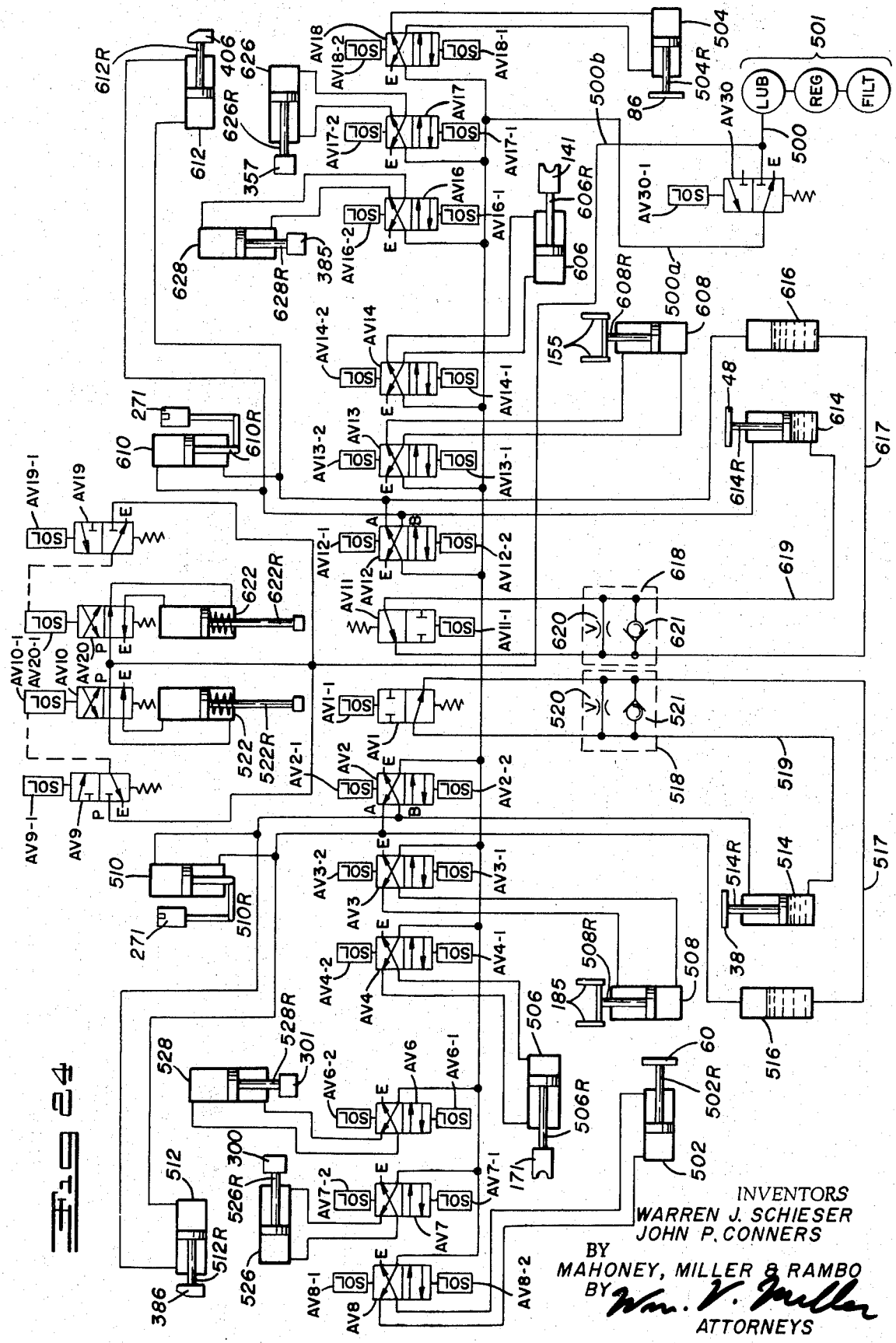

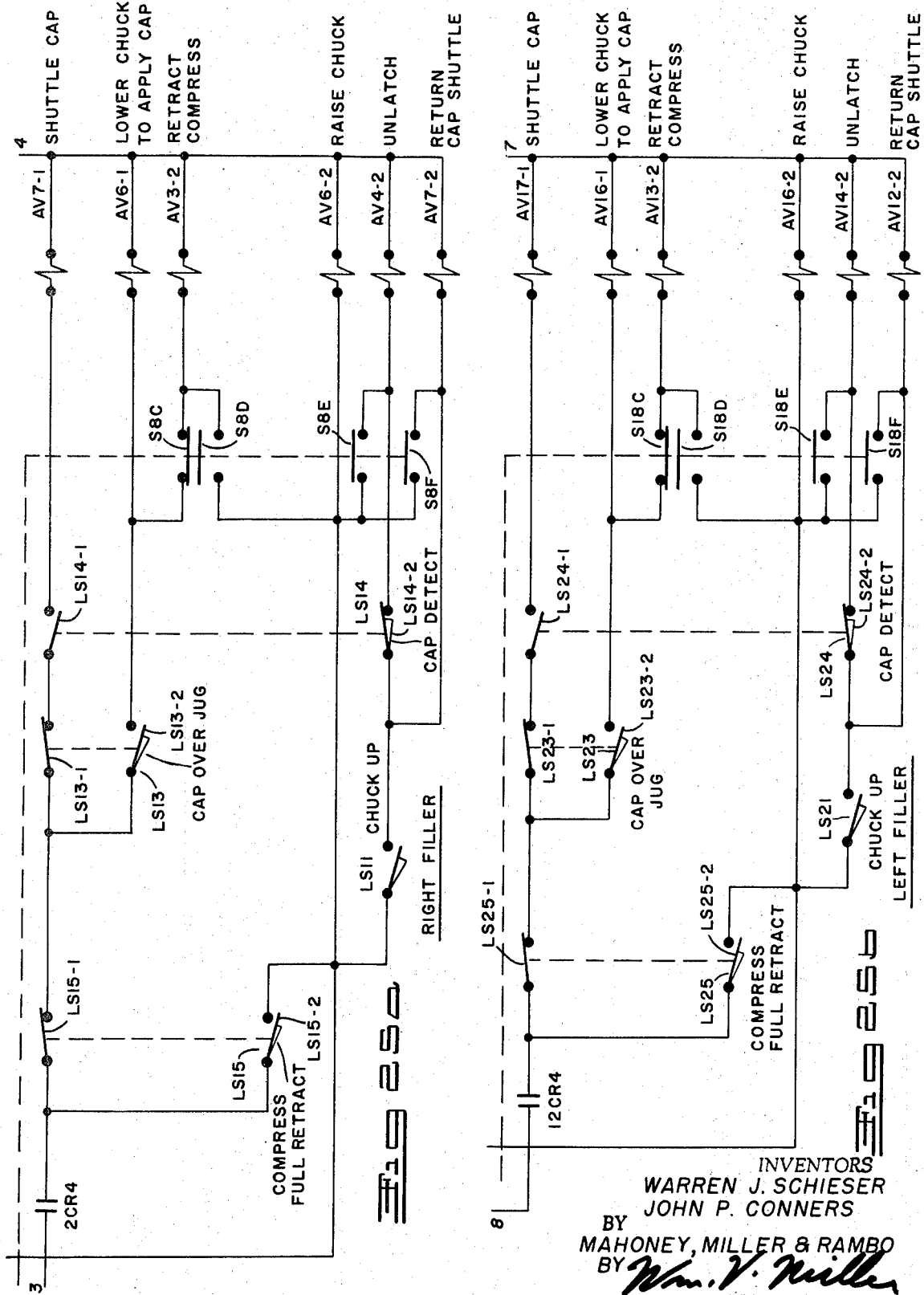

United States Patent Office 3,529,399
Patented Sept. 22, 1970

3,529,399
APPARATUS FOR AUTOMATIC FILLING AND CAPPING OF LIQUID CONTAINERS HAVING SEMI-RIGID WALLS
Warren J. Schieser, Columbus, and John P. Conners, Lancaster, Ohio, assignors to The Corrugated Container Company, Columbus, Ohio, a corporation of Ohio
Filed Apr. 1, 1968, Ser. No. 717,704
Int. Cl. B65b 57/00, 3/26
U.S. Cl. 53—55     39 Claims

ABSTRACT OF THE DISCLOSURE

This container filling apparatus fills containers in an automatically controlled, sequential operation which assures positive over filling of the containers with a desired volumetric quantity of the liquid. Unfilled containers received by the apparatus are sequentially subjected to a filling operation, application of a valve-type sealing cap, and discharge of the filled and capped container. Each container is supported during the filling and capping operation for proper orientation of the fill opening and for support of the container's side walls. Filling is accomplished by insertion of a liquid dispensing nozzle through the fill opening at the initiation of a fill operation and subsequent relative separating movement of the container and nozzle at a rate which maintains the discharge orifice of the dispensing nozzle immersed in the liquid to prevent foaming of the liquid. The container is filled in accordance with volumetric capacity limits with the volume of liquid dispensed into each container being determined by a flowmeter incorporating an electromagnetic transducer thereby minimizing the possibility of liquid contamination through avoidance of direct physical contact between the liquid and external indicating components of the flowmeter.

GENERAL DESCRIPTION OF CONTAINER FILLING APPARATUS

The type container which this embodiment of the apparatuus is specifically adapted to fill is the plastic, 10-quart capacity container provided with a valved dispensing closure and having a primary application in the milk industry for retail home delivery. These containers are formed from a plastic material in a rectangular, box-like configuration and are of a relatively thin-wall construction that may be classified as semi-rigid although the containers are structurally self-supporting. Forming the dispensing and fill-opening at a corner of the container as in the container configurations illustrated in the several figures of the drawings is of advantage to both filling of the container and subsequent dispensing. In filling of a container having the fill opening formed at a corner, it is preferable that the container be oriented in a tilted position with the fill opening uppermost as this facilitates filling to minimize the air space which will be left at the top of the container. Although a single specific container structure is illustrated in the several figures of the drawings, it is to be understood that this specific structure is exemplary and the apparatus may be readily adapted to handle containers of other configurations. Also, the containers may be provided with a simple closure which is not of the valved dispensing type illustrated in the drawings.

The apparatus of this invention receives the unfilled containers, properly orients the containers for filling, accurately fills the containers with the desired volume of liquid, applies a closure to the fill opening, reorients the filled and capped container and discharges the reoriented container from the apparatus. The illustrated and described embodiment of the apparatus includes two independently operable filling stations which are supplied with empty containers through the coordinated operation of a single container infeed mechanism which transfers the empty containers alternately to the two filling stations. Each filling station includes an elongated, valved dispensing nozzle which is insertable into a container elevating mechanism for moving a container into association with the dispensing nozzle for the filling operation. The dispensing nozzle is of a length to extend nearly to the bottom of a container at the start of the filling operation to prevent excessive frothing or foaming of a liquid such as milk and the container is lowered at a predetermined rate during filling to limit immersion of the nozzle to only a marginal end portion. Exposure of the nozzle to possible contamination is eliminated to a large degree by a telescopic sleeve structure which encloses each dispensing nozzle with the sleeve being axially displaced by the relative elevating movement of the container. In addition to vertical support of a container in the desired tilted position of optimum filling, each elevating mechanism is provided with vertical plates for supporting the semi-rigid side walls of a container and a latch mechanism engageable with the container fill opening with these components enhancing stability of the container during the filling and capping operations. After completion of the filling and capping operations and preparatory to discharge of a container from the apparatus, the container is reoriented to either a vertical or horizontal configuration to place a wall surface in engagement with a supporting surface and the filled container is then ejected from the apparatus onto a discharge conveyor.

Coordinated operation of the several components of the apparatus for a filling operation is effected by fluid actuators of the pneumatic type which are primarily controlled by an electrical control system. Fluid actuators are utilized throughout the apparatus and effect the mechanical movement of the components from infeed of the unfilled containers to discharge of the filled containers. The electrical control system includes limit switches which are responsive to the operation and positions of the components to effect the coordinated and sequential filling operation. A flowmeter incorporating an electrical transducer is included in the liquid dispensing means and provides an electrical signal for control of the volume of liquid dispensed into each container. Utilization of an electrical transducer provides a flow control system in which direct mechanical communication of the liquid and measuring apparatus is avoided and thus enhances the sanitary operation of the apparatus and this feature is of great importance in the milk industry. Although the illustrated embodiment of the apparatus comprises two filling stations which are concurrently operable for maximum capability, the electrical control system may be set up through appropriate operation of manual selector switches for automatic operation of only one selected filling station. Single station operation is particularly advantageous for limited or small quantity production runs and single station capability is also of advantage in large production runs in that it permits continued operation at reduced capacity in the event that jamming or malfunctioning may occur with respect to one station. This permits continuation of the filling operation while the malfunction is being cleared.

These and other objects and advantages of this invention will be readily apparent from the following detailed description of an embodiment thereof and the accompanying drawings.

In the drawings:

FIG. 3 is a fragmentary vertical sectional view taken along line 3—3 of FIG. 2 showing the container supporting platforms on an enlarged scale with the right platform elevated to the initial filling position.

FIG. 4 is a fragmentary vertical sectional view taken along line 4—4 of FIG. 3 showing the mechanism for infeed of an empty container.

FIG. 5 is a vertical sectional view similar to FIG. 3 but showing a container on the left platform being elevated to the initial filling position and a container on the right platform being capped.

FIG. 6 is a vertical sectional view similar to FIG. 3 but showing the left platform elevated to initial filling position and transfer of containers relative to the right platform.

FIG. 7 is a fragmentary vertical sectional view taken along line 7—7 of FIG. 6 showing the container tilting and push-off mechanism.

FIG. 7a is a fragmentary vertical sectional view similar to FIG. 7 but showing the filled container being pushed-off onto the discharge conveyor.

FIG. 8 is a fragmentary vertical sectional view taken along line 8—8 of FIG. 6 showing the actuating mechanism for the container tilting mechanism.

FIG. 8a is a fragmentary vertical sectional view similar to FIG. 8 but showing the container tilting mechanism actuated to a position for discharge of a filled container.

FIG. 9 is a fragmentary vertical sectional view taken along line 9—9 of FIG. 1 showing the left container supporting platform, compress-plate mechanism and latch plate mechanism on an enlarged scale with the platform in its lowermost position.

FIG. 10 is a fragmentary top plan view taken along line 10—10 of FIG. 9 showing the latch plate mechanism.

FIG. 11 is a fragmentary vertical sectional view on an enlarged scale taken along line 11—11 of FIG. 1 showing the container fill valve mechanism.

FIG. 12 is a fragmentary vertical sectional view on an enlarged scale taken along line 12—12 of FIG. 1 showing the internal structure of the flowmeter.

FIG. 13 is a vertical sectional view taken along line 13—13 of FIG. 12.

FIG. 14 is a fragmentary vertical sectional view on an enlarged scale taken along line 14—14 of FIG. 1 showing the cap loading mechanism.

FIG. 15 is a vertical sectional view taken along line 15—15 of FIG. 14.

FIG. 15a is a fragmentary vertical sectional view taken along line 15a—15a of FIG. 15.

FIG. 16 is a further enlarged vertical sectional view taken along line 16—16 of FIG. 15 showing the cap loading chuck.

FIG. 17 is a horizontal sectional view taken along line 17—17 of FIG. 16.

FIG. 18 is a schematic diagram of the fluid operating and control circuit of the filling machine.

FIGS. 19, 19a and 19b schematically illustrate the electrical control circuit of the filling machine with the interconnecting conductors between the portions of the circuit shown on the separate sheets of drawings designated by the same numeral.

FIG. 20 is a fragmentary sectional view taken along line 20—20 of FIG. 14 but showing a modified construction relative to the cap chuck and the container tilting and push-off mechanism.

FIG. 21 is a bottom plan view of the modified cap chuck as seen on a horizontal plane extending through line 21—21 of FIG. 20 on an enlarged scale.

FIG. 22 is a vertical section view taken along line 22—22 of FIG. 21.

FIG. 23 is a fragmentary vertical sectional view taken along line 23—23 of FIG. 20 showing the container tilting and push-off mechanism with a filled container disposed at the push-off station.

FIG. 23a is a fragmentary vertical sectional view similar to FIG. 23 but showing the container partially tilted to a vertical position as a consequence of operation of the push-off mechanism.

FIG. 23b is a fragmentary vertical sectional view similar to FIG. 23 but showing the container tilted to a vertical position as a consequence of operation of the push-off mechanism.

FIG. 24 is a schematic diagram of the fluid operating and control circuit for the modified construction of the apparatus shown in FIG. 20.

FIGS. 25a and 25b are schematic diagrams of modifications of the electrical control circuits as shown in FIGS. 19a and 19b for the modified construction of the apparatus shown in FIG. 20 with the modified portions of the respective circuits being that below the lines 25a—25a and 25b—25b in the respective figures.

MECHANICAL STRUCTURE AND OPERATION

Figure 1:
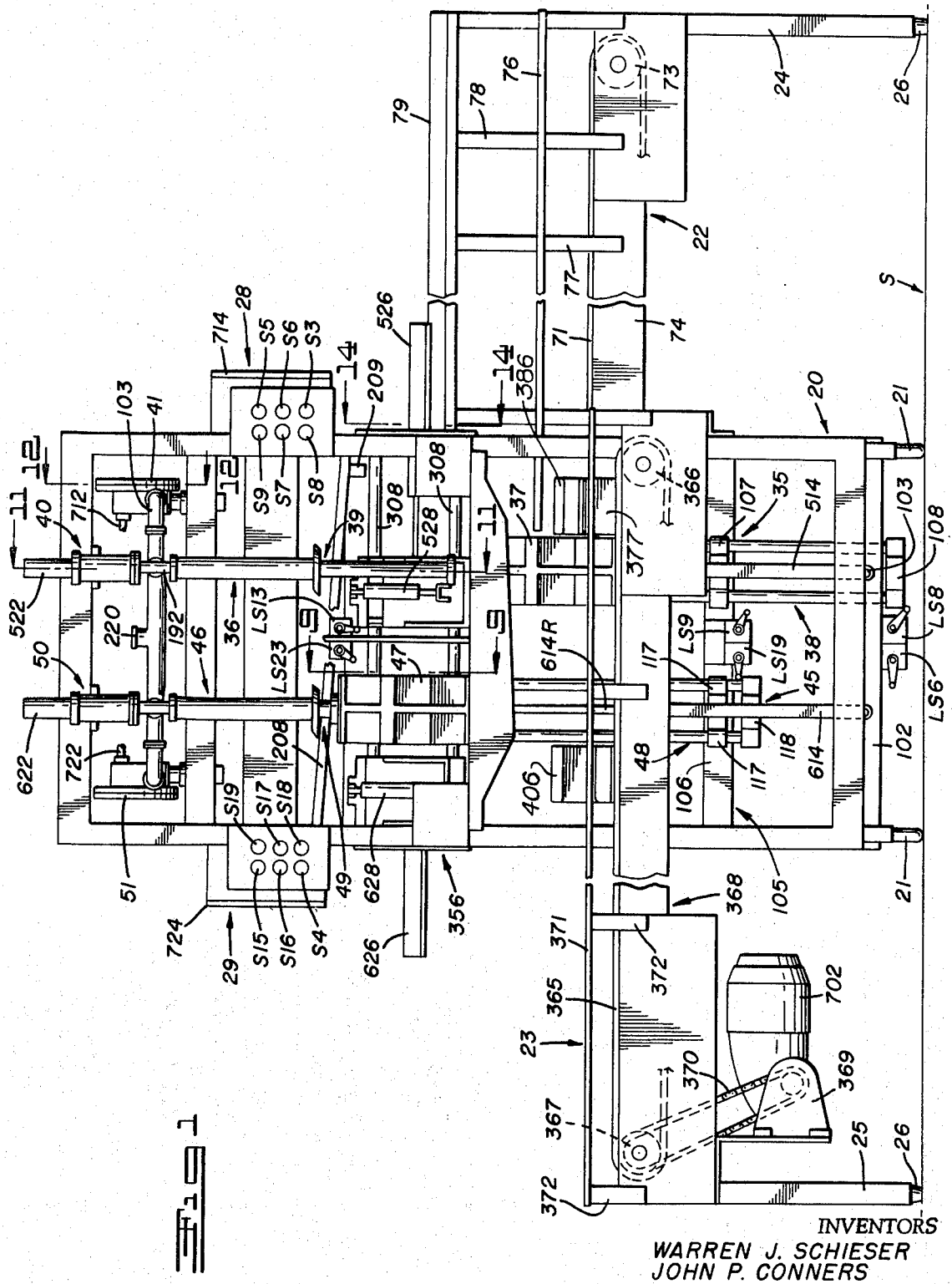
FIG. 1 is a front elevational view of a filling machine for dispensing containers and which embodies this invention.

The container filling apparatus illustrated in the several figures of the drawings and which embodies this invention is designed for the concurrent or simultaneous filling of two containers although the apparatus may be operated to perform a filling operation with respect to only one container at a given time. Since the apparatus includes two filling stations which are independently operable, the mechanisms associated with each filling station will be seen to be identical and the description of one filling station and the mechanism therefor will be applicable to the other filling station although distinctive reference numerals are utilized wherever appropriate. The filling stations are designated as either left or right as determined by viewing the apparatus from the front as illustrated in FIG. 1. Some specific mechanical structure details as well as fluid conduits and electrical circuit conductors have been omitted from the figures showing the mechanical structure of the apparatus for clarity of illustration. These omitted mechanical structure details, fluid system conduits and electrical circuit conductors as well as their physical or mechanical arrangement in the apparatus are well known and, therefore, it is not considered necessary to illustrate or describe these in detail.

The containers C for which the illustrated embodiment of the apparatus is designed are clearly shown in several figures of the drawings. The container may be generally described as being of rectangularly-shaped, block-form which is preferably fabricated from a thermoplastic, synthetic resin that is of a type that, even with a relatively thin-wall construction, the container will be semi-rigid and substantially self-supporting when either empty or filled. One corner of the container is formed at an angle and is provided with a filling or dispensing opening A that is adapted to receive a closure which may be a cap V of the valved dispensing type. A container C is received by the apparatus in an unfilled, vertically oriented condition without a closure cap V applied to the fill opening with the cap subsequently applied during the filling operation. Because of the angled corner orientation of the fill opening A which facilitates dispensing of liquid from the container, it is necessary that the container C be oriented during the filling operation to place the fill opening uppermost and thus prevent formation of excessive air spaces within the container as would be occasioned should the container merely be oriented as illustrated in FIG. 4 prior to tilting to the preferred orientation which is also illustrated in FIG. 4. The valved closure cap V is applied to the fill opening A subsequent to filling of the container C while the container is supported in this tilted configuration. Prior to discharge from the apparatus, the container is re-oriented to again place one side wall in contacting engagement with a supporting surface in either a horizontal orientation as shown in FIG. 7a or in a vertical orientation as shown in FIG. 23b.

Figure 2:
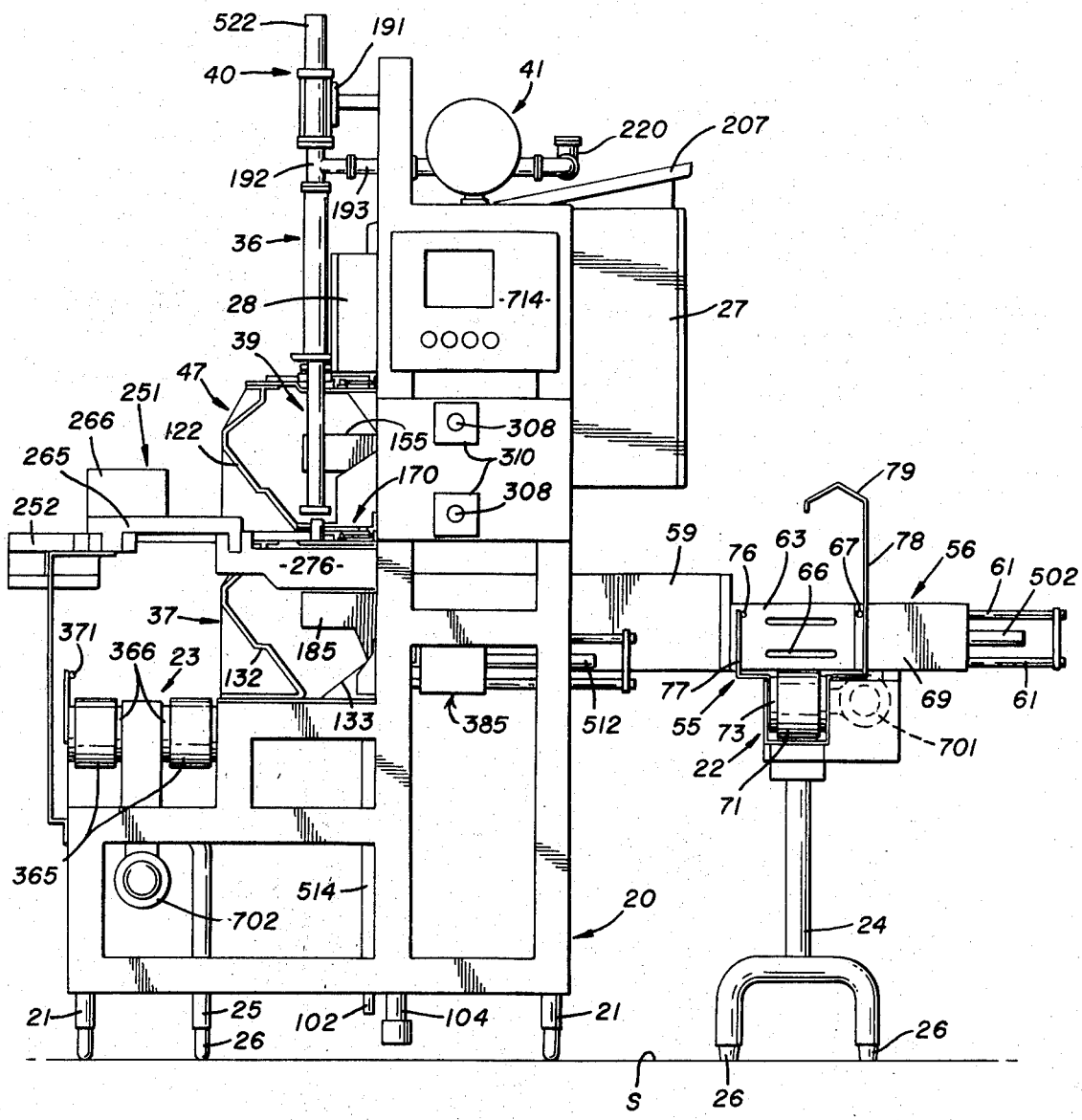
FIG. 2 is a side elevational view of the filling machine as viewed at the right side of FIG. 1.

Referring specifically to FIGS. 1 and 2, it will be seen that the several mechanisms of the apparatus are assembled on a structural framework designated generally by the numeral 20. This structural framework 20 is preferably fabricated from tubular steel members that are welded together into a unitary rigid structure. Preferably, the structural framework 20 is provided with suitable leveling devices 21 at the base portion thereof which may be adjusted to accommodate any irregularities or unevenness in a floor or surface S on which the apparatus is to be supported. In addition to the main structural framework 20, the apparatus is seen to include a supply conveyor indicated generally at 22 and a discharge conveyor indicated generally at 23. Each conveyor 22 and 23 also comprises its respective supporting framework which, in the case of the supply conveyor, includes an upstanding bracket 24 positioned at each end of the conveyor. One end of the discharge conveyor 23 is supported by an upstanding bracket 25 while the opposite end is carried by the structural framework 20. Each of the upstanding brackets 24 and 25 is also preferably provided with vertical adjustment means 26 to compensate for irregularities in the supporting surface S. Suitable equipment enclosures or housings are also mounted on the structural framework for protection of the electrical components and some of the control mechanisms and valves of the fluid system. These enclosures include a large cabinet 27 mounted on the upper, rear portion of the structural framework 20 and which houses the majority of the electrical system components along with a main control valve assembly that is of a manifold type. This apparatus is provided with two independent operator control stations with each station provided with the necessary electrical control switches. These switches are mounted in a respective filling station control cabinet 28 or 29. These station control cabinets 28 and 29 are mounted on the upper portions of the structural framework 20 at the front of the apparatus for convenience of an operator.

The right filling station, having reference to FIG. 1, is seen to comprise container elevating means, indicated generally at 35, and liquid dispensing means, indicated generally at 36. The container elevating means 35 includes a container supporting platform 37 and an elevator actuating mechanism 38 which effects vertical displacement of the platform between a lowermost position, as illustrated in the case of the right filling station, and a relatively elevated position, as is illustrated with respect to the left filling station. The liquid dispensing means 36 comprises an elongated discharge nozzle 39 which incorporates a filler valve (not visible in FIGS. 1 and 2), a filler valve actuating mechanism 40, and a flow-responsive device 41 for determining liquid flow through the discharge nozzle.

The left filling station comprises the same components as that described for the right filling station with these components comprising container elevating means 45 and liquid dispensing means 46. The container elevating means includes a supporting platform 47 and elevator actuating mechanism 48 which is selectively operable to displace the platform between the two vertically spaced positions. Included in the liquid dispensing mean is a discharge nozzle 49, a filler valve actuating mechanism 50 and a flow-responsive device 51.

Unfilled containers are supplied to the two filling stations by infeed means 55 which transfers the containers from the supply conveyor 22 to an infeed station 57 located between the two container elevating means 35 and 45. The infeed means 55, as can be best seen in FIG. 4, receives containers C from the supply conveyor 22 at the rear of the apparatus and displaecs the containers thus received forwardly relative to the apparatus to the infeed station 57. Included in the infeed means 55 is a reciprocal displacing mechanism 56 which is selectively operable to displace the containers along a horizontal path toward the front of the apparatus to the infeed station. The infeed station 57 is located between the two filling stations which are seen to be laterally spaced apart in FIG. 1. Thus, sequently container-supporting platforms 37 or 47 preparatory to initiation of a filling operation.

Stepwise transfer of the containers C from a receiving station to the infeed station 57 is effected by selective operation of the displacing mechanism 56 to horizontally push the containers as they reach the receiving station from the conveyor 22 onto a horizontal supporting surface 58 and subsequently to the infeed station 57. Container C1 which is supported by the conveyor 22 is considered as being at the receiving station of the apparatus. The horizontal surface 58 is mounted on the structural framework 20 by suitable means (not shown) and comprises a flat plate having an upper surface over which the containers will readily slide and which extends between the conveyor 22 and the infeed station 57. This horizontal surface plate 58 forms the bottom of an inverted U-shaped housing 59 that protects the unfilled containers from liquids that may be inadvertently spilled by the apparatus or from other falling debris which may contaminate the containers.

The reciprocal displacing mechanism 56 comprises a vertically disposed pusher plate 60 which is carried by a pair of horizontally extending guide rods 61. The guide rods 61 are slidably supported in a guide bearing 62 secured to the structural framework 20. As can be best seen in FIGS. 2 and 4, a vertically disposed plate 63 also rigidly secured to the structural framework 20 extends the width of the supply conveyor 22 at one side of the container receiving station and thus forms a stop for the containers transferred to the receiving station by the conveyor. Reciprocating movement of the pusher plate 60 is effected by a fluid actuator which comprises a cylinder 502 fixedly supported by the guide bearing 62 and having a piston rod 502R which is secured to the pusher plate. Extension of the piston rod 502R from the illustrated retracted position of FIG. 4 will operate to displace the pusher plate 60 to the left of the figure into contacting engagement with a container C1 at the receiving station and the stroke of this actuator is of sufficient length to permit displacement of this container from the conveyor 22 onto the horizontal supporting surface 58 to the position of the container C2. The pusher plate 60 is preferably provided with a vertically disposed shroud plate 69 which is movable into blocking relationship to the conveyor 22 to prevent infeed of a container while the displacing mechanism is being actuated. The shroud plate 69 will extend across the conveyor when the pusher plate 60 has been displaced to the left in FIG. 2.

Subsequent operations of the displacing mechanism 56 to push succeeding containers from the conveyor 22 will move the containers in successive steps from the position C1 to C2 and to the position C3 immediately prior to transfer of a container to the infeed station, such as container C4. At the time of transfer of a container to the infeed station 57, the infeed means 55 also accomplishes orientation of the container to the desired tilted configuration necessary for the filling operation. The infeed station 57 comprises a supporting bracket 64 having a V-shaped upper surface adapted to receive a corner of a container as is illustrated in the case of container C4. The bracket 64 is secured to and carried by a member of the structural framework 20 in longitudinal alignment with the horizontal supporting surface 58 but at a relatively lower elevation such that displacement of the containers from the surface 58 as in going from position C3 to position C4 will result in tipping of the container to this desired orientation due to the effect of gravity.

As previously indicated, control of the operation of the apparatus is accomplished by an electrical control circuit which is responsive to the successive positioning of the containers during their progress through the apparatus in performance of a filling operation. Detection of the containers at the selected positions in the filling operation is accomplished by mechanically actuated limit switches which are connected into the electrical control system which will be subsequently described in detail. With respect to the container infeed means 55, a limit switch LS1 is provided to detect the positioning of a container C1 at the receiving station and thus initiate operation of the displacing mechanism 56 only when a container is at this position. This limit switch LS1 is provided with an actuating element which projects through an opening 66 formed in the stop plate 63 and is positioned to be engaged by a surface of the container C1 and actuate the switch LS1 when the container reaches the receiving station. A limit switch LS2 is similarly provided at the infeed station 57 for detecting the presence of a container C4 on the bracket 64. This switch is supported by the structural framework 20 and is provided with an actuating element 67 which is adapted to extend through an opening 68 formed in the bracket 64. When LS2 is not actuated, the element 67 will be in the broken line position; however, the presence of the container C4 supported by the bracket 64 will result in angular rotation of the element 67 to the illustrated position and result in actuation of limit switch LS2.

As can be best seen in FIGS. 2 and 4, the supply conveyor 22 is disposed in orthogonal relationship to the container infeed means 55 and transfers unfilled containers C in sequential manner to the receiving station. In this embodiment of the apparatus, the receiving station is actually the marginal end portion of the conveyor 22 with the containers merely resting upon the conveyor. This conveyor which is of a well known construction comprises, in general, an elongated endless belt 71 which is continuously driven when the apparatus is in operation to assure positive and rapid feeding of containers to the receiving station. The supply conveyor belt 71 is trained about two pulleys 72 and 73 that are journaled for rotation in horizontally spaced relationship on the upstanding brackets 24. These brackets are interconnected by an intermediate framework 74 which maintains the proper spacing of the two pulleys 72 and 73 and is preferably provided with additional means for supporting the upper run of the belt 71 in a substantially horizontal plane. The intermediate framework 74 may be interconnected with the structural framework 20 to further enhance the structural rigidity of the apparatus. Revolving movement of the belt 71 is produced by an electric motor 701 which is mounted on the intermediate frame 74 and is drivingly connected to an axle 75 of the pulley 72 through a suitable gear reduction unit. Horizontally disposed container guide bars 76 are supported in upwardly spaced, longitudinally relationship to the conveyor belt 71 on suitable brackets 77 and 78 at each side of the conveyor. Carried on vertical extensions of the bracket 78 is an elongated, inverted, V-shaped channel 79 which projects over the belt 71 and extends substantially the length of the conveyor 22. This channel 79 provides protection for the fill openings A of the containers C as they progress along the conveyor to the receiving station in that falling contaminants will be prevented from entering the containers.

Subsequent to transfer of a container to the infeed station 57, the apparatus is functional to sequentially and alternatingly transfer the container from the infeed station to the selected container-supporting platform, 37 or 47. Container transfer means, indicated generally at 85, is provided for this purpose with this transfer means being most clearly shown in FIGS. 3, 4, 5 and 6. Displacement of a container C at the infeed station in either direction is effected by a shuttle plate 86 which is disposed in a vertical plane and parallel to the longitudinal axis of the infeed and which is supported for movement laterally or transversely of the infeed of containers to the infeed station 57. Supporting the shuttle plate 86 for this lateral movement are a pair of horizontally disposed guide rods 87 and 88. These guide rods 87 and 88 are also oriented transversely to the direction of infeed of the containers and are supported at each end by suitable mounting brackets 89 which are secured to the structural framework 20. The shuttle plate 86 is preferably of a configuration as shown in FIG. 4, having the surface thereof formed to engage a vertical surface of a container and through lateral displacement along the guide rods 87 and 88, to effect displacement of a container from the infeed station 57 to either of the container supporting platforms. A downwardly projecting extension of the plate 86 is secured to guide bearings 90 and 91 which are slidably journaled on respective guide rods 87 and 88. Each guide bearing 90 and 91 is of sufficient length to provide the necessary stability for the shuttle plate 86 during its lateral displacement of a container. A pair of stops 92 are also mounted on the guide rod 87 and secured at an appropriate position thereon to limit movement of the shuttle plate to an extent where the shuttle plate will not interfere with operation of either container-elevating means 35, 45. Reciprocating movement of the shuttle plate 86 relative to the infeed station 57 is effected by a fluid actuator 504. This fluid actuator 504 comprises a cylinder mounted on a bracket 93 secured to the structural framework 20 and having an extendable piston rod 504R which is secured by a bracket 94 to the shuttle plate extension. This fluid actuator 504 is oriented in parallel relationship to the guide rods 87 and 88 and has a stroke length which is adequate to displace the shuttle plate 86 between the two positions illustrated in FIGS. 5 and 6.

In FIG. 3, the shuttle plate 86 is shown disposed at the left side of the infeed station 57. In this position, the piston rod 504R is fully retracted and the guide bushings 90 and 91 are in engagement with the left stops 92. In response to operation of the electrical and fluid control system, the fluid actuator 54 may be selectively pressurized to extend the piston rod and thus displace the shuttle plate 86 to the right of FIGS. 3, 5 and 6. Such displacement, upon extension of the piston rod 504R, is illustrated in FIG. 6 wherein the guide bearings 90 and 91 are displaced to the right into engagement with the stops at the right of the apparatus. Position-responsive control of the shuttle plate 86 is effected by two limit switches LS3 and LS4 which are shown in diagrammatic relationship to the apparatus in FIGS. 5 and 6. Each limit switch is provided with an actuating arm 95 and 96, respectively, which is adapted to engage the bracket 94. In FIG. 5, LS3 is seen to be actuated whereas in FIG. 6 limit switch LS4 has been actuated.

The container-elevating means 35 briefly described hereinbefore and as can be best seen in FIGS. 1, 2 and 3 includes the container-supporting platform 37 which is movable in a vertical direction by an elevator actuating mechanism, indicated generally at 38. This elevating mechanism 38 includes a fluid actuator 514 which is secured at one end to the structural framework 20 and has a verticaly extendable piston rod 514R which is adapted to extend from the opposite end and is connected by a bracket 101 to the base of the platform 37. Supporting the cylinder of the fluid actuator 514 on the structural framework 20 is an elongated cross bar 102 which can be seen in FIGS. 1 and 2 and which has the ends thereof secured to the structural framework. The cylinder 514 is pivotally connected at 103 to this cross bar. Guidance of the platform 37 along the desired vertical path is effected by a pair of vertically disposed guide rods 104 which are slidably disposed in a guide bracket assembly 105. As can be best seen in FIG. 1, this guide bracket assembly 105 comprises a vertically disposed mounting plate 106 which extends transversely of the apparatus and is rigidly secured to the structural framework 20. Secured to the plate 106 are two pairs of vertically spaced guide bearings 107 with each pair of vertically aligned bearings slidably receiving a respective one of the guide rods 104. In FIG. 1, only the lowermost guide bearings 107 can be seen with respect to the right filling station. An interconnecting yoke assembly 108 is provided for rigidly securing the lower ends of the rods 104 to each other.

The container-elevating means 45 for a left filling station comprises the same elements and functions in the identical manner. The elevating mechanism 48 comprises a fluid actuator 614 and an upwardly extendable piston rod 614R. The upper end of the piston rod 614R is connected by a bracket 111 to the base of the container-supporting platform 47. The lower end of the cylinder of the fluid actuator 614 is pivotally connected at 113 to the cross bar 102. Guidance of the container-supporting platform 47 in a vertical direction is also effected by a pair of vertically disposed and laterally spaced guide bars 114. These guide rods 114 are slidably disposed in pairs of vertically aligned guide bearings 117 which are also secured to the mounting plate 106 with the uppermost guide bearings shown in FIG. 9. The lower ends of the guide rods 114 are rigidly interconnected by a yoke assembly 118.

Positioning of the elevating mechanisms 38 or 48 in either an elevated or lower or bottom position is effective in providing for the sequential control of a filling operation with respect to the electrical control system. For this purpose, the electrical control system includes the pairs of limit switches LS6, LS8 and LS9, LS19. The switches LS6 and LS8 are secured to the structural framework 20 at a position to be responsive to positioning of the respective elevating mechanism 38 or 48 in a lower or bottom position. As can be seen in FIG. 1, each limit switch is provided with an actuating arm which is engageable with the respective yoke assembly 108 or 118 and is actuated when the respective elevating mechanism reaches its lower or bottom position. Limit switches LS9 and LS19 are provided to detect the position of the respective elevating mechanism when in an upper or elevated position. These limit switches are shown in FIG. 1 as mounted on plate 106 with each switch including an actuating arm that is engageable with a respective one of the yoke assemblies 108 and 118.

Each container-supporting platform 37 or 47 is of similar construction with the platform 47 being illustrated in detail on an enlarged scale in FIG. 9. This platform includes a horizontally disposed base plate 120 which is formed with a pair of sockets 121 at one end thereof for receiving the upper ends of the guide rods 114 which are securely fastened thereto. Mounted on the upper surface of plate 120 by suitable fastening means are container supporting frames 122 and 123. These frames are formed with inclined, container-supporting surfaces 124 and 125 with the frames relatively arranged to position the surfaces 124 and 125 in a 90° V-configuration similar to that of bracket 64 at the receiving station as shown in FIG. 4, for support of a container C at a corner. Each frame 122 and 123 is formed with an upwardly extending portion which terminates in a respective mounting surface 126 and 127 and which projects inwardly of the structure. The supporting frames 122 and 123 cooperatively define a rectangularly-shaped central open space which permits passage of a container through the opening with the mounting surfaces spaced apart for passage of the container fill opening A. The surfaces 126 and 127 are formed at a relative elevation on the base plate 120 to coincide with the fill opening of the container C positioned on the surfaces 124 and 125. Each supporting frame 122 and 123 may be formed from a metal casting with frame 122 having a central, vertically disposed stiffening rib 128 and frame 123 having vertical side walls 129 to provide adequate rigidity for the respective mounting surfaces 126 and 127.

Additional stability and support of a container C during a filling operation is provided by a latch mechanism, indicated generally at 140, and which is mounted on the surfaces 126 and 127 of the platform frames 122 and 123. Additional details of the latch mechanism 140 may be seen in the top plan view of FIG. 10. Each container C is of a type having a fill opening A integrally formed therewith and extending a distance outwardly from the angled corner of the container. The fill opening A comprises a short, cylindrical tube having an annular rib R formed on the outer surface thereof and in spaced relationship to the angled end surface of the container. The latch mechanism 140 is adapted to engage the fill opening A about the annular rib B and rigidly secure the fill opening to the container-supporting platform 47 during the filling operation. A container C will always be positioned on the platform in the same relative position with the fill opening also in the same relative position to the mounting surfaces 126 and 127. Accordingly, the latch mechanism 140 comprises a movable latch plate 141 which is slidably mounted on the surface 127 for horizontal movement between an inoperative or retracted position and a latching position, such as is illustrated in FIGS. 9 and 10. In the illustrated embodiment, this latch plate 141 comprises an elongated, flat plate having a U-shaped slot 142 formed in the forward end portion thereof and dimensioned to receive the cylindrically shaped tube of the fill opening A. An upwardly opening, L-shaped recess 143 is formed in the latch plate 141 around the periphery of the U-shaped slot 142 and is of a depth and width to receive the annular rib B of the fill opening A. Thus, the latch plate, when displaced to the illustrated operative latching position, extends around the fill opening A and underneath the annular rib R to provide the necessary vertical and lateral support for the container at the fill opening A during a filling operation. Additional support for the latch plate 141, when extended to the illustrated operative or latching position, is provided by a latch-receiving plate 144 secured by suitable means to the mounting surface 126. This latch-receiving plate 144 is formed with a leading edge portion 145 which is also adapted to project under the annular rib B of the fill opening and provide additional support and stability for the container. A pair of shallow recesses 146 are formed in the leading edge portion 145 to receive the forwardly projecting ends of the latch plate 141 and provide vertical support as well as lateral stability. For guidance of the latch plate 141 in longitudinal reciprocating movement, one end of the plate is slidably engaged by opposed guide ways 147 secured to the mounting surface 127 and slidably receiving longitudinal edge portions of the latch plate. Reciprocating movement of the latch plate 141 is effected by a fluid actuator 606 comprising a cylinder secured to the mounting surface 127 and having an extendable piston rod 606R. A free end of the piston rod 606R is secured to an upstanding bracket 148 formed on the latch plate 141. An elongated, longitudinally extending slot 152 is formed in the latch plate 141 to accommodate the fluid actuator 606 which is secured to the surface 127 and thus prevent interference with sliding movement of the latch plate.

The electrical control system is also responsive to the position of the latch plate 141 and accordingly includes a limit switch LS5 for detecting the latch plate when in a retracted or inoperative position. This limit switch LS5 is mounted on the supporting frame 123 centrally of the side walls 129 and is provided with an actuating arm 149 which is engageable with the latch plate 141. In the illustrated embodiment of the apparatus, the limit switch LS5 is mounted on the frame 123 in a position which places it below the mounting surface 127 and, accordingly, the frame is formed with an opening 150 through which a depending bracket or lug 151 the lower surface of the latch plate 141 extends and engages the actuating arm 149. The opening 150 which is of elongated slot form, extends parallel to the direction of movement of the latch plate 141 and is of a length to permit free movement of the latch plate. Switch LS5 is positioned so that the lug 151 will engage the actuating arm 149 at the time that the latch plate 141 is fully retracted.

Further stability for a container C during a filling operation is provided by a pair of vertically disposed compress plates 155 which are pivotally mounted on the platform 47 to be selectively rotated between a retracted position shown in broken lines in FIG. 9 and the illustrated extended position providing lateral support for the vertically disposed side walls of a container supported on the platform. Each compress plate 155 which is of the illustrated configuration as shown in FIG. 9, is mounted on a respective side wall 129 of the frame 123 by a pivot structure 156 for swinging movement in a vertical plane between the two illustrated positions. Swinging movement of the compress plates 155 is effected by a fluid actuator 608 having a cylinder secured at one end to the platform 47 and an extendable piston rod 608R which is pivotally connected to a bracket 157 secured to and interconnecting the pair of compress plates 155. An L-shaped bracket 158 rigidly secured to the base plate 120 of the platform 47 extends a distance downwardly from the platform and is provided with a mounting lug 159 at the lower end thereof which is pivotally connected to an end of the cylinder of the fluid actuator 608. Extension of the piston rod 608R rotates the compress plates 155 into the piston illustrated in full lines to provide lateral support for the side walls of the container C which is supported on the platform. Retraction of the piston rod 608R revolves the compress plates 155 to the position shown in broken lines where the space defined by the supporting frames 122 and 123 will not be blocked by the compress plates and a container may be transferred laterally through the opening formed by the supporting frames.

The electrical control system is also responsive to the relative position of the compress plates 155 and includes a pair of limit switches LS22 and LS25 for detecting the position of the plates. Each limit switch is provided with an actuating arm and respective cam roller 160 and 161 with the switches being positioned and mounted on the structural framework 20 in such a position as to be engaged by the compress plates. At least one of the compress plates 155 is formed with a camming surface 162 for engaging the cam rollers 160 and 161 and actuating the respective limit switches LS22 and LS25. It will be noted in FIG. 9 that the limit switch LS22 is positioned vertically above limit switch LS25 and will be actuated when the compress plates have been rotated to an intermediate position corresponding to approximately ½ the normal rotating movement whereas the limit switch LS25 will be actuated when the compress plates have bene fully retracted. The purpose of this arrangement of actuating limit switches at a one-half retract and full retract position of the compress plates will be more fully explained in the detailed description of the electrical system and operation.

The container supporting platform 37 of the right filling station is formed in a similar manner and includes a base plate 130 provided with sockets 131 for securely receiving the upper ends of the guide rods 104. A similar pair of supporting frames 132 and 133 are secured to the base plate 130 for supporting a container thereon. Each supporting frame 132 and 133 is formed with the respective upper mounting surfaces 136 and 137.

The right container-supporting platform 37 is also provided with a similar latch mechanism 170 comprising a latch plate 171 and a latch-receiving plate 174 with the latch plate being actuated by fluid actuator 506 as can be best seen in FIG. 11.

The latch plate 171 is formed with U-shaped slot 172 having an L-shaped recess 173 and the latch receiving plate 174 is formed with a leading edge portion 175 which engages the latch plate. The fluid actuator 506 includes a cylinder mounted on the surface 137 and an extendable piston rod 506R which is secured to the latch plate 171 by an upstanding bracket 178. The leading edge portion 175 of the latch-receiving plate 174 is adapted to extend under and engage the annular rib R of filling opening A of a container. Full retraction of the latch plate 171 is detected by a limit switch LS7 (not seen in FIG. 11) of the electrical control system having an actuating arm 179 which is engaged by and operated by a depending lug 181 formed on the latch plate and which extends through an opening 180 formed in the supporting frame 133.

The right container platform is also provided with a pair of compress plates 185 which cooperate to provide lateral support for the side walls of a container C supported on the platform 37. Although details of the construction of the compress plates 185 are not shown in the drawings, it will be understood that their construction is similar to that shown in connection with the container-supporting platform of the left filling station and will not be further described. These compress plates are actuated by a fluid actuator 508 which is shown in FIG. 18 and their position is detected by a pair of limit switches LS12 and LS15 shown in FIG. 19a. The operation of the fluid actuator 508 and the limit switches LS12 and LS15 is identical to that described in connection with the compress plates 155 and will be further explained in connection wtih the fluid actuating and control system and the electrical control system.

Subsequent to positioning of a container C on the container-supporting platform 37, the platform will be elevated to place the container C into filling relationship with the liquid-dispensing means 36. As previously described, the liquid-dispensing means 36 includes an elongated discharge nozzle 39 incorporating a filler valve and an actuating mechanism 40 for operation of the filler valve. The detailed structure of the discharge nozzle 39 and actuating mechanism 40 is best shown in FIG. 11. The actuating mechanism 40 includes an open-sided, main body housing 190 which is rigidly secured by suitable fastening means to a cross member 191 of the structural framework 20. Mounted on the upper end of the housing 190 is a fluid actuator 522 for operating the filler valve. This fluid actuator comprises a cylinder secured to the housing 190 as by the illustrated threaded engagement and including an extendable piston rod 522R which may be extended in a vertical downward direction. Preferably, the fluid actuator 522 which is of the double-acting type includes an internal compression spring 522S which biases the piston rod 522R to a retracted position. This assures that the filler valve will be maintained in a closed position irrespective of the condition of the fluid control and actuating system.

Secured to the lower portion of the housing 190 in depending relationship thereto is a liquid conduit which includes, as a first element thereof, a T-fitting 192 oriented with the branch portion projecting toward the rear of the machine and forms the inlet for liquid to the discharge nozzle. Secured to the lower end of the T-fitting 192 is the discharge nozzle 39 which is shown in section to facilitate description of the operation of the dispensing means. Interconnection of the T-fitting 192 with the housing 190, the discharge nozzle 39 and an inlet conduit 193 is preferably accomplished by the well known quick-release, clamp-type connectors 194 which engage and compress together flanged ends of the mating components thereby forming a liquid-tight seal. Since these components are in contact with the liquid, such as milk in the designed application of this apparatus, it is necessary that these components be readily disassembled for cleaning purposes. This objective is accomplished by the use of such clamp-type connectors.

Extending downwardly from the T-fitting 192 is an elongated tube 195 which is open at the lower end and forms a discharge orifice 196. The upper end of the tube 195 is secured to the T-fitting 192 by the connector 194 with adequate liquid seals provided so that liquid flow from the T-fitting 192 is restricted to the tube 195. Disposed in the lower end portion of the tube 195 is an axially movable valve element 197 which is connected and secured to an end of an actuating rod 198. The actuating rod 198 extends axially upward through the tube 195 and the T-fitting 192 into the housing 190. A liquid-tight seal element 199 is provided at the interconnection of the T-fitting 192 and housing 190 to receive the actuating rod 198 and permit axial reciprocating movement thereof. An enlarged end-extension 200 of the rod 198 projects upwardly from this seal element 199 and is mechanically coupled to the piston rod 522R by a coupling element 201. The mechanical coupling is preferably effected by a removable pin 202 which is adapted to project through aligned holes formed in the extension 200 and the coupling element 201. A spring retainer ring 203 is also preferably provided to maintain the pin 202 in proper position for coupling the elements and thus forms a readily removable connection to facilitate disassembly of the apparatus for cleaning purposes. It will also be noted that the coupling element 201 is formed with an inverted cup-like recess 201a adapted to receive the seal element 199 and thus forms a protective shroud which substantially prevents contaminating liquids from reaching the juncture of the seal element and shaft extension 200.

With the piston rod 522R fully retracted, as shown in FIG. 11, the valve element 197 will be positioned in the tube 195 in liquid blocking relationship to the discharge orifice 196 of the tube and prevent liquid flow through the orifice. Operation of the fluid actuator 522 to extend the piston rod will result in downward extension of the actuating rod 198 and displacement of the valve element 197 to the position indicated in broken lines wherein the discharge orifice will be open and thus permit liquid flow through the tube and into a container C. The movable valve element 197 may also be provided with a suitable sealing ring 204 to further assure a liquid-tight seal and prevention of liquid flow through the discharge nozzle.

An upper portion of the elongated tube 195 is provided with an elongated protective shroud 205 which is coaxially aligned with the tube 195. The shroud 205 is of tubular form and is secured at the upper end thereof to the elongated tube 195 at the clamp-type connector 194. Preferably, the shroud and tube are fabricated as separate units and maintained in coaxial relationship by the clamp fitting 194. This type of construction facilitates cleaning of the apparatus. In this construction, the tube 195 is of a length which is essentially twice the depth of a container C with which the apparatus is to be utilized and the shroud 205 is substantially one-half this length. The lower end of the shroud 205 is provided with an integrally-formed drip shield 206 which is of circular configuration having a peripheral, upturned rim section 206a with a portion of the rim section deformed to provide a drain spout 206b. The function of the drip shield 206 is to prevent contamination of the liquid, such as milk, through condensation of moisture on the various parts of the liquid-dispensing means. Moisture which does condense on the several components, such as on the exterior surfaces of the T-fitting 192 and the shroud 205, will be collected by the drip shield 206 and drained outwardly from the vicinity of the tube 195. The shield 206 is of sufficiently large diameter to extend a distance radially outward from the periphery of the fill opening A of the container C.

During a filling operation, a container C is supported on the platform 37 of the elevating means and from a lower position is elevated, as shown in FIG. 11, to the broken line position for initiation of a filling operation. This relative elevating of a container C inserts the tube 195 interiorly of the container through the fill opening A with the discharge orifice 196 disposed adjacent the bottom corner of the container. This procedure reduces frothing or foaming which may occur during dispensing of milk from the discharge orifice 196 and into the container. As the container is filled, the elevating means 35 operates to slowly lower the container at substantially the same rate as filling occurs to maintain the discharge nozzle orifice 196 in the same relative position to the upper surface of the liquid within the container. Thus, the tube 195 will be at least partially inserted at times within the container and liquid that is dispensed into the container with further protection against contamination provided by a telescopic shield 210. The telescopic shield 210 comprises an elongated tube coaxially mounted on the tube 195 and is axially slidable thereon. The upper end of the shield 210 projects interiorly of the shroud 205 and downward movement is limited by a removable clamp or stop band 211. The upper end portion of the shield 210 is formed with a radially projecting rib 212 which is engaged by radially inward projecting stop pin 213 carried by the stop band 211 and projecting through an opening formed in the shroud 205. The stop band 211 is of a construction readily permitting displacement or removal of the stop pin 213 from its blocking position for disassembly of the shield from the shroud 205 and tube 195 to facilitate cleaning. Relative rotation of the telescopic shield 210 and the shroud 205 is prevented by an interfitting rib and slot arrangement. A longitudinally extending, inwardly projecting rib 215 is formed in the wall of the shroud 205. Formed on the end of the telescopic shield 210 interfitting with the shroud 205 are a pair of spaced apart, longitudinally disposed lugs 216 which form a slot that slidably engages with the rib 215.

The lower end of the telescopic shield 210 is also formed with a drip shield 217 to further protect against contamination of the liquid dispensed into the container C. The shield 217 is also of circular configuration having an outer peripheral rim 217a which projects upwardly forming a catch basin for moisture or liquid that may condense on the exterior of the telescopic shield 210. This shield is of a circular diameter such that it will project a distance radially outward beyond the fill opening A of the container and thus prevent contaminants from entering the container through the fill opening. It will also be noted from FIG. 11 that the bottom surface 217b of the shield, which slopes downwardly to prevent inward drainage of liquid contaminants, is engageable with an upstanding pin 218 carried by the latch plate 171. Consequently, upward movement of the container C will displace the telescopic shield 210 upwardly with the fill opening A being effectively protected by the drip shield 217 during the filling operation without the weight of the shield 210 acting on the container fill opening A and possible resultant deformation. Subsequent lowering of the container C will permit the telescopic shield 210 to follow and maintain the shield in protective relationship with the fill opening A and prevent entrance of contaminants until the discharge tube 195 has been fully withdrawn from the container.

Although not specifically illustrated in the drawings, it will be understood that the foregoing description of the liquid dispensing means 36 is also applicable to the dispensing means 46 of the left filling station. The construction is identical and operation will be the same with the filler valve being actuated by a fluid actuator 622 as shown in FIG. 18.

Additional protection for the containers against contaminants is provided by a main drip plate 207 (see FIG. 2) which overlies the main body of the apparatus and is inclined downwardly toward the front of the apparatus. The lower edge of the drip plate 207 terminates in a drain trough 208 which can be seen in FIG. 1 extending transversely of the apparatus. Liquids collected by the drip plate 207 and collected by the trough 208 are conducted to a side of the apparatus by the inclined trough and subsequently routed through an outlet drain 209 which is in communication with a suitable receptacle or discharge means (not shown).

In the filling of containers with a liquid such as milk, it is necessary to monitor the volumetric flow to assure filling of each container with a proper amount. In this apparatus, the electrical control system is responsive to liquid flow and controls the filling operation in accordance with the volume of liquid dispensed into a container. The operation is such that when a container C has received the desired volume of liquid, the electrical system operates to stop further liquid flow and initiates the discharge sequence portion of the filling operation. Providing the necessary indication of volumetric flow into a container are the structurally similar flow-responsive devices 41, 51 for the right and left filling stations with the device 41 shown in detail in FIGS. 12 and 13. The flow-responsive device 41 utilized in the illustrated embodiment of the apparatus is preferably of a type utilizing an electromagnetic transducer to avoid direct mechanical contact with the liquid flowing into the containers to further minimize the chance of contamination. This flow-responsive device 41 comprises a flowmeter which is interposed in series in the inlet conduit 193 to the dispensing means and thus responds to liquid flow through the discharge nozzle. This inlet conduit 193 can be seen in FIGS. 1 and 2 with an upstream portion of the conduit having an inlet connection which is coupled to a fluid or liquid supply system. The upstream portion of the conduit 193 is shown as terminating in a common T-fitting 220 which is adapted to supply liquid to both of the filling stations.

The flowmeter, as is best illustrated in FIGS. 12 and 13, is of the oscillating piston-type comprising a housing 221 which is provided with a removable end closure cap 222 with an internal oscillating piston 223. A liquid measuring chamber 224 of generally circular configuration is formed in the housing 221 and opens at the side of the housing which is closed by the cap 222. A circular sealing element 225 disposed in a groove formed in an end face of the cap 222 provides a suitable liquid seal. Fastening means such as the four bolts and wing nuts 226 and 227 secure the end cap to the housing to permit disassembly of the flowmeter to facilitate cleaning. A cylindrical abutment 228 is formed on the inner wall of the housing 221 in concentric relationship to the liquid measuring chamber 224. A similar cylindrical abutment 229 is formed on the inwardly facing surface of the cap 222 in concentric alignment with the abutment 228. The piston 223 is also cylindrical and comprises an outer cylinder 230 formed with a central web 231 carrying a hub 232 in coaxial relationship to the outer cylinder. The hub 232 projects outwardly from either side of the web 231 and the web is formed with numerous small openings 233 to permit relatively free flow of liquid through the web. A tear drop shaped slot 234 is also formed in the web 231 and opens at the periphery of the outer cylinder 230 to receive a partition plate 235. The partition plate 235 projects transversely through the liquid measuring chamber 224 and extends radially between the outer cylindrical wall of the chamber 224 and the cylindrical abutments 228 and 229. Thus, the partition plate 235 effectively divides the measuring chamber with an inlet port 236 and an outlet port 237 being formed in the housing at opposite sides of the partition plate. Marginal edge portions of the partition plate 235 are disposed in grooves formed in the cylindrical abutment 228 and the outer cylindrical wall of the measuring chamber 224 to maintain the partition plate in a fixed position in the flowmeter. A guide or control roller 238 is rotatably mounted on a bushing 239 carried by an inwardly projecting pin 240 formed on the end cap 222. The control roller 238 is engaged by one portion of the piston hub 232 and guides the piston in a rotational movement within the measuring chamber.

A magnet structure 241 of circular configuration is disposed in a cylindrical cavity 242 formed in the face of the housing at the inner side of the measuring chamber 224 and in coaxial alignment with the cylindrical abutment 228. The magnet structure 241 is rotatably mounted on a stub axle 243 which is integrally formed with the housing 221. A radially extending slot 244 formed in the magnet structure 241 engages the opposite end portion of the piston hub 232 and circular movement of the piston 223, in response to liquid flow through the metering device, causes the magnet structure 241 to also revolve. The radial slot 244 accommodates the oscillatory movement of the piston 223 resulting from inflow of liquid through the inlet port 236, through the chamber 224 and out the outlet port 237 with this oscillatory movement causing the stub shaft 232 to revolve around the stub axle 243 and thereby rotate the magnet structure 241.

An electromechanical transducer 712 incorporated in the electrical control system is shown in FIG. 13 mechanically coupled with the flowmeter 41. This transducer is positioned to be responsive to the rotational movement of the magnet structure 241 and is operative to provide electrical impulses in response to the rotational movement of the magnet structure. Thus, the number of electrical impulses will be proportional to the liquid flow through the flowmeter. These electrical impulses are fed to a suitable pulse counting device and the number of pulses then determines subsequent or further operations of the apparatus with the number of pulses being indicative of the volume of liquid which has passed through the flowmeter and, in this instance, also through the liquid dispensing means 39 into a container C. Appropriate calibration procedures thus permit the apparatus to be set up to determine when a specific volume of liquid has flowed into a container. The flow responsive device 51 for the left filling station is provided with a similar electromagnetic transducer 722.

Subsequent to filling of a container with the desired quantity of milk, it is necessary to place one of the valved dispensing caps V on the fill opening A of the container. This step is accomplished while the container remains securely supported on a respective one of the container-supporting platforms 37 or 47. Application of a cap V is accomplished with respect to each filling station by respective capping means which is clearly illustrated in FIGS. 14, 15, 15a, 16 and 17 for the right filling station. This means includes a cap chuck assembly, indicated generally at 250, and cap-feeding means, indicated generally at 251. A quantity of the valved-dispensing caps V are provided at a convenient position relative to the operator's station which is normally immediately in front of the apparatus. These caps are initially deposited in a trough-like container 252 which is filled with a suitable sanitizing solution W. This container 252 extends transversely across the front of the machine as is best seen in FIG. 1 and is utilized to hold the caps V. In the operation of this apparatus, the caps V are manually placed on the cap-feeding means 251 where they are mechanically transported to a cap-loading station relative to the cap chuck assembly 250. At the cap-loading station, the caps V are sequentially transferred from the feeding means into the cap chuck which then, in accordance with a sequential operation determined by the electrical control system of the apparatus, applies a cap to the fill opening A of the container C that is supported on the container-supporting platform 37. The left filling station includes a similar cap chuck assembly 253 and cap-feeding means 254.

Referring specifically to FIG. 14, the cap-feeding means 251 is seen to include a pair of horizontally disposed, cap-supporting channels 255, 256 which are supported in spaced parallel relationship. The channels 255, 256 are oriented with the open sides facing each other and spaced apart a distance to receive a cap V therebetween with the circular cap base B projecting into and supported by the channels. The valved closure of the cap will thus project both above and below the channels and the caps are slidably moved longitudinally along the channels. These channels extend forwardly from a cap-loading station adjacent the cap chuck assembly 250 to the operator's station at the front of the apparatus with the end portions of the channels projecting a distance outwardly over the container 252. An operator manually picks the caps V up out of the sanitizing solution W in the container 252 and sequentially places them in the channels 255 and 256 for movement toward the loading station adjacent the cap chuck assembly 250. It will also be noted that a part of the upper portions of each of the channels 255 and 256 have been removed at the ends which overlie the container 252. This facilitates loading of the caps V onto the channels. In addition, a collector drain 267 is provided to receive the drainage of sanitizing solution from the caps V that have been loaded onto the channels. This drain 267 comprises a channel-form structure which is secured to the apparatus in underlying relationship to the channels 255 and 256 and projects over the container 252 to return the santizing solution W. The channels 255 and 256 are supported at each end by suitable connections to the structural framework 20 of the apparatus.

Longitudinal displacement of the caps V along the channels 255, 256 toward the loading station is effected by a revolving endless belt 257 trained about two pulleys 258 and 259. Both pulleys 258 and 259 are mounted on axles 260, 261 journaled on a supporting structure at a vertically elevated position above the channels 255 and 256. The vertical spacing of the shafts 260 and 261 relative to the cap sliding channels 255 and 256 is such that the lower horizontal run of the belt 257 will contactingly engage the upper portions of the caps as they are pushed under the belt and will thus displace the caps longitudinally along the channels. This is a frictional contact and the belt will merely slip relative to the caps when the channels are filled and thus assure that caps will be continuously fed to the cap loading station as required by the cap means. A mechanized drive provided for revolving the belt 257 comprises an electric motor M1 which is drivingly connected to the axle shaft 260 by a suitable gear reduction unit 262 and a chain belt 263 coupled with a gear (not shown) mounted on the shaft 260. In the illustrated embodiment, the motor M1 and gear reduction unit 262 are mounted on the supporting structure along with the pulley axles 260, 261 immediately above the pulley 258.

The belt 257 of the cap-feeding means 251 and underlying caps V are protected by a shield or housing 265 of inverted U-shape mounted on the supporting structure of the cap-feeding means and which protects the caps V from external contaminants. An auxiliary housing 266 is provided for the motor M1 and gear reduction unit 262 and is secured to the upper portion of the housing 265.

A cap lift mechanism 270 is provided at the discharge ends of the channels 255 and 256 for receiving the caps V individually and vertically elevating the caps into the cap chuck assembly 250. Vertical displacement of each cap V is effected by a cap lift 271 which is secured to the upper end of a vertically reciprocal rod 272. A vertically disposed mounting plate 273 rigidly secured to the structural framework 20 of the apparatus and provided with two laterally projecting lugs 274 and 275 provides guidance and support for the cap lift 271. The plate 273 is secured to the structural framework 20 by an intermediate bracket structure 276 which also supports one end of the channels 255, 256 of the cap-feeding means 251. The rod 272 projects through openings 277 formed in the respective lugs 274 and 275 with each opening being provided with a bearing bushing 278.

The cap lift 271 comprises a rectangularly-shaped block which is secured to the rod 272 by threaded engagement therewith and has a cap-receiving recess 279 formed in the upper portion. The cap-receiving recess 279 includes an enlarged, U-shaped, upwardly opening slot 280 which is of a configuration to receive the circular base B of a cap V. The slot 280 is of such a depth that a cap V will be supported on the cap lift 271 with the upper portion of the cap base B projecting a distance above the upper surface of the lift for engagement with the cap chuck assembly 250.

Vertical displacement of the cap lift 271 is effected by a fluid actuator 510 having a cylinder which is pivotally secured at the upper end to a bracket 281 through a pivotal connection 284. The bracket 281 is rigidly secured to the intermediate bracket structure 276. The fluid actuator 510 also includes a downwardly extendable piston rod 510R which is secured at the lower end thereof to the lower end of the rod 272 by an interconnecting yoke 282. The piston rod 510 is preferably connected to the yoke 282 by a pivot pin 283 to accommodate any relative misalignment of the fluid actuator 510 and the rod 272 which is supported in guide bearings. In its normal position, the fluid actuator 510 will have been actuated to extend the piston rod 510R to its extended position which will place the cap lift 271 in supported engagement with the uppermost, laterally projecting lug 274. In this position, it will be noted that the lower surface of the U-shaped slot 280 is aligned with the cap supporting surface of the channels 255 and 256 and a cap V may be slid from the channels into the slot 280 and will thus be supported by the cap lift 271. Actuation of the fluid actuator 510 will retract the piston rod 510R and thus push the cap lift 271 to a relatively elevated position. In this elevated position, the cap V will be forced into the cap chuck assembly 250 as will be subsequently explained.

In this position, it will be noted that the lower surface of the U-shaped slot 280 is slightly elevated relative to the cap-supporting, lower flanges of the channels 255 and 256 and a cap V will be supported on the cap lift 271 in upwardly displaced relationship to the next succeeding cap supported on the channels. The leading edge of the slot 280 is downwardly curved to facilitate transfer of a cap from the channels and onto the cap lift. This difference in relative elevation of two adjacent caps V in these positions has been found desirable with respect to the specific cap structure which is illustrated in the drawings. This specific cap structure incorporates an annular rib formed around the upper end of a cylindrical base B of the cap and which projects radially outward. Two caps in contacting engagement at this annular rib tend to buckle upwardly when force is applied in a lateral direction as in pushing the caps along the channels 255 and 256 and onto the cap lift 271 and would result in forcing a cap V upwardly and out of the slot 280 on the cap lift. This problem is eliminated with respect to caps of the illustrated structure since these ribs are not in contacting engagement with respect to a cap positioned on the cap lift.

Actuation of the fluid actuator 510 to retract the piston rod 510R will result in pushing the cap lift 271 to a relatively elevated position for loading or transfer of a cap into a cap chuck 335 of the cap chuck assembly 250. As will be readily apparent from the following detailed description of the structure and operation of the cap chuck 335, it is necessary that the cap lift 271 be accurately aligned with the cap chuck during the loading operation to prevent jamming and assure that a cap will be properly inserted into the cap chuck. To avoid any possible misalignment of the cap lift 271 and cap chuck 335, the rod 272 supporting the cap lift is formed with an annular channel 285 at a point intermediate its ends with the rod diameter at this channel being substantially less than the diameter of the upper bearing bushing 278. The channel 285 is formed at a point on the rod 272 which coincides with the upper bearing bushing 278 when the cap lift is fully elevated and thus provides a floating action permitting the rod to become displaced from its normal position and thus permit the cap lift to accommodate relative misalignment of the cap chuck 335. The cap chuck 335 is displaced transversely of the apparatus in performance of each capping operation as will be subsequently explained in detail and, as a result of such movement, the cap chuck may not be returned to the exact desired position relative to the cap lift at the conclusion of each capping operation. Any such resultant misalignment is accommodated by the channel 285 on the rod 272 with any necessary pivotal movement accommodated by the pivot pin 283 interconnecting the yoke 282 attached to the rod 272 and the piston rod 510R.

Alignment of the cap lift 271 with the cap chuck 335 is effected by a pair of guide pins 286 carried by the cap lift and projecting a distance upwardly from the upper surface of the cap lift. These guide pins 286 are formed with a rounded upper end portion to facilitates their insertion into receiving sockets 287 formed in the cap chuck and which can be best seen in FIG. 17. Each socket 287 is preferably provided with a bearing bushing 288.

As previously indicated, application of a cap V to a container C which has been filled and supported on the elevating platform 37 is accomplished by the cap chuck assembly 250. As can be best seen in FIGS. 15 and 15a, the cap chuck assembly comprises a transverse carriage 300 and a vertical carriage 301. The respective carriages accommodate transverse and vertical movement of the assembly as it is necessary to transport a cap V from the cap loading station (shown in full lines in FIG. 15) to a cap applying station (shown in broken lines in FIG. 15) and to also vertically displace the cap in applying the cap to the container. The transverse carriage 300 comprises an integrally formed structure including a vertical base plate 302 and two horizontally extending superposed arms 303 and upper and lower stiffening ribs 305. Formed at the upper and lower ends of the base plate 302 are respective bearing guides 304 provided with suitable bearing bushings 306 and adapted to receive respective horizontally disposed guide rods 308. The guide rods 308 are vertically positioned relative to each other and extend transversely of the apparatus with the opposite ends supported in suitable bearing brackets 310 attached to the structural framework 20. The guide rods 308 are positioned on the structural framework to support the cap chuck assembly 250 in relatively elevated relationship to a container C that may be supported on an elevator or platform 37 at the lowermost position. The transverse carriage 300 can be horizontally displaced along the guide rods between a check loading position and the cap applying position as is clearly shown in FIG. 15 with the displacement effected by a fluid actuator 526. The fluid actuator 526 includes a cylinder which is mounted on a supporting bracket 312 secured to the structural framework 20 and a horizontally extendable piston rod 526R secured to a lug 313 formed with the vertical base plate 302. Thus, extension of the piston rod 526R will displace the transverse carriage 300 from the position shown in full lines in FIG. 15 to that shown in broken lines.

Sequential operation of the various components of the apparatus is dependent on detecting the position of the cap chuck assembly 250 and the electrical control system includes a limit switch LS13 which is positioned on the apparatus to determine when the cap chuck assembly 250 is located over a container on the elevating platform and in position to perform a capping operation. This limit switch LS13 is secured to a vertical mounting plate 314 disposed at the center of the apparatus and secured to the structural framework 20. In addition to providing a suitable mounting for the limit switches, the plate 314 is connected with the guide rods 308 for additional support of the guide rods and greater stability of movement of the cap chuck assembly 250. An actuating arm 315 of the limit switch LS13 is engageable with an upstanding lug 316 which is also formed with the transverse carriage 300. As can be best seen in FIG. 15, displacement of the cap chuck assembly 250 to the left to a cap applying position will result in actuation of the limit switch LS13 as the lug 316 will have engaged and rotated the actuating arm 315.

Carried on the transverse carriage 300 for vertical movement relative thereto is the vertical carriage 301. The vertical carriage 301 comprises a channel form structure 320 having vertically extending side plates or flanges 321 and an interconnecting vertically disposed web 322. Secured to the rear face of the web 322 in vertically spaced and coaxially aligned relationship are two pairs of bearing guides 323. Each vertically aligned pair of guides 323 slidably receives an elongated vertically disposed guide rod 325 which are secured at the upper and lower ends in respective sockets formed in the outer ends of the arms 303 of the transverse carriage 300. Each bearing guide 323 is preferably provided with suitable bearing bushings 329 to facilitate vertical sliding movement of the vertical carriage 301 on the guide rods 325. Vertical movement of the carriage 301 is effected by a fluid actuator 528 comprising a vertically disposed cylinder pivotally connected at its upper end by a pin 332 to a bracket 330 secured to the upper arm 303. The fluid actuator 528 also includes a piston rod 528R which is vertically extendable in a downward direction and is connected at its lower end to a bracket 331 secured to the interconnecting web 322 of the vertical carriage. With the piston rod 528R fully retracted, as illustrated in FIGS. 15 and 15a, the vertical carriage 301 will be supported in its uppermost position. Extension of the piston rod 528R will displace the vertical carriage 301 to the lower position indicated in broken lines in FIGS. 15 and 15a. Alignment of the vertical carriage 301 with the container supporting platform 37 to assure proper positioning of a cap V on the container fill opening A is provided by a pin and socket arrangement. Each container supporting platform is provided with a vertically disposed, rounded end pin (153 in the case of the left platform 47 of FIG. 9) which extends a distance vertically upward from the upper surface (127) and is insertable into a socket (334 in the case of the right vertical carriage 301 of FIG. 15a) formed in the respective horizontal mounting plate (336).

Further control of the filling operation by the electrical control system is dependent on detection of the relatively elevated position of the vertical carriage 301. Detection of this carriage at the elevated position is accomplished by a limit switch LS11 having an actuating arm 333. As can be best seen in FIG. 15a, limit switch LS11 is mounted on the vertical mounting plate 314 at a relatively lower elevation to the switch LS13 in such a position that the actuating arm 333 will be engaged and displaced by the vertical carriage 301 when the vertical carriage is in the illustrated upper position at the center of the apparatus adjacent the mounting plate 314.

Secured to and projecting forwardly from the lower end of the vertical carriage 301 is the cap chuck, designated generally by the numeral 335. The cap chuck 335 is carried by a horizontal plate 336 which is secured to the side flanges 321 of the vertical carriage and projects a distance forwardly from between these flanges. As is more clearly shown in FIGS. 16 and 17, the cap chuck 335 comprises a main body which is secured to the mounting plate 336 by the cap screws 337. Formed in the main body portion is a cavity 338 which is closed at the top by the plate 336 and open at the lower end. Referring specifically to FIG. 17, it will be seen that the cavity 338 is formed of two cylindrical segments having the centers thereof relatively spaced apart thus forming an oval-shaped cavity for receiving the upper portion of a cap V. A downwardly opening recess 339 is formed in the lower surface of the cap chuck body around the periphery of a portion of the cavity 338 and is adapted to receive the upper portion of the cap base B. Preferably, the recess 339 is circular in cross section and of a diameter substantially the same as that of the cap base B and adapted to frictionally engage the cap. In order to increase the frictional engagement, the vertical wall of the recess 339 may be formed with an inwardly projecting annular rib 340 which will extend under an annular rib formed about the upper edge surface of the cap base B. The radially disposed bottom surface of the recess 339 engages the upper surface of the cap base B and thus enables the cap chuck to exert a downward force on a cap in order to forcibly apply the cap to a fill opening A of a container C. Also formed in the main body of the cap chuck 335 are the two guide pin sockets 287 which are provided with the bearing bushings 288.

The cap V is relatively dimensioned to the fill opening A to form a liquid-tight interference fit and thus a substantial force is required to apply the cap to the opening. The caps V are formed from a resilient plastic material to permit deformation during application of the cap and the most optimum position for applying force to the caps in forcing the caps onto the container fill opening A is adjacent the outer peripheral edge of the cap base B. Because of the angular disposition of the dispensing valve portion of the cap, as can be seen by reference to FIG. 16, a simple cylindrical cavity 338 may be formed so as to uniformly apply pressure or downward force about the complete periphery of the cap. Since a portion of the cap base B will thus be out of contacting engagement with the main body of the cap chuck 335, it is preferable that additional means be provided to also selectively engage the remaining arcuate portion of the upper cylindrical surface of the cap base B. This additional means comprises a cap chuck slide 341 which is formed from an elongated plate having an arcuately curved end edge 342. Preferably, the end edge 342 is chisel shaped as illustrated in FIG. 16 to assure that the slide 341 will readily move over the upper surface of the cap base B and a central, U-shaped slot 349 may be formed in the end edge to avoid interference with the cap. The opposed longitudinal side edges 343 of the slide are slidably disposed in elongated guideways 344 formed in an extension of the cap chuck body which projects laterally to the cavity 338. The guideways 344 may be conveniently formed by L-shaped recesses formed in the bottom of the cap chuck body and a cover plate 345 which is rigidly secured to the chuck body by suitable means (not shown). An elongated cavity 346 forming an extension of the cavity 338 is also formed in the cap chuck body to receive an upwardly projecting lug 347 formed on the slide 341 and permits longitudinal movement of the slide within this cavity. Selective movement of the slide 341 is effected by a fluid actuator 524 comprising a cylinder having one end thereof fitted into a supporting bracket 348 and an extendable piston rod 524R which is threaded into the lug 347. The fluid actuator 524 is also disposed in the elongated cavity 346 and the opposite end may be supported by the cover plate 345. Extension of the piston rod 524R will displace the slide 341 to the left in FIGS. 16 and 17 to the position shown in broken lines in overlying relationship to a cap base B.

It is also necessary that the presence of a cap V within the cap chuck 335 be detected to provide a signal for the continued sequential operation of the apparatus and for this purpose the electrical control system includes a limit switch LS14 having an actuating arm 350 which is adapted to be engaged and operated by a cap V when the cap is loaded into and is frictionally supported by the chuck. The limit switch LS14 is preferably mounted on one of the vertical flanges 321 of the vertical carriage 301 and the actuating arm 350 projects downwardly toward the cap chuck terminating in a contact finger 351. The contact finger 351 is transversely disposed to the actuating arm and projects through a slotted opening 352 formed in a side wall of the body of the cap chuck 335. As can be best seen in FIGS. 16 and 17, this slot 352 is angularly disposed and is generally aligned with the arcuate travel of the actuating contact finger 351. When a cap V is positioned in the chuck 335, the arm 350 is positioned as shown in full lines in FIG. 16 with the position of the arm when a cap is not in the chuck shown in broken lines.

The left filling station is also provided with a cap chuck assembly 355 and cap feeding means 356 similar in construction and operation to that described for the right filling station and, therefore, a detailed description will not be needed. The cap feeding means 356 includes its own electrical drive motor M10 and cap loading fluid actuator 610 which operate the same as the same components for the right filling station. The cap chuck assembly 355 includes a transverse carriage 357 operated by a fluid actuator 626 and a vertical carriage 358 operated by a fluid actuator 628. The positions of the carriages 357 and 358 are detected by the respective limit switches LS23 and LS21 which are incorporated in the electrical control system. A cap chuck 359 carried by the vertical carriage 358 includes a chuck slide 360 and a fluid actuator 624 for operating the slide. Presence of a cap in the left cap chuck is detected by a limit switch LS24 also incorporated in the electrical control system.

A discharge conveyor 23 extends transversely relative to the apparatus and is disposed in front of the apparatus adjacent to the operator's position. This conveyor may be of any suitable length for the particular installation and is adapted to receive the filled containers C as the filling operation is completed with respect to either filling station and the containers are ejected from the apparatus. In the illustrated apparatus, as will be subsequently explained in detail, the containers are ejected from the apparatus in an orientation which is rotated 90° from that orientation at which the containers are received by the apparatus. This results in placing the longer of the two sides of a container on a supporting surface and thus enhances the stability of the filled containers as they are discharged and transported away from the apparatus. In order to more readily accommodate the greater length, the conveyor 23 may comprise two relatively narrow endless belts 365 which are of a similar construction. These two endless belts 365 are trained about pulleys 366 and 367 rotatably supported at opposite ends of a supporting framework 368. One end of the framework 368 is attached to and supported by the structural framework 20 of the main portion of the apparatus while the opposite end or discharge end of the conveyor is supported by the upstanding bracket 26. An electric drive motor 702 is drivingly connected to one pair of pulleys 367 for revolving the belts 365 with this conection being made through a suitable gear reduction unit 369 and a sprocket gear and chain drive 370. A horizontally disposed guide bar 371 is arranged along one longitudinal side of the conveyor 23 and forms both a stop for the containers as they are discharged from the apparatus and guide as they are subsequently moved longitudinally along the conveyor. Suitable brackets 372 are provided for rigidly supporting the guide bar on the framework 368.

Subsequently to filling and capping of a container C that is supported on either of the container supporting platforms 37 or 47, the container is transversely displaced from the platform to a discharge station. This displacement of a filled container is effected through transfer of an unfilled container from the infeed station 57 to a respective one of the platforms by operation of the shuttle p'ate 86 as previously described. It is necessary that the relative orientation as when supported on the elevator apparatus initially support a filled container at the same platform before further rotating the filled container from the orientation shown in FIG. 7 to the discharge orientation shown in FIG. 7a. For this purpose, the discharge station for the right filling station includes a pivot plate 375, which is connected at one end by a hingle structure 376 to a horizontally disposed support plate 377. The support plate 377 is securely fastened to the structural framework 20 and is formed with an L-shaped cut-out portion for receiving the pivot plate 375. The plate 375 is normally positioned in an upwardly inclined position as shown in FIG. 7 in alignment with the surface 124 of a supporting frame 122 carried by the elevating platform. Thus, as a container is transversely ejected from the platform 37, it will be slid onto the support plate 377 and pivot plate 375 and will be supported at one corner and the plate 375 in the inclined position shown in FIG. 7. Subsequent rotation of the pivot plate 375 in a counterclockwise direction, as viewed in FIG. 7, will result in positioning of the plate within the L-shaped cut-out portion formed in the support plate 377 resulting in orientation of the container as shown in FIG. 7a.

Pivotal movement of the plate 375 is controlled by the relative vertical position of the container-supporting platform 37 as can be best seen in FIGS. 8 and 8a. The plate 375 is provided with an elongated lever arm 378 which is rigidly connected to the plate and extends in an upwardly inclined position at about a 90° angle to the plate 375. The outer end of the lever arm 378 is provided with a cam roller 379 which engages a cam follower 380 and which controls the movement of the arm 378 and plate 375. The cam follower 380 is secured to the container supporting platform 37 at a suitable angle to produce the desired rotational speed or rate of movement of the plate 375 in permitting rotation of the container C from the position shown in FIG. 8 to that shown in FIG. 8a. It will be noted that the center of gravity of the filled container will be to the left of the hinge structure 376 and the tipping movement will be produced by gravitational force. Consequently, as the container-supporting platform 37 is displaced upwardly by the associated elevating means, the plate 375 will be permitted to rotate in a counterclockwise direction to permit the container to tip from the position shown in FIG. 8 to that shown in FIG. 8a. Return of the container-supporting platform 37 in a downward direction at the conclusion of a filling operation will again bring the cam follower 380 into engagement with the cam roller 379. Continued downward movement of the platform 37 after initial contact of the roller and surface will result in clockwise rotational movement of the plate 375 from the position shown in FIG. 8a to that shown in FIG. 8 for receipt of a subsequently filled container.

After a filled container has been reoriented to the position shown in FIGS. 7a and 8a, it is necessary to displace the container from the position shown in FIGS. 7a and 8a onto the conveyor 23. This is accomplished by a push-off mechanism 385 which comprises a pusher plate 386 that is supported for reciprocating movement in a horizontal plane and longitudinally of the apparatus. The pusher plate 386 has an inclined upper surface portion 388 designed to avoid interference with a container while minimizing the stroke required for ejection of a container. Supporting the pusher plate 386 are a pair of horizontally disposed guide rods 387 which are slidably supported in a guide bearing block 389 which is rigidly secured to the structural framework 20 of the apparatus. The pusher plate 386 is rigidly secured to the ends of the guide rods 387 and an interconnecting yoke 390 secures the opposite ends of the rods together to form a rigid guide structure. Reciprocating movement of the pusher plate 386 is effected by a fluid actuator 512 having a cylinder secured to and supported by the guide bearing block 389 and having an extendable piston rod 512R which is connected at its free end to the pusher plate 386. Operation of the actuator 512 to extend the piston rod from the configuration shown in FIG. 7 will result in displacement of the container C from the plate 375 and support plate 377 and positioning of the container on the conveyor belts 365.

The operation of the fluid actuator 512 which is controlled in the first instance by the electrical control system is also subject to a fluid-mechanical interlock which prevents extension of the piston rod 512R until a container has been completely reoriented to the position shown in FIG. 8a. This interlock is provided by a mechanically actuated fluid valve AV2A which is connected in the fluid circuit with the fluid actuator 512 as will be more fully described. This valve is supported on the structural framework 20 in a position where a mechanical actuating stem 391 will be engaged by the pivot plate 375 when the plate is in the position shown in FIG. 8a.

The left filling station is also provided with a similar container orientating mechanism and push-off mechanism and these elements will not be described in detail as the construction and operation will be understood from the preceding description related to the right filling station. The orientating mechanism includes a pivot plate 395 pivotally connected to a support plate 397 by a suitable hinge structure. A lever arm 398 provided with a cam roller 399 which is engageable with a cam follower 400 carried by the left container supporting platform 47 controls operation of the plate 395. A fluid valve AV12A provides an interlock for operation of the left push-off mechanism 405. The left push-off mechanism includes a pusher plate 406 (see FIG. 2) which is reciprocated by a fluid actuator 612.

FLUID CONTROL AND ACTUATION SYSTEM AND OPERATION

Control and operation of the several elements and mechanisms of the filling apparatus is accomplished through a fluid control and actuation system. The elements and mechanisms are provided with fluid actuators of the cylinder and reciprocating piston type with the fluid actuators being controlled by fluid valves that are primarily of the electric solenoid type. An electrical control circuit is provided for operation of the valves in a predetermined sequence for automatic filling of the containers.

The general relationship of the several components of the fluid system is illustrated by the schematic diagram of the fluid system of FIG. 18. In this diagram, the fluid actuators are shown interconnected with the respective control valves in the fluid system. This filling apparatus is designed to fill containers at two stations with the same sequential operation as to each station necessitating duplication of the components with respect to each station with the exception of the empty container infeed and transfer components. Accordingly, the fluid system schematic illustrates the components associated with the respective right and left filling stations as well as the container infeed components which perform operations common to both filling stations. Fluid valves duplicated as to each filling station are designated by similar identifying indicia with the valves associated with the right filling station including the numerical suffixes 1, 2, 3, 4, 5, 6, 7, 9, and 10 with the basic alphabetic valve designator AV and the valves associated with the left filling station have the numerical suffixes 11, 12, 13, 14, 15, 16, 17, 19, and 20. Valves AV2 through AV8 and AV12 through AV18 are spool type, two position, four-way valves operated by two electric solenoids while valves AV9, AV10, AV19, AV20, and AV30 are spring return, spool type, three-way valves. Valves AV1 and AV11 are spring return, spool type shut-off valves which are actuated by electric solenoids. The spools of the two-position, four-way valves will remain in the last attained position due to the fluid pressure in the system. It will be noted that valves AV30, AV8 and AV18 are not duplicated and function in cooperation with both the right and left filling stations. It will also be noted that all fluid actuators are of the double acting, cylinder and piston type with the actuators associated with the right filling station identified by numerals in the 500-series and actuators associated with the left filling station identified by numerals in the 600-series.

A pressurized fluid supply for the system is provided which may comprise a conventional plant-air system and is connected to an inlet pressure conduit 500 of the apparatus system through a filter, pressure regulating and lubricating unit indicated generally at 501. Interposed in the inlet conduit 500 is a two-position, three-way valve AV30 actuated by an electric solenoid AV30–1 which is connected in the electrical control circuit and which controls pressurization of a branch conduit 500a. In the illustrated "off" position of valve AV30, the branch conduit 500a of the apparatus fluid system is exhausted to atmosphere to remove all pressure from the actuating components connected to the branch conduit 500a, which includes valves AV1–AV8 and valves AV11–AV18. A second branch conduit 500b is tapped into the inlet conduit 500 ahead of the valve AV30 and connects with the valves AV9, –10, –19 and –20 and maintains the connected components pressurized as long as the apparatus inlet conduit 500 remains connected to a pressurized fluid supply to assure that the valves in the liquid dispensing means remain closed. Branch conduits 500a and 500b are connected to a respective pressure port P of each of the several fluid control valves of the system with the exhaust ports E of each valve being open to the atmosphere. Although all exhaust ports of these valves are shown as independently vented to the atmosphere, it is to be understood that all exhaust ports may be vented through a common manifold.

Infeed of empty containers C to the filling apparatus is effected at a single infeed station 57 with the containers subsequently transferred to the respective filling stations. Performing the infeed operation is a fluid actuator 502 having a piston rod 502R. Attached to the piston rod 502R is a pusher plate 60 that is adapted to engage an empty container C at a receiving station located at the rear of the apparatus and, as a result of extension of the piston rod, advance the container forwardly along a central axis toward the infeed station 57. Upon retraction of the piston rod 502R, the pusher plate 60 will be returned to engage the next succeeding container that is advanced to the receiving station. Control over operation of the actuator 502 is effected by a two-position, four-way valve AV8 of the spool type operated by two electric solenoids AV8–1 and AV8–2 with the spool illustrated in the position as when displaced by energization of solenoid AV8–1.

At the infeed station 57, the container C, which was advanced in a vertical, upright position, is tilted to the inclined position illustrated in FIG. 4 to place the fill-opening A at the uppermost point. Subsequent to tilting, the container C may be displaced either to the right or left of the apparatus to the respective filling station as determined by the operational sequence of the apparatus at that particular time. Assuming that a container is to be supplied to the right filling station, the shuttle plate 86 would have been properly prepositioned at the left side of the infeed station 57 during a previous operational cycle. The shuttle plate 86 is fixed on the end of a piston rod 504R of a fluid actuator 504. Extension of the piston rod 504R to displace the shuttle plate 86 to the right along with the container C is effected by operation of a two-position, four-way control valve AV18 of the spool type which is operated by two electric solenoids AV18–1 and AV18–2. In this instance, the solenoid AV18–1 would have been energized thus positioning the valve spool for the indicated air flow resulting in extension of the piston rod 504R. When the piston rod 504R is fully extended, the container C will have been displaced laterally of the apparatus and onto the lift platform 37 of the right filling station.

Subsequent to positioning of a container C on the lift platform of the right filling station, the control system is actuated to initiate five concurrent operations. In one operation, the latch plate 171 of the right filling station is operated to engage the container C about the fill opening A and secure the container in proper position on the lift platform 37 for the filling operation. Movement of the latch plate 171 is effected by a fluid actuator 506 having a piston rod 506R attached to the latch plate. In FIG. 18, the latch plate 171 is shown as being retracted and the associated control valve AV4 is shown with the valve spool in the position attained subsequent to energization of solenoid AV4–2. Energization of solenoid AV4–1 will displace the valve spool to the opposite position resulting in fluid flow to extend the piston rod 506R thus placing the latch plate 171 in engagement with the container fill opening A and securing the container in proper filling position on the lift platform.

Concurrently, the compress plates 185 are swung from a retracted position to an operative position in supporting relationship to the side walls of a container C. Movement of the compress plates 185 between the retracted and compress positions is accomplished by the fluid actuator 508 having a piston rod 508R connected with the compress plates. Operation of the fluid actuator 508 is controlled by the valve AV3 which is shown with the valve spool in a position where the piston rod 508R will be retracted as a result of energization of solenoid AV3–2. Subsequent energization of solenoid AV3–1 shifts the valve spool to a position which results in extension of the piston rod 508R and swinging of the compression plates into supporting relationship to the container side walls.

Also concurrently with operation of the latch plate and compress plates to engage a container, a cap is loaded into the chuck through operation of the fluid actuator 510 having a piston rod 510R attached to the cap lift 271 of the cap loading mechanism 270. A cap V is loaded into the cap chuck 335 when the piston rod 510R is caused to retract and push a cap V vertically upward on the cap lift 271 from the cap feed means 251 and into the cap chuck 335. Operation of actuator 510 is controlled by a valve AV2 which is shown with the spool positioned as a result of energization of solenoid AV2–1 for causing the piston rod 510R to retract.

As a simultaneous operation and under control of valve AV2, a filled container C is ejected from the apparatus at the push-off station and positioned on the discharge conveyor 23. A filled container C, subsequent to capping at the filling station, is pushed laterally of the apparatus, off of the container supporting platform 37 and to the right in the case of the right filling station, by an incoming empty container and onto the push-off station through operation of the shuttle plate 86 in transferring an empty container from this infeed station 57 to the container supporting platform 37. Initially, the filled container is supported in the tilted position by the pivot plate 375 but is rotated to a horizontal position as the platform 37 is raised. This rotation to a horizontal position is relatively rapid and the container is ejected in this horizontal position by a fluid actuator 512 having a piston rod 512R carrying a pusher plate 386. Extension of the piston rod 512R results in ejection of the filled container in a forward horizontal direction onto the discharge conveyor 23. Retraction of the piston rod 512R returns the pusher plate to permit lateral transfer of a succeeding filled container to the push-off station from the container supporting platform 37.

Control over operation of both fluid actuators 510 and 512 is effected by the control valve AV2. Energization of the solenoid AV2–1 displaces the valve spool to a position where fluid will flow in the interconnecting lines to retract the cap loading piston rod 510R and extend the push-off piston rod 512R. Energization of solenoid AV2–2 will shift the valve spool to effect a reversal of the operation of the fluid actuators 510 and 512.

Operation of the actuator 512 may be delayed from the time that solenoid AV2–1 is energized by a mechanically actuated shut-off valve AV2A which is connected in circuit with the fluid conduit leading to the cylinder of fluid actuator 512. This valve is normally closed and prevents pressurization of actuator 512 until such time as the pivot-plate 375 with a filled container positioned thereon will have rotated a horizontal position even though valve AV2 has been positioned as previously indicated. As the pivot plate 375 reaches this horizontal position, an actuating stem 391 of valve AV2A is mechanically engaged by the pivot plate 375 and the valve is opened to permit pressurization of fluid actuator 512 and extension of piston rod 512R.

Another concurrent operation which is also controlled by the valve AV2 is the elevating or lowering of the container supporting platform 37 for a filling operation. Operation of the platform 37 is effected by a combined pneumatic-hydraulic system with vertical displacement of the platform obtained by a fluid actuator 514 having a piston rod 514R connected to the platform. The piston rod end of the actuator cylinder is connected to a port "B" of the valve AV2 while the opposite cylinder end is connected to a source of pressurized hydraulic fluid. The pressurized hydraulic fluid source comprises a reservoir 516 connected to port "A" of valve AV2 and containing a quantity of hydraulic fluid. Energization of solenoid AV2–1 results in pressurization of the hydraulic fluid reservoir 516 through the application of pneumatic pressure to the hydraulic fluid. A conduit 517 connects with the reservoir 516 at a point such that the end of the conduit will always be submerged in the hydraulic fluid and also connects with the head end of the actuator 514 through a restrictor valve assembly 518 and a conduit 519. The restrictor valve assembly 518 comprises a restrictor valve 520 of the variable choke type and check valve 521 connected in shunt relationship to permit free flow from the reservoir 516 to the actuator 514 while restricting fluid flow in the opposite direction. Connected in shunt relationship with the restrictor valve assembly 518 is a two-position, electric solenoid actuated shut-off valve AV1 spring biased to a free flow position and selectively actuatable to a closed position by a solenoid AV1–1. With valve AV2 actuated to apply pneumatic pressure to the reservoir 516, hydraulic fluid will be forced through the conduits 517 and 519 and valve AV1 to the actuator 514 thereby causing the piston rod 514R to be extended and elevate the platform 37. A small amount of hydraulic fluid may also flow through the restrictor valve assembly 518. Energization of solenoid AV2–2 will shift the valve spool and connect the reservoir 516 to the exhaust port while simultaneously applying pressurized air to the piston rod end of the actuator 514. This will cause retraction of the piston rod 514R and consequent lowering of the platform 37. With valve AV1 permitting free flow, the hydraulic fluid would return to the reservoir 516 at a relatively fast rate with consequent rapid lowering of the platform. Since it is desirable that the platform be lowered at a rate which corresponds to the filling rate, valve AV1 is actuated by energization of solenoid AV1–1 to the off position at the initiation of the filling operation which begins as the platform reaches its uppermost position and thereby limits return fluid flow to the restrictor valve 520. Through proper adjustment of the valve 520, the fluid flow rate may be controlled to limit platform lowering movement to the desired speed.

Subsequent to elevation of the container supporting platform 37 to its uppermost position and insertion of the discharge nozzle 39 into a container C, the filler valve element 197 will be displaced to open the discharge orifice 196 through operation of the fluid actuator 522 having its piston rod connected to the filler valve element operating rod 198. This actuator 522 is controlled by a pilot-operated fluid valve AV10 which is a spool type, four-way valve in which the spool is spring biased to a position that will result in retraction of the piston rod 522R and closing of the discharge orifice. Valve AV10 is operated by an air actuator AV10–1 which is controlled by a spring biased, spool-type, three-way pilot valve, AV9, and which is operated by an electric solenoid AV9–1. In the illustrated "Off" position, the pressure port P of valve AV9 which is connected to the pressure conduit 500a is blocked and the exhaust port E is connected in fluid flow relationship to the pilot air actuator AV10–1. In this situation, the filler valve piston rod 522R will be retracted and the valve element 197 will be supported in blocking relationship to the discharge orifice 196. Energization of electric solenoid AV9–1 will shift the spool of pilot valve AV9 resulting in pressurization of air actuator AV10–1 and connection of the fluid actuator 522 to the pressure conduit 500 to cause extension of the piston rod 522R and opening of the discharge orifice 196.

After completion of filling of a container C and lowering of the container supporting platform 37, a cap V is applied to the container fill opening A. As a first step of the capping operation, the chuck slide 341 is displaced to engage a cap V, previously loaded into the cap chuck 335 by operation of actuator 510 and frictionally secured in the chuck. The chuck slide 341 is operated by a fluid actuator 524 carried on the cap chuck 335 and having a piston rod 524R connected to the slide. Extension of the piston rod 524R results in positioning of the slide over a portion of the peripheral edge of the cap base B whch underlies the angled extensible spout structure. A downward force may thus be transmitted to the entire peripheral edge of the cap V during the application of a cap to the container by downward movement of the chuck. Controlling the fluid actuator 524 is a valve AV5 having the two electric solenoids AV5–1 and AV–2. Energization of solenoid AV5–1 results in extension of the piston rod 524R while energization of solenoid AV5–1 results in retraction of the piston rod 524R. After the cap is applied to the container, the solenoid AV5–2 is energized to retract the chuck slide 341 and thus permit raising of the chuck off of the cap which has been applied to the container.

In the second step of the capping operation, the cap chuck assembly 250 which carries the cap chuck 355 is displaced laterally of the apparatus as shown in FIG. 15 to a position directly over the filled container C supported on the platform 37 with the cap V aligned with the container fill opening A. Lateral displacement of the cap chuck assembly is effected by the fluid actuator 526 having a piston rod 526R connected to the transverse carriage 300. Operation of the fluid actuator 526 is controlled by the valve AV7 provided with two electric solenoids AV7–1 and AV7–2. Energization of solenoid AV7–1 will result in extension of the piston rod 526R to position the cap chuck 335 over the container. Subsequent to capping, solenoid AX7–2 is energized to retract the piston rod 526R and return the cap chuck assembly 250 to the cap loading position at the side of the apparatus.

When the cap chuck 335 is positioned over the container C, the chuck is displaced vertically downward to apply the cap to the container. Vertical movement of the chuck is accomplished by the fluid actuator 528 having a piston rod 528R connected to the verticle carriage 301 which carries the cap chuck 335. Controlling operation of the fluid actuator 528 is the valve AV6 having two electric solenoids AV6–1 and AV6–2. Energization of solenoid AV6–1 results in extension of the piston rod 528R and forcing of the cap onto the container fill opening A. Energization of solenoid AV6–2 results in retraction of the piston rod 528R and elevating of the vertical carriage 301 and cap chuck 335 prior to return to the cap loading station.

The foregoing description of the fluid operating system has been directed specifically to the right filling station. This description is also applicable to the left filling station which comprises the same operating elements with only the container shuttle 86 and infeed elements being utilized in common by both the left and right filling stations. Accordingly, this description is also applicable to the left filling station with the corresponding valve elements being similarly identified by a number in the tens units and other elements having a similar number in the 600 series.

ELECTRICAL CONTROL CIRCUIT AND OPERATION

For convenience of illustration, the electrical control circuit is divided into three units with the primary control circuit and power circuits included in detail in FIG. 19 and the secondary control circuits associated with the respective right and left filler stations shown in detail in FIG 19a and 19b.

The electrical interconnections of the secondary circuits of FIG 19a and 19b with the primary control circuit of FIG. 19 are indicated by the same numbered electrical conductors. Electrical power is supplied through a main disconnect switch S1 and the three main power conductors 700–a, –b, and –c for both of the conveyor motors and the control circuits. A main power fuse F1, F2, F3, is connected in each power line. This electrical power supply is indicated to be 240 volt, 3-phase for operation of the infeed conveyor motor 701 and the discharge conveyor motor 702. Independent control over the conveyor motors 701 and 702 is effected through separate motor contactors 704 and 705 with each motor contactor operated by a respective solenoid MC1 and MC2 connected in the primary control circuit. These contnactors 704 and 705 are provided with the usual overload contacts OL. Single-phase, low-voltage power for the control circuits is provided by a step-down transformer T1 having a high voltage primary winding T1P connected across two of the main power conductors 700–a and –c. A secondary winding T1S of this transformer provides electrical power at a relatively lower voltage for operation of the control circuits.

A main control circuit power switch S2 of the manually operated, two-position type having two sets of contacts S2A and S2B is connected in series with the output terminals of the transformer secondary winding T1S. This switch controls energization of the control circuits independently of the main disconnect switch S1 with a pilot light L1 connected across the control circuit electrical power conductors 706 and 707 to indicate when the switch contacts are closed. Protective fuses F4, F5 are series connected in each conductor 706, 707.

Operation of the motor contactors 704 and 705 is also under the control of the primary control circuit. The operating solenoids MC1 and MC2 for these contactors are parallel connected to each other and the parallel connectde solenoids are connected in series circuit with a single conveyor power switch S3 across the conductors 706 and 707. Closing of two position switch S3 will energize the solenoids MC1 and MC2, provided the control circuit power switch S2 is also closed, to operate the respective motor contactors and connect the conveyor motors 701 and 702 to the main power conductors 700 to initiate operation of the conveyors.

Before the filling apparatus can become operable, it is necessary to connect the fluid control and actuation system to a source of pressurized fluid, air in this instance. This is accomplished through energization of solenoid AV30–1 associated with the main air valve AV30 which opens the valve and opens the inlet conduit 500 to the pressurized air supply. Solenoid AV30–1 is connected in series-circuit with a two-position air-supply switch S4 across the power conductors 706 and 707 and one of the initial steps in placing the filling apparatus in operation is the closing of switch S4.

It is also necessary to activate each secondary control-circuit associated with a respective filler station which it is desired to operate. Either or both of the secondary circuits may be activated but it will be assumed that both circuits are to be activated and that both filler heads are to be concurrently operated. Activation of each secondary control circuit is accomplished by closing a respective two-position power switch S5, S15 which connects the circuits to the electrical power conductor 706 through the respective contacts S5A, S15A. Both secondary control circuits maintain a permanent connection to the electrical power conductor 70E. In addition to the contacts S5A, S15A, each power switch S5, S15 includes second contacts S5B, S15B connected in the opposite secondary control circuit which contacts are effective in permitting operation of each filling station without concurrent operation of the other as will be subsequently explained. Next, fill and cap feed motor switches S6, S16, also of the two-position type, are actuated with respect to each circuit to close the respective contacts S6A, S6B and S16A, S16B. Contacts S6A, S16A are connected in series with the respective cap feed motors M1, M10, and, when closed, enable these motors to operate. A reset switch S7, S17 of the pushbutton type having a normally open contact is also connected in series circuit with the switch contacts S6A, S16A and the coil 3CR, 13CR of a reset relay. Closing the reset switches S7, S17 energizes the relay coils 3CR, and 13CR and the cap feed motors M1, M10. A holding circuit provided for the relay coils 3CR, 13CR is connected in parallel with the reset switches S7, S17 and comprises the series connected, normally open relay contacts 3CR3, 13CR3 and the normally closed contacts S8A, S18A of respective stop switches S8, S18. Each stop switch S8, S18 is of the manually operated, pushbutton type having six sets of contacts and is included as a means of effecting an emergency stop in operations at any time during a filling sequence. Energization of each relay coil 3CR, 13CR will thus close the normally open contacts 3CR3, 13CR3 thereby forming a holding circuit which may be interrupted only through actuation of switch S8, S18. A pilot light L2, L12 is connected in parallel with each respective relay coil 3CR, 13CR to provide a visual indication of the activation of each secondary control circuit, which activation is completed by the sequential operation of the three switches S5, S15; S6, S16; and S7, S17.

In addition to activating each of the secondary control circuits, energization of the reset relay coils 3CR, 13CR also closes the respective normally open relay contacts 3CR2 and 3CR4, 13CR4 in the primary control circuit. Closing of these relay contacts will enable the primary control circuit to automatically perform the container feeding operation to either of the two filler stations.

Infeed of an empty container to the infeed station 57 is dependent on the availability of a container at the receiving station on the supply conveyor 22, the infeed station 57 being empty and the shuttle plate 86 being fully displaced to one side of the apparatus. The limit switch LS1 having a normally open contact located at the receiving station on the supply conveyor 22 detects the presence of a container at this point and, if a container is present, the contacts will be closed. The second condition, that is, the infeed station 57 being empty, is determined by the limit switch LS2 provided with an actuating member which detects the presence of a container at the infeed station. Limit switch LS2 has a normally closed contact LS2–1 and a normally open contact LS2–2 with the contact LS2–1 being connected in series with LS1. Limit switch contacts LS2–1 and LS2–2 are shown in the respective positions when the infeed station 57 is empty and the presence of a container at the infeed station will close LS2–2 and open LS2–1.

Determing the position of the shuttle plate 86 are two limit switches LS3 and LS4 which are disposed at the left and right side, respectively, of the apparatus. Both LS3 and LS4 include a normally open contact which is closed and held closed when the shuttle plate 86 is fully displaced to the respective side of the apparatus and is at the left or right stop 92. Connected in series with the limit switches LS3 and LS4 across the control circuit power conductors 706 and 707 are the coils of control relays 11CRTD and 1CRTD which include both a normal instantaneous relay function and a time-delay function. Each relay 11CRTD, 1CRTD is provided with the normally open contacts 11CR4 and 1CR4, respectively, that are operated in the normal instantaneous relay function. Contact 1CR4 is connected in series with contacts 13CR4, LS2X1 and LS1 and the solenoid AVX8–1 of the valve AV8 with this series circuit connected across the conductors 706 and 707. Contact 11CR4 is connected in series with contacts 3CR4 and LS2–2 and the coil of a time-delay control relay 18TD. This series circuit is also connected across the conductors 706 and 707 with the two series circuits being interconnected to form a common junction 708 between the contacts of limit switch LS2 and the contacts 1CR4, 11CR4.

Assuming that a container is at the receiving station on the supply conveyor 22 thus closing limit switch LS1, that the infeed station 57 is empty with LS2–1 and LS2–2 as as illustrated, and that the shuttle plate 86 is at the left stop with LS3 closed, a circuit will be completed to result in infeed of a container from the receiving station to the infeed station. Closing of LS3 in this situation energizes 11CRTD causing 11CR4 to close and complete a circuit through 3CR4, 11CR4, junction 708, LS2–1 and LS1 to energize solenoid AV8–1. Energization of AV8–1 actuates valve AV8 to cause extension of piston rod 502R of the fluid actuator 502 and displacement of pusher plate 60 in moving of a container to the infeed station 57.

After completion of movement of a container to the infeed station 57, the container will engage the actuating arm of LS2 and cause contact LS2–1 to open and contact LS2–2 to close. This operation of LS2 will deenergize solenoid AV8–1 and complete a series circuit through 3CR4, 11CR4, LS2–2 to the coil of timer relay 18TD. Relay 18TD is thus energized and initiates a time interval and, at the conclusion of this time interval, closes the normally open contacts 18TD1 which are series connected with the coil of a control relay 19CR with this series circuit being connected in shunt relationship to the relay 18TD. Relay coil 19CR is thus energized at a predetermined time after a container has been supplied to the shuttle station and provides a time interval necessary to assure stabilization of the container on the supporting bracket 64 at the infeed station 57. This time delay before initiating subsequent operations is required since the container is tilted from a vertical, upright position to an inclined position with the container fill opening A projecting vertically upward.

Energized simultaneously with relay 19CR is the solenoid AV8–2 which is connected in shunt relationship to relay 19CR. Solenoid AV8–2 actuates valves AV8 and, as previously described in conjunction with FIG. 18, causes the infeed piston rod 502R to be retracted. Retraction of the piston rod 502R returns the pusher plate 60 to the receiving station for receipt of a succeeding container supplied by the supply conveyor 22 preparatory to the next container infeed operation. This next infeed operation will not be initiated until the infeed station 57 is empty as determined by limit switch LS2 with the contacts LS2–1 and LS2–2 returned to their respective normally closed and normally open positions.

The above infeed sequence has been described on the assumption that the shuttle plate 86 is initially at the left stop 92 and that limit switch LS3 is closed. The same situation prevails if the shuttle plate 86 is disposed at the right side of the apparatus at the right stop 92 and limit switch LS4 is closed resulting in energization of relay 1CRTD and closing of contact 1CR4. Circuits for enabling of the infeed sequence are now completed through the 1CR4 contact as it will be noted that the series connected contacts 13CR4 and 1CR4 are connected in shunt relationship to the series connected contacts 3CR4 and 11CR4. In either instance, a container will not be fed to the infeed station unless the infeed station is empty and the shuttle plate 86 is at either the left or right stop 92.

Energization of relay 19CR closes the associated normally open relay contacts 19CR1 and 19CR2 which are connected in the respective left and right shuttle lockout and actuating circuits 709 and 710. These circuits are also included in the primary control circuit and are connected across the power conductors 706 and 707. The function of each circuit is to prevent operation of the shuttle plate 86 unless the several elements of the respective filling stations are in the proper configuration to receive a container. The configuration requirements for these elements are that the right or left container supporting platforms, 37 or 47 respectively, be at the lowermost position and that the associated latch mechanism 170, 140 be retracted. It was previously assumed that the shuttle plate 86 was at the left stop 92 and the right circuit 710 will be described in detail and the operation explained. Movement of the shuttle plate 86 is effected by the fluid actuator 504 with movement of the plate to the right of the machine resulting from extension of piston rod 504R. Controlling the fluid actuator is the valve AV18 which is operated by the solenoids AV18–1 and AV18–2 with these solenoids being connected to the left and right shuttle circuits 709 and 710, respectively. Referring to the right shuttle circuit 710, it will be seen that a number of series connected contacts are connected in series with solenoid AV18–2 and thereby provide control over the energization of the solenoid. These contacts include a normally open contact LS8–2 of limit switch LS8, normally closed contacts 4CR2 of control relay 4CR connected in the right secondary control circuit of FIG. 19a, normally open contacts 11CR3 and 19CR2 of control relays 11CRTD and 19CR and the normally closed contact 2CR1 of control relay 2CR. Limit switch LS8 is positioned on the apparatus to be responsive to the container supporting platform 37 when the platform is in its lowermost position and also includes a normally closed contact LS8–1. When the right platform 37 is at the lowermost position, switch LS8 will be actuated and contact LS8–2 will be held closed and contact LS8–1 will be held open. Assuming that contacts 4CR2 and 2CR1 remain closed, a circuit will be completed for energization of solenoid AV18–2 since relays 19CR and 11CR were previously energized as a consequence of the container infeed operation and contacts 11CR3 and 19CR2 will also be closed at this time. Energization of solenoid AV18–2 results in positioning of the spool of valve AV18 to cause extension of the piston rod 504R and movement of the shuttle plate 86 to the right and lateral transfer of a container from the infeed station 57 to the right platform 37. Should a previously filled container be positioned on the platform 37, movement of an empty container from the infeed station onto the platform will result in lateral displacement of the filled container from the platform to the push-off station. Contacts 4CR2 are controlled by a control relay 4CR incorporated in the right secondary control circuit shown in FIG. 19a and contact 4CR2 will be opened at any time a filling operation is in progress, as will be subsequently explained, to prevent the cap chuck assembly 250 from operating during the filling operation.

Control relay 2CR is connected in a second portion of the lockout circuit 710 and energization of the relay coil is controlled by a limit switch LS7 having a single normally closed contact and contact LS8–1 of limit switch LS8. This relay functions to lock out further operation of the shuttle plate 86 in transferring containers to the platform 37 and also functions to enable initiation of a capping cycle for the right filling station in proper sequence. Upward displacement of the container supporting platform 37 from its lowermost position results in opening of contact LS8–2 which deenergizes solenoid AV18–2 and, simultaneously therewith, closing of contact LS8–1 which completes a circuit for energization of relay 2CR. Relay 2CR, when energized, opens contacts 2CR1 to prevent subsequent energization of solenoid AV18–2 in a normal operational sequence until after the container has been capped. Thus, the lockout function of relay 2CR prevents displacement of the shuttle plate 86 to the right of the apparatus toward the platform 37 and prevents transfer of a container to the platform from the infeed station 57 at this point in the operating sequence. When the platform 37 is at its lowermost position during transfer of a container onto the platform, the latch plate 171 will be retracted and hold the contact of switch LS7 open. Subsequent displacement of the latch plate 171 into latching relationship to a container supported on the platform 37 results in closing of the contact of switch LS7 and, as soon as relay 2CR is energized by the closing contact LS8–1 through upward displacement of the platform 37, a holding circuit is formed for relay 2CR by limit switch LS7 and contacts 2CR2 which are now closed. Relay 2CR will now remain energized until the latch plate 171 is again retracted, which event will not occur until completion of a capping cycle, irrespective of the vertical position of the platform 37 and the fact that contact LS8–1 may be opened. The enable function of relay 2CR is performed by normally open contacts 2CR4 which are connected in the right filling station control circuit of FIG. 19a and closing of these contacts in response to energization of relay 2CR will permit activation of a container capping cycle as will be further explained.

It will be seen that the lockout circuit 709 for the left filling station comprises a circuit similar to that of circuit 710 and which functions in the same manner. The limit switches LS5 and LS6 are responsive to the positions of the latch plate 141 and container supporting platform 47, respectively, of the left filling station and the lockout function prevents movement of the shuttle plate 86 to the left of the apparatus while relay 12CR enables the left secondary control circuit of FIG. 19b to perform a capping cycle with respect to the left filling station through the relay contact 12CR4. In view of the circuit similarities, it is not deemed necessary to further describe this circuit and its operation except to note that solenoid AV18–1 will be energized by this circuit and reverse the fluid flow through valve AV18 resulting in retraction of piston rod 504R and movement of the shuttle plate 86 to the left side of the apparatus.

After completion of infeed and transfer of a container to the platform 37 of the right filling station as previously described, a filling operation with respect to that container may be initiated and a filling operation will be explained in detail with reference to FIG. 19a since it was assumed that a container was fed to the right container supporting platform 37. The filling operation is initiated by the concurrent actuation of the latch mechanism 170, compress plate 185, elevating of platform 37, cap-chuck loading mechanism 270, and push-off mechanism 385 in discharge of a previously filled container, if any, from the apparatus. These functions are initiated through energization of the three parallel connected valve solenoids AV2–1, AV3–1, and AV4–1. Connected in series with these solenoids are the series connected contacts S8A, 3CR3, 1CR2 and 1TD2. Of these contacts, S8A is normally closed and contact 3CR3 will have been closed due to the operation of the reset circuit relay 3CR as previously explained. Contact 1TD2 will remain closed for the time interval determined by relay 1CRTD with this time interval initiated at the transfer of a container to the platform 37 and the shuttle plate 86 is at the right stop 92 closing limit switch LS4. Closing of switch LS4 also results in the immediate closing of contact 1CR2 and a circuit is completed through these contacts for energization of the solenoids AV2–1, AV3–1 and AV4–1 and actuation of the respective valves for operation of the respective mechanisms as previously described in conjunction with the fluid system of FIG. 18. Alternatively to the automatic operating sequence just described, a filling cycle may be manually initiated through the momentary closing of the normally open pushbutton switch S9. This switch is connected in shunt relationship to contacts 1CR2 and 2TD2 and may be used to alternatively energize solenoids AV2–1, AV3–1 and AV4–1.

When the platform 37 completes its upward travel, a limit switch LS9 with a normally open contact and which is positioned on the apparatus to be actuated by the platform when the platform has reached its uppermost position, closes and completes a circuit to the control relay 4CR through the series connected contacts 3CR1. Normally open contacts 3CR1 were previously closed through energization relay 3CR which was energized during the reset operation when switch S7 was manually closed. Energization of relay 4CR results in closing of contacts 4CR1 and 4CR3 and opening of contacts 4CR2 in the right shuttle lockout circuit 710. Opening of contacts 4CR2 at this point prevents capping of a short-filled container which could otherwise occur if the platform 37 should be fully lowered prior to complete filling of the container. Closing of contacts 4CR3 resets an electronic counter 711 utilized in determining the proper liquid volume for complete filling of a container. This counter 711 senses a volumetric flow by means of a pickup head 712 coupled with the flow responsive device 41 and, after passage of a predetermined volume of liquid through the discharge nozzle 39 into a container, will operate to open a set of normally closed contacts 713. An internal power supply 714 in the counter provides 12 v. D.C. power for operation of the fill valve solenoid AV9–1. The counter 711 is supplied by the control circuit electrical system which is 115 v. A.C. During the counting sequence, contacts 713 remain closed and complete an electric circuit to solenoid AV9–1 through contacts 4CR1 which are now closed, contact S6B which was closed during energization of the secondary control circuit and a normally open limit switch LS10. Limit switch LS10 is positioned on the apparatus to be actuated by the platform 37 and held open when the platform is in its lowermost position thus preventing energization of solenoid AV9–1 and opening of the filler valve. Switch LS10 is so positioned relative to the platform 37 that the actuating element thereof will be engaged by the platform and hold the contact open as the platform is nearing its lowermost position. This point of actuation preferably coincides with the elevation to which the platform should be lowered when the container is filled with the desired volume of liquid. This assures closure of the filler valve irrespective of the container fill condition. Elevating of the platform 37 preparatory to initiating the filling operation permits closing of switch LS10 and energization of solenoid AV9–1 which will result in displacement of the valve element 197 and opening of the orifice 196 at the appropriate time.

Connected across the input terminals of the counter 711 and several of the contacts and relays is a noise and arc suppressor unit SUP. These units which are commercially available for this purpose are necessary to prevent the counter 711 from registering such spurious signals and resulting in an inaccurate fill.

Concurrently with resetting of the counter 711, a control relay 6CR is energized which results in closing of the normally open contacts 6CR1 serially connected with solenoid AV1–1 and normally open contacts 6CR2 which are connected in shunt relationship to limit switch LS9 and form a bypass or holding circuit. This holding circuit will maintain relay 4CR in an energized state to continue the filling operation as the platform 37 moves downward and switch LS9 opens until either switch LS10 opens or the counter 711 determines that the container has received the required volume of liquid and opens contacts 713. If the container does not receive a sufficient quantity of liquid as determined by the flow-responsive device 41 and counter 711, contacts 713 will remain closed and relay 6CR will remain energized although solenoid AV9–1 will be deenergized through opening of switch LS10 as the platform 37 approaches its lowermost position and thus stops further flow of liquid into the container. As long as relay 6CR remains energized, relay 4CR will also remain energized and hold contacts 4CR2 open in the lockout circuit 710 to prevent capping of a short-filled container.

Concurrently with energization of relay 4CR, a time-delay relay 5TD will be energized which controls the contacts 5TD1 and causes these contacts to be closed after expiration of a predetermined time interval after energization of relay 5TD. The series connected contacts 6CR1 and solenoid AV1–1 are connected in parallel with solenoid AV2–2 and this series-parallel circuit is connected in series with contacts 5TD1 and subsequently in series with switch LS9 and contacts 6CR2. Consequently, solenoids AV1–1 and AC2–2 will not be energized simultaneously with energization of relay 4CR which initiates the fill operation and delays lowering of the platform 37 for a period of time deemed adequate to start liquid flow into the container and cover the lower end of the fill tube 195. When the platform 37 does start to lower, valve AV1 will have been actuated to result in slowing or retarding of the downward movement as previously described in conjunction with the fluid system diagram of FIG. 18. Energization of solenoid AV2–2 also causes the fluid actuator 512 to retract the push-off plate 386 and the fluid actuator 510 to lower the cap lift 271.

The container fill operation will continue in normal operation until the counter 711 has determined that the container has received the desired volume of liquid, at which time, contacts 713 will be opened and result in deenergization of solenoid AV9–1 and closing of the discharge orifice 196 by the valve element 197. Also at this time, relay 6CR will be deenergized and contacts 6CR1 will open to deenergize solenoid AV1–1 and return the platform 37 to a fast-lower cycle.

Assuming that the fill operation is completed before the platform 37 is fully lowered, both contacts 6CR1 and 6CR2 are opened resulting in closing of the discharge orifice 196 by valve element 197 and deenergization of relays 4CR and 5TD. Deenergization of relay 5TD results in opening of contact 5TD1 without any time delay. Deenergization of relay 4CR results in closing of contacts 4CR2 and when the platform 37 is fully lowered closing contact LS8–2, a circuit will be completed to initiate a capping cycle. This circuit extends through contacts 3CR2, LS8–2, 4CR2, 2CR4, to that portion of the circuit which energizes the solenoids of the valves AV3, AV4, AV5, AV6, and AV7 which effect a capping operation. Limit switch LS12 is actuated by the compress plates 185 and is supported on the apparatus in such a position as to be actuated when the compress plates 185 are one-half retracted. At the initiation of the capping cycle, LS12 is not actuated with the compress plates 185 remaining in a position to provide support for a container on the platform 37 and contact LS12–1 remains closed. Limit switch LS13 is positioned on the apparatus to detect when the chuck assembly 250 has been moved into capping position over the container. Thus, contacts LS13–1 will be closed at the initiation of the capping cycle but will open when the chuck assembly 250 is in a position over the container where the cap may be applied to the container. Limit switch LS14 is positioned on the cap chuck assembly 250 and is provided with an actuating arm that is engaged by a cap V when the cap is loaded into the cap chuck 335. Previous energization of solenoid AV2–1 resulted in loading of a cap V into the chuck 335 with the consequent actuation of LS14 and closing of contacts LS14–1. At this time a circuit will be completed through normally closed contacts 7CR2, LS12–1, LS13–1 and normally open contact LS14–1 which is now closed and thus energize valve solenoids AV5–1 and AV7–1. Energization of valve solenoids AV5–1 and AV7–1 through the described circuit results in positioning of the respective valve spools and pressurization of the respective fluid actuators 524 and 526 to extend the respective piston rods 524R and 526R. Extension of piston rod 524R displaces the chuck slide 341 into a position to permit application of a downwardly directed force to substantially all peripheral portions of the cap base B. Energization of solenoid AV7–1 results in operation of fluid actuator 526 to extend the piston rod 526R and displace the cap chuck assembly 250 toward the center of the apparatus into a capping position over a container as shown in broken lines in FIG. 15.

At this point switch LS13 is actuated opening contact LS13–1 to deenergize solenoids AV5–1 and AV7–1 and closing the normally open contacts LS13–2. Contact LS13–2 is connected in series with valve solenoid AV6–1 and in series with the contacts 2CR4, 7CR2 and LS12–1, and, concurrently with deenergization of solenoids AV5–1 and AV7–1, solenoid AV6–1 will be energized. Solenoid AV3–2 which is connected in parallel with solenoid AV6–1 through normally closed switch contact S8C is also energized concurrently with AV6–1. Solenoid AV6–1 positions the spool of valve AV6 to pressurize fluid actuator 528 and extend piston rod 528R. Extension of piston rod 528R lowers the cap chuck 335 and applies a cap V to the container fill opening A. Solenoid AV3–2 positions the spool of valve AV3 to pressurize fluid actuator 508 and retract piston rod 508R. Retraction of piston rod 508R rotates the compress plates 185 from supporting relationship to the container.

As the compress plates 185 are retracted, limit switch LS12 will be actuated at the approximate mid point of the retraction cycle resulting in opening of contacts LS12–1 and closing of contacts LS12–2. Opening of contacts LS12–1 results in deenergization of solenoids AV6–1 and AV3–2 and closing of contacts LS12–2 completes a circuit to initiate a reversal in the movement of the cap chuck assembly 250. Connected in series with contact LS12–2 and contacts 2CR4 is the coil of a control relay 7CR having the normally open contacts 7CR1 and the previously described normally closed contacts 7CR2. Contacts 7CR2 will be opened when relay 7CR is energized and prevent energization of solenoids AV5–1, AV7–1, AV6–1, and AV3–2 at this point in the capping cycle. Contacts 7CR1 are connected in shunt relationship to the contacts LS12–2 and thus provide a holding circuit for relay 7CR when these contacts are closed.

Connected in parallel with relay coil 7CR is solenoid AV5–2 which will be concurrently energized and operate valve AV5 to pressurize fluid actuator 524 and retract piston rod 524R. Retraction of piston rod 524R withdraws the chuck slide 341 to permit raising of the cap chuck 335 from the cap V which is now secured to the container fill opening A. This operation occurs when the compress plates 185 are approximately one-half retracted to assure slide retraction at a time prior to subsequent raising of the cap chuck 335 off of the applied cap.

Full retraction of the compress plates 185 will permit continuation of reversing the capping mechanism through actuation of a normally open contact of limit switch LS15 which is positioned on the apparatus to be actuated by the compress plates 185 when fully retracted. Limit switch LS15 is connected in series with solenoid AV6–2 and will energize solenoid AV6–2 through contacts 7CR1 when the compress plates 185 are fully retracted. Energization of solenoid AV6–2 operates valve AV6 to pressurize fluid actuator 528 to retract piston rod 528R and raise the cap chuck 335 leaving the cap V on the container.

As soon as the cap chuck 335 is disengaged from the cap V, the cap detect limit switch LS14 returns to its normal position with contact LS14–1 open and contact LS14–2 closed. Contact LS14–2 is connected in series with the solenoid AV4–2 and a normally open contact of limit switch LS11 with this series circuit combination also being connected in series with contacts 7CR1 for receiving electrical power from the circuit. Connected in parallel with the series connected solenoid AV4–2 and limit switch contact LS14–2 is the solenoid AV7–2 which also will be energized upon closing of the contact of limit switch LS11. Limit switch LS11 is positioned on the apparatus in such a position that the contacts thereof will be momentarily closed when the cap chuck 335 is fully raised and the cap chuck assembly 250 is over the container. Consequently, solenoids AV4–2 and AV7–2 will not be energized until the cap chuck 335 is fully raised. Energization of solenoid AV7–2 operates valve AV7 to pressurize fluid actuator 526 to retract the piston rod 526R and return the cap chuck assembly 250 to the cap loading position. Energization of solenoid AV4–2 operates valve AV4 to pressurize fluid actuator 506 to retract piston rod 506R. Retraction of piston rod 506R disengages the latch plate 171 from the container fill opening A and thus releases the filled container for removal from the platform 37 of the filling station to the push-off station.

Retraction of the latch plate 171 opens the limit switch LS7 in the lock-out circuit 710 (see FIG. 19) and deenergizes relay 2CR. With relay 2CR deenergized, contacts 2CR1 close and thus enable the solenoid AV18-2 to be energized to displace a second container to the right and onto the platform 37 and initiate a second filling cycle. Contacts 2CR4 open thereby disconnecting all components associated with the capping sequence and prevent their inadvertent operation during the initial stages of the filling operation.

This completes a description of a filling sequence as it relates to the right filling station and it will be understood that the same sequential operation is followed by the left filling station in performing a filling operation. Similar components in the circuit associated with the left filler head are identified by a similar alphabetic and numerical designating system with the left filling station components assigned a number which is greater by a factor of 10. During the filling sequence as related to the right filling station, the shuttle was displaced to the right and closed limit switch LS4. Closing of LS4, energized relay 1CRTD as previously described and also resulted in closing of contacts 1CR4. This permitted feeding of a container from the receiving station to the infeed station 57 for feeding to the left filling station and, with a container again positioned on the infeed station, LS2 is actuated to initiate the transfer operation. The shuttle plate then moves to the left and closes limit switch LS3 resulting in energization of 11CRTD and initiation of the filling sequence as to the left filling station. The specific details of operation may be followed with reference to the previous description relative to the right filling station and will not be further described.

The filling operation will continue under automatic control of the control circuits with containers being filled at both filling stations. Each filling station is independently operable with the single infeed providing containers for both filling stations. Automatic operation will continue until the electrical power is removed by operation of any of the previously described switches or the stop switch S8 is actuated.

If the manual stop switch S8 is actuated at any time during a filling sequence, the operation of the right filling station will be suspended at that point and the various mechanisms returned to their standby positions. Contacts S8A will be opened and result in deenergization of relay 3CR as well as the valve solenoids AV2-1, AV3-1 or AV4-1, should any of those solenoids be energized. Contacts 3CR1, 3CR2, 3CR3, and 3CR4 will be opened to prevent continued sequential operation. Opening of contact 3CR1 deenergizes relay 4CR thus opening contact 4CR1 to deenergize solenoid AV9-1 and relay 6CR. This results in closing of the filler valve stopping further flow of liquid into the container. Contacts S8B will be closed and provide power to the elements of the capping mechanism to reverse the operation of the capping mechanism in the event that a capping cycle may have been initiated. Contacts S8D, S8E and S8F will also be closed to bypass the control limit switches in releasing the cap, raising the cap chuck 335 and returning the cap chuck assembly 250 to the loading position and retracting the latch plate 341. Contact S8C is opened to prevent electrical connection to solenoid AV6-1 and inadvertent lowering of the cap chuck 335. Opening of contacts 3CR2 in the shuttle lockout circuit 710 deenergizes the relay 2CR and contacts 2CR3 will close. Closing of contacts 2CR3 completes a circuit through S8B to energize AV2-2 and lower the platform 37. Operation of the manual stop switch S18 in the other secondary control circuit will have the same effect with respect to that circuit.

A filling operation may again be initiated after operation of stop switch S8 through operation of reset switch S7. The effect of closing reset switch S7 has been previously described.

It is also possible to operate only one filling station under automatic control of the respective control circuit. This is accomplished when only one secondary control circuit power switch S5 or S15 is turned on. Each switch is provided with a switch contact S5B, S15B which is connected in the secondary control circuit for the opposite filling station. These contacts are normally closed and are connected in series with a normally open contact 1TD1, 11TD1, which is controlled by the respective relay 1CRTD and 11CR. In the case of the right filling station, the series connected contacts S15B and 1TD1 are connected in series with valve solenoid AV18-1 and will bypass the left shuttle lockout circuitry 709 to energize that solenoid. Energization of solenoid AV18-1 will take place at the expiration of the time interval determined by control relay 1CRTD which results in closing of contacts 1TD1. This returns the shuttle plate 86 to the left side of the apparatus and closes limit switch LS3. Relay 11CRTD is again energized and closes contact 11CR4 to complete the circuits to feed another container to the infeed station 57. A container is not brought into the infeed station when the shuttle plate 86 is at the right because contacts 13CR4 are open since the left secondary control circuit of FIG. 19b has not been energized and relay 13CR has not been energized, and a circuit will not be completed to energize solenoid AV8-1.

The foregoing description of this invention has been limited to the basic apparatus without regard to auxiliary equipment, such as automated apparatus for supplying the empty containers or for packaging of the filled containers or marking apparatus for applying date or other indicia, which may be associated with the container filling apparatus. It is believed that such auxiliary equipment and the incorporation into a complete system will be readily apparent to those familiar with the container filling industry, whether related to the milk industry or some other commodity, and a description of such auxiliary equipment is not necessary for a complete understanding of the usefulness of this invention.

While the drawings and description have been directed to an embodiment of the apparatus designed to use a container of specific configuration, it will be understood that the invention may be embodied in apparatus which is capable of handling containers of modified configuration. It will also be noted that the cap closure for the containers need not be of the illustrated valved type and may comprise a closure member without a valve structure.

The apparatus with respect to the illustrated embodiment of the invention was described as being connected to a single liquid supply through the conduit T-fitting 220. This single supply point provided liquid to both liquid dispensing means 35 and 45 irrespective of whether the apparatus is operating in a dual mode or a single mode. While the dual operating mode provides maximum capability with a single type liquid, the apparatus may be readily adapted to simultaneously fill containers with dissimilar liquids through the simple and obvious expedient of connecting the inlet conduit 193 of each filling station to a respective, independent liquid supply. This versatility of operation is possible since the two filling stations are fully independent subsequent to transfer of a container to the respective filling station.

Operation of the illustrated embodiment of the invention in the single mode has been described, and it will be readily apparent from the foregoing detailed description that a container filling apparatus may be constructed with only one filling station. Construction of a single station apparatus would merely entail omission of those components associated solely with the second, undesired station, which components will be readily apparent from the independent character of each filling station, and omission of those portions of the electrical control system which merely perform interlock junctions as between the two stations. These portions of the electrical control system that could be omitted from a single filling station apparatus, will be clearly seen from a consideration of the electrical circuit diagrams and the associated portions of the description.

Further simplification of the apparatus, particularly with respect to an apparatus of the single filling station type, is contemplated through omission of the infeed mechanism which mechanically supplies the empty containers to the infeed station. For small production runs such as would be the situation with a single station type apparatus, the empty containers may be manually supplied to the infeed station by the operator or a simple gravity feed arrangement of a construction well known to those familiar with this art may be easily incorporated into the apparatus.

A modified cap chuck 410 illustrated in detail in FIGS. 21 and 22 incorporates a mechanical cam stop 411 which performs the same function as the chuck slide 341 in the cap chuck 335 illustrated in FIGS. 16 and 17. This mechanical cam stop 411 is operated by the force of gravity and a cap V when the cap is inserted in the chuck and eliminates the need for a fluid actuator such as element 524 in the cap chuck 35 of FIGS. 16 and 17 and the associated electrical control system components necessary for the fluid actuator. This modified cap chuck also comprises a main body which is secured to the mounting plate 336 by the cap screws 337 and is thus movable transversely of the apparatus between the cap loading position and the container capping position. Formed in the main body is a cavity 412 which opens at the lower surface and is configured to receive the caps V that the apparatus is designed to utilize. Referring specifically to FIG. 22, it will be seen that the cavity is formed of two cylindrical segments with one segment vertically oriented and the other angularly disposed to receive the angled valve structure of the cap. A downwardly opening recess 413 is formed in the cap chuck body around a portion of the vertical cylindrical segment of the cavity 412 for receiving the upper end portion of the cap. An inwardly projecting rib 414 is formed around the peripheral wall of the recess 413 for cooperatively engaging an annular rib formed on the cap V to increase frictional engagement for more positive support of the cap. A pair of sockets 415 provided with bearing bushings 416 are formed in the chuck body adjacent one end for receiving the alignment or guide pins 286 of the cap lift 271.

The mechanical cam stop 411 is journaled on a horizontally disposed pivot pin 417 which extends through a socket 423 formed in the chuck body with the pin being secured in the socket as by a friction fit to assure retention. The stop 411 is of a U-shaped configuration having two spaced apart stop members 418 and an actuating bar 419. Each stop member 418 is L-shaped having a horizontal leg adapted to project over the upper surface of a cap as shown in FIG. 22 and thus transmit a downwardly directed force to a cap V during a capping operation. Two vertical slots 420 are formed in the chuck body to receive a respective one of the stop members 418 with the slots being of a depth to permit swinging movement of the stop members to the position indicated in broken lines. The actuating bar 419 extends parallel to the pivot pin 417 and is connected at each end by arms 421 to a respective one of the stop members 418 with the arms and stop members orthogonally disposed. The arms 421 are of a length to position the actuating bar 419 interiorly of the cavity 412 in a position to be engaged by the cap V as it is inserted into the chuck 410 to swing the mechanical stop 411 from the broken line position to the full line position with the stop members 418 in engagement with the top of the cap. Upon removal of the cap V from the chuck, the actuating bar 419 will be acted upon by gravity and swing downwardly, or in a counterclockwise direction with respect to FIG. 22, to swing the stop members 418 to a position where the cap may be freely withdrawn from the cavity 412. An inclined slot 422 is formed in the side wall of the chuck body to receive the contact finger 351 of limit switch LS14. This slot and contact finger are the same as previously described in conjunction with the cap chuck 335 shown in FIGS. 16 and 17.

The apparatus previously described is designed to discharge the filled containers in a horizontally oriented configuration to satisfy a particular subsequent packaging operation. The modification of the apparatus as shown in FIGS. 20, 23, 23a and 23b is designed to reorient the filled containers to the vertical configuration as in the previously described infeed operation. A vertical discharge orientation simplifies the apparatus and is also necessary for other types of subsequent packaging operations. Referring to FIGS. 20 and 23, which are related to the right filling station but with the structure and description also being applicable to the left filling station, it will be seen that the push off station of the apparatus includes a single horizontal support plate 425 which extends forwardly to the discharge conveyor 23 and is mounted on the structural framework 20 of the apparatus at an elevation coinciding with the base of the container supporting platform 37 to receive a filled container as it is displaced from the platform. Discharge of a filled container C received on the plate 425 to the conveyor 23 is effected by a push-off mechanism 426 similar to that previously described. The modified push-off mechanism 426 also includes pusher plate 427 but is of modified form comprising a flat, rectangularly-shaped plate mounted on the ends of the two guide rods 387 slidably supported in the guide bearing block 389. Horizontal reciprocating movement of the pusher plate 427 is effected by the fluid actuator 512 having the piston rod 512B connected to the pusher plate. With the piston rod 512B fully retracted, the pusher plate 427 will be positioned adjacent the rear of the container supporting platform 37 as shown in FIG. 23 to permit lateral displacement of a container C in a tilted configuration onto the support plate 425 of the push-off station.

Continued support of the container C in this tilted position is provided by an elongated tilt bar 430 disposed in a horizontal plane a distance above the support plate 425 and extending transversely of the apparatus. The tilt bar 430 is mounted on a supporting bracket 431 which is secured to the intermediate bracket structure 276 and positions the tilt bar at a relative elevation to plate 425 to engage the container C at a point adjacent the uppermost corner which is provided with the fill opening A and cap V, as shown in FIG. 23. The lower container-contacting corners of the bar 430 are preferably rounded to prevent damage of the container during the tilting operation. After a container C has been displaced to the push-off station, the fluid actuator 512 is pressurized through sequential operation of the control systems causing extension of the piston rod 512B and forward displacement of the pusher plate 427 or to the left in FIGS. 23, 23a and 34b. This forward movement of the pusher plate 427 which initially engages a corner of a container C moves the lower end or bottom of the container forwardly while the upper corner is supported on and restrained by the tilt bar 430 with the container attaining the position shown in FIG. 23a during the initial stages of the push-off operation. Further forward movement of the pusher plate 427 will continue the rotational reorientation of the container until the container is vertically oriented as shown in FIG. 23b. During the transition from the position shown in FIG. 23a to the position shown in FIG. 23b, the tilt bar 430 will become disengaged from the container since the longitudinal dimension of a container is less than its diagonal dimension and the bar 430 is positioned at an elevation which will clear the top of the container and valve V with the container vertically oriented position. Discharge of a container in this vertically oriented position may then be completed with the container passing beneath the tilt bar 430 and the pusher plate 427 in engagement with a vertical side wall of the container.

The above modifications as to the structure of the cap chuck 410 and the vertical discharge orientation also require some changes in the fluid and electrical control systems. FIG. 24 illustrates the modified fluid system with the same components being numbered the same as in FIG. 18 as these components are of the same structure and junction in the same maner. Reference may be had to the previous portions of the specification relating to FIG. 18 for an understanding of the operation. The distinctions to be noted with respect to the modified fluid system are the omitted components. Since the cap chuck 410 is provided with a mechanical cam stop 411, the modified chuck does not require a fluid actuator and the actuators 524 and 624 have been omitted along with their respective control valves AV5 and AV15. Vertical reorientation of the container eliminates the need for the interlock valves AV2 and AV12A previously connected in circuit with fluid actuators 512 and 612 of the respective push-off mechanisms. Accordingly, these valves have been omitted from the fluid circuit diagram of FIG. 24 and the fluid actuators 512 and 612 shown properly connected into the fluid system.

Changes necessary in the electrical system are restricted to the secondary control circuits shown in FIGS. 19a and 19b with only the modified portions of these circuits being illustrated in FIGS. 25a and 25b. The modified portions of the circuits shown in FIGS. 25a and 25b are substituted for the portions of the circuits shown in FIGS. 19a and 19b which relate to the capping operation and appear below the respective lines 25a—25a and 25b—25b in the respective figures. As in the fluid system, the changes in the electrical system are primarily omitted elements or components. Omission of the fluid actuator for the cap chuck eliminates the need for the valve solenoids AV5-1 and AV5-2 in FIG. 25a and valve solenoids AV15-1 and AV15-2 in FIG. 25b and also eliminated the need for a delay time for the reverse capper sequence. This latter delay time was provided by the ½-retract compress limit switches LS12 and LS22 and the relays 7CB and 17CB and these components have also been omitted from the modified circuit portion of FIGS. 25a and 25b. Limit switches LS15 and LS25 are also changed from their previously described circuit connections and are now provided with respective normally closed contacts LS15-1, LS25-1 and normally open contacts LS15-2 and LS25-2 but the switches are still responsive to full retraction of the respective compress plates 185 and 155.

Referring specifically to FIG. 25a and assuming that the operational sequence has progressed to the point that a container has been filled with the proper volume of liquid and the container supporting platform 37 has returned to its lowermost position, switch LS8-2 and relay contacts 4CR2 will be closed and complete a circuit to the contacts 2CR4 which are also closed. Switch LS14-1 will be closed assuming a cap V will be loaded into the chuck 410 and switch LS13-1 will be closed since, at this point in the operation, the cap chuck assembly 250 will be at the right of the apparatus over the cap loading station. At this time the compress plate 185 will be extended and limit switch LS15 will not be actuated and switch contact LS15-1 will be closed. Switch contact LS15-1 is connected in series with the valve solenoid AV7-1 through switch LS13-1 and the now closed switch LS14-1 and a circuit will be completed for energization of solenoid AV7-1 and initiation of a capping cycle. Energization of solenoid AV7-1 operates valve AV7 to pressurize fluid actuator 526 to extend the piston rod 526R and displaced the cap chuck assembly 250 toward the center of the apparatus into overlying relationship to the container in the container supporting platform 37. When the cap chuck assembly 250 reaches the over-container position, limit switches LS13 and LS11 will be actuated with switch contact LS13-1 opening to deenergize valve solenoid AV7-1 and switch contact LS13-2 closing to energize valve solenoids AV6-1 and AV3-2. Although switch LS11 would also be closed at this particular instant, since the vertical carriage 301 would be in an "up" position, operation of this switch would be ineffective at this time as this switch is not connected to energized conductors due to the open configuration of switch contact LS15-2 and to switch and relay contacts 58B and 2CR3. Energization of valve solenoid AV6-1 operates valve AV6 to pressure fluid actuator 528 in extending piston rod 528R and lowering of the vertical carriage 301 and the attached cap chuck 410 to apply a cap to the fill opening of the container. Simultaneously, energization of valve solenoid AV3-2 operates valve AV3 to pressurize fluid actuator 508 in retracting piston rod 508R and the compress plates 185.

When the compress plates 185 are fully retracted, limit switch LS15 will be operated to open switch contact LS15-1 resulting in deenergization of valve solenoids AV6-1 and AV3-2 and to close switch contact LS15-2. Closing of switch contact LS15-2 will result in energization of valve solenoid AV6-2 which will operate valve AV6 to pressurize fluid actuator 528 to retract piston rod 528R and raise the vertical carriage 301 along with the cap chuck 410. Limit switch LS11 will not be actuated until the vertical carriage 301 is raised but at that time will be actuated to close its contacts. As the vertical carriage 301 was raised, limit switch LS14 operated to open contact LS14-1 and close contact LS14-2 since the cap remained on the container. Consequently, closing of switch LS11 simultaneously energizes valve solenoids AV4-2 and AV7-2 which operate the valves AV4 and AV7 to pressurize the respective fluid actuators 506 and 526 to retract the piston rods 506R and 526R thereby disengaging the latch plate 171 from the container fill opening A and will operate valve AV6 to pressurize fluid actuator 528 to retract piston rod 528R and raise the vertical carriage 301 along with the cap chuck 410. Limit switch LS11 will not be actuated until the vertical carriage 301 is raised but at that time will be actuated to close its contacts. As the vertical carriage 301 was raised, limit switch LS14 operated to open contact LS14-1 and close contact LS14-2 since the cap remained on the container. Consequently, closing of switch LS11 simultaneously energizes valve solenoids AV4-2 and AV7-2 which operate the valves AV4 and AV7 to pressure the respective fluid actuators 506 and 526 to retract the piston rods 506R and 526R thereby disengaging the latch plate 171 from the container fill opening A and returning the cap chuck assembly 250 to the right of the apparatus to the cap loading position. This completes a capping operation.

From the foregoing brief description of the modified circuit portion shown in FIG. 25a and its operation, it will be seen that the modified cap chuck 410 eliminates the need for a delay in operation that was previously required for retraction of the cap chuck slide. The modified circuit portion shown in FIG. 25b is similar to that of FIG. 25a and the operation thereof will be readily understood from a consideration of the preceding description.

It will be readily apparent from the foregoing detailed description of an apparatus, embodying this invention, that this invention provides automated mechanical filling of containers which otherwise would require manual handling of the containers. The invention provides automatic sequential control of the filling operation including the proper orientation of the containers prior to filling and subsequently in preparation for discharge from the apparatus. Mechanisms are provided for securely supporting each container throughout the filling operation which substantially prevents jamming of the apparatus which could result from improper positioning of the containers at various stages throughout a filling operation. Mechanical-electrical interlocks are provided which prevent continuation of a filling operation should a malfunction occur such as an incorrect volume of liquid dispensed into a container. The interlocks also assure operation of the various components in proper sequence to complete a filling operation. The volume of liquid dispensed is determined by a flow-responsive device which incorporates an electromagnetic transducer element that does not require physical contact between the liquid being measured and an external indicating device and thus eliminates a source of contamination.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. Apparatus for filling of containers having a fill opening adapted to receive a closure cap and comprising
   (A) liquid dispensing means connected to a liquid supply and which includes
      (1) a liquid discharged nozzle insertable into a container to a predetermined depth through the fill opening thereof, said discharge nozzle being vertically disposed and having a selectively operable, valved discharge orifice at the lower end thereof, and
      (2) liquid quantity measuring means responding to the liquid dispensed into a container through said discharge nozzle and forming a control signal indicative of liquid quantity thus dispensed,
   (B) a container supporting platform for receiving and supporting a container in a predetermined orientation for filling,
   (C) means for effecting relative vertical displacement of said platform and said liquid discharge nozzle to either insert said liquid discharge nozzle through the fill opening of a container positioned on said platform or to withdraw said liquid discharge nozzle from said container, and
   (D) control means for controlling operation of the apparatus in a predetermined sequence to perform a container filling operation and connected with
      (1) said liquid dispensing means for operating said valved discharge orifice and responding to the control signal formed by said liquid quantity measuring means and controlling operation of said liquid discharge nozzle in dispensing a predetermined quantity of liquid,
      (2) said means for effecting relative vertical displacement for controlling relative displacement thereof in either direction and maintain withdrawal of said liquid discharge nozzle from said container at a predetermined rate proportionally related to the rate of fill of a container by said liquid dispensing means, and
   (E) a cap chuck assembly including
      (1) a cap chuck releasably engageable with a cap for support thereof and application of a cap thus supported to the fill opening of a container, and
      (2) cap chuck supporting means secured to said cap chuck and selectively operable to displace said cap chuck between a position where said cap chuck is engaged with a cap applied to the fill opening of a container positioned on said container supporting platform and a position relatively remote thereto permitting relative vertical displacement of said platform and said liquid discharge nozzle, and
wherein said control means is connected with cap chuck assembly for controlling operation thereof.

2. Apparatus for filling of containers having a fill opening adapted to receive a closure cap and comprising
   (A) a container infeed station for receiving and supporting a container in a predetermined orientation for filling,
   (B) liquid dispensing means connected to a liquid supply and which includes
      (1) a liquid discharge nozzle insertable into a container to a predetermined depth through the fill opening thereof, said discharge nozzle being vertically disposed and having a selectively operable, valved discharged orifice at the lower end thereof, and
      (2) a flow responsive device connected in liquid flow relationship to said discharge nozzle and forming a control signal indicative of volumetric liquid-flow through said discharge nozzle,
   (C) container elevating means including
      (1) a container supporting platform for receiving and supporting a container in said predetermined orientation, and
      (2) a platform elevating mechanism coupled with said platform and selectively operable to vertically displace said platform between a container receiving and discharge position and a relatively elevated position where said liquid discharge nozzle is inserted into said container through the fill opening thereof,
   (D) container transfer means engageable with a container disposed at said infeed station and operable to effect transfer of said container from said infeed station onto said container supporting platform when said platform is at said receiving and discharge position,
   (E) a cap chuck assembly including
      (1) a cap chuck releasably engageable with a cap for support thereof and application of a cap thus supported to the fill opening of a container, and
      (2) cap chuck supporting means secured to said cap chuck and selectively operable to displace said cap chuck between a position where said cap chuck is engaged with a cap applied to the fill opening for a container positioned on said container supporting platform when said platform is at said container receiving and discharge position and a position relatively remote thereto permitting relative vertical displacement of said platform and a container supported thereon, and
   (F) control means for controlling operating of the apparatus in a predetermined sequence to perform a container filling operation and being connected with
      (1) said container transfer means for effecting transfer of a container and including means detecting a container at said infeed station to enable operation of said transfer means,
      (2) said liquid dispensing means for operating said valved discharged orifice and responding to the control signal formed by said flow responsive device for controlling operation of said liquid dispensing means in dispensing a predetermined volume of liquid,
      (3) said container elevating means for controlling displacement thereof in either direction and maintaining movement of said platform from said relatively elevated position at a predetermined rate proportionally related to the rate of fill of a container by said liquid dispensing means, and
      (4) said cap chuck assembly for controlling operation thereof.

3. Apparatus according to claim 2 wherein said flow responsive device is an oscillating-piston-type liquid flow-meter comprising
   (G) an oscillating piston disposed in the liquid flow path through the meter and caused to cyclically oscillate in accordance with liquid flow therethrough,
   (H) a rotatably journaled, magnetic-field-forming magnet structure mechanically coupled with said oscillating piston and revolved by cyclic movement of said piston, and
   (I) an electromechanical transducer coupled with said magnetic field and responding thereto in forming an electrical-pulse-form control signal for each revolution of said magnet structure.

4. Apparatus according to claim 3 wherein passage of said predetermined volume of liquid through said flowmeter actuates said oscillating piston for a predetermined number of cycles resulting in a proportionally related number of electrical pulses, said control means including pulse counter means for counting said electrical pulses and controlling operation of said liquid discharge nozzle in accordance with the number of pulses counted.

5. Apparatus according to claim 2 wherein said cap chuck is formed with a cavity adapted to receive and frictionally engage a cap disposed in vertically oriented relationship therein with said cavity formed with a horizontal surface overlying a portion of the periphery of a cap positioned in said cavity to restrict upward movement of a cap within said cavity, said cap chuck including horizontal surface means selectively positionable in said cavity in complementary relationship to said horizontal surface to overlie a portion of the periphery of a cap positioned therein and restrict upward movement of a cap within said cavity.

6. Apparatus according to claim 5 wherein said horizontal surface means comprises a flat plate carried by said cap chuck for sliding movement in a horizontal plane between said cap overlying position and a position not restricting upward movement of a cap within said cavity and displacing means carried by said cap chuck and connected with said flat plate for displacement thereof to either position, said displacing means connected with said control means for selective operation thereof.

7. Apparatus according to claim 5 wherein said horizontal surface means comprises a mechanical cam stop provided with a horizontal surface member with said stop pivotally supported by said cap chuck for swinging movement between said cap overlying position and a position not restricting movement of a cap within said cavity, said mechanical cam stop normally biased to the non-restricting position and having a lever arm projecting interiorly of said cavity for contactingly engaging a cap disposed within said cavity to swing said horizontal surface member into said cap-overlying position.

8. Apparatus according to claim 7 wherein said lever arm forms a counterweight normally biasing said horizontal surface member to the non-restricting position.

9. Apparatus according to claim 5 wherein said control means includes cap-detecting means responding to the presence of a cap in said cap chuck.

10. Apparatus according to claim 2 wherein said cap chuck supporting means includes
    (a) a horizontal carriage supported on the apparatus for movement horizontally of the apparatus
    (b) a vertical carriage mounted on said horizontal carriage and supporting said cap chuck for movement in a vertical plane between a position where said cap chuck is engaged with a cap applied to the fill opening of said container supported said platform and a realtively elevated position where said cap chuck may be displaced laterally relative to said container,
    (c) vertical displacing means connected with said horizontal carriage and said vertical carriage for selective displacement of said cap chuck to either of said vertically spaced positions, and
    (d) lateral displacing means connected with said horizontal carriage for selectively displacing said horizontal carriage between a position where said cap chuck is vertically aligned with the fill opening of the container for engagement of a cap applied to the fill opening and a laterally displaced position permitting operation of said container elevating means.

11. Apparatus according to claim 10 wherein said control means includes means responding to the position of said cap supporting means for effecting sequential movement of said cap supporting means in performing a container capping operation.

12. Apparatus according to claim 2 wherein said control means operates said valved discharge orifice to permit discharge of liquid therefrom after said discharge nozzle has been inserted into said container, actuates said platform elevating mechanism to effect withdrawal of said liquid discharge nozzle from said container after a quantity of liquid sufficient to cover said discharge orifice has been dispensed into said container and maintains the rate of withdrawal equal to the rate of fill of said container to thereby maintain said discharge orifice immersed in the dispensed liquid.

13. Apparatus according to claim 12 wherein said control means operates said valved discharge orifice to an open position permitting discharge of liquid after said discharge nozzle has been inserted into said container to said predetermined depth.

14. Apparatus according to claim 2 wherein said liquid discharge nozzle includes an elongated, vertical disposed, liquid conducting tube connected at the upper end to said liquid supply inlet and having said discharge orifice formed at the lower end thereof, valve element selectively movable between a closed position in closing relationship to said orifice and an open position permitting liquid flow through said orifice, and an actuating mechanism connected with said valve element for selective positioning in either said open or said closed position, said actuating mechanism connected with said control means for control of said actuating mechanism.

15. Apparatus according to claim 2 wherein said container supporting platform includes latch means selectively engageable with a container supported on said platform, said latch means adapted to engage said container about the fill opening thereof and thereby maintain said fill opening in stable relationship to said platform.

16. Apparatus according to claim 15 wherein said latch means comprises a latch plate supported for reciprocable sliding movement in a horizontal plane and being formed with an opening adapted to engage said container about the fill opening thereof, and latch actuation means connected to said latch plate and operable to effect horizontal reciprocable movement thereof between a latched and an unlatched position, said latch actuation means being connected with said control means for control of operation.

17. Apparatus according to claim 16 wherein said control means includes means responsive to the position of said latch plate to control sequential operation of the apparatus in accordance with the position of said latch plate.

18. Apparatus according to claim 2 including empty container feeding means receiving containers from a continuous supply and operated in sequential coordination with said container transfer means for feeding of a container to said infeed station after said transfer means has completed a transfer operation, said container feeding means connected with said control means for controlling cyclic operation of said feeding means.

19. Apparatus according to claim 18 wherein said container feeding means includes container-supporting means extending between said empty container supply and said infeed station for support of a container during a container feeding operation, and container displacing means engageable with a container received from said continuous supply and operable to displace said received container along said container-supporting means toward said infeed station.

20. Apparatus according to claim 19 wherein said control means includes container detecting means responding to the presence of a received container for enabling operation of said container feeding means.

21. Apparatus according to claim 19 wherein said infeed station includes a supporting bracket having a surface configuration adapted to engage and support a container thereon in said predetermined orientation, and the container-supporting means of said container feeding means comprises a container-supporting surface disposed to support a container in relatively elevated relationship to said supporting bracket whereby a container displaced from said container-supporting means onto said supporting bracket will be subjected to gravitational forces resulting in orientation of said container.

22. Apparatus according to claim 2 wherein said container supporting platform comprises an open-sided bracket having a surface configuration for supporting said container in said predetermined orientation and includes supporting plates selectively positionable at each open side of said bracket in supporting relationship to a respective vertical side wall of said container, each said plate carried by said platform for displacement from said supporting-relationship position to a non-supporting position permitting transfer of a container across said platform through the open side of said bracket.

23. Apparatus according to claim 21 wherein said plates are pivotally mounted on said platform for swinging movement in a vertical plane and said container supporting platform includes actuating means connected with said plates for effecting swinging movement of said plates to a selected one of said positions, said actuating means connected with said control means for control of operation.

24. Apparatus according to claim 23 wherein said control means includes plate-detecting means responding to the position of said plates for providing sequential control of operation.

25. Apparatus according to claim 2 wherein said cap chuck assembly includes cap feeding means which comprises a cap loading mechanism for receiving a cap and selectively operable to load said cap into said cap chuck when said cap supporting means is at said relatively remote position, and a cap conveyor receiving a supply of caps and sequentially conveying said caps to said cap loading mechanism.

26. Apparatus according to claim 25 wherein said cap loading mechanism includes a cap lift adapted to receive and support a cap thereon and supported on the apparatus for vertical reciprocating movement, and actuating means connected with said cap lift for selective displacement of said cap lift between a cap receiving position and a relatively elevated cap loading position, said actuating means connected with said control means for control of operation in sequential relationship with said cap chuck supporting means.

27. Apparatus according to claim 26 wherein said cap conveyor conveys said caps to said cap lift at a first elevation of said cap lift supports a received cap at a relatively higher elevation when said cap lift is at said cap receiving position whereby a cap on said cap lift will not be upwardly displaced by a succeeding cap forced into contact therewith.

28. Apparatus according to claim 26 wherein said cap lift is secured to a vertically reciprocable guide rod and is provided with alignment guide means engageable with co-operating means former with said cap chuck for alignment thereof when said cap life is elevated to said cap loading position, said guide rod slidably supported by guide bearing means permitting limited lateral movement of said guide rod and cap lift at said cap loading position.

29. Apparatus according to claim 2 including discharge means disposed to receive a container from said container supporting platform and operable to displace said received container for discharge of said container from the apparatus, said discharge means connected with said control means for operation thereof.

30. Apparatus according to claim 29 wherein said discharge means includes a container supporting plate disposed to receive a container from said platform and initially support said received container in said predetermined orientation, said plate being pivotally mounted on the apparatus for swinging movement from said initially supporting positon to a second postion where said received container is oriented for discharge and having means coupling said plate with said container supporting platform whereby swinging movement of said plate is controlled by the relative vertical position of said platform.

31. Apparatus according to claim 30 wherein said container supporting plate is provided with a lever arm having a cam follower, and said container supporting platform is provided with a cam surface engageable with said cam follower to maintain said container supporting plate in said initial postion when said platform is at said container receiving and discharge positon and disengageable from said cam follower when said platform is elevated thereby permitting swinging movement of said plate.

32. Apparatus according to claim 30 wherein said discharge means includes container displacing means engageable with a container received from said container supporting platform and operable to displace said received container, said displacing means including a horizontally reciprocable container-pushing plate.

33. Apparatus according to claim 32 wherein said control means includes detector means responding to said container-supporting plate when said plate is in said second position to control sequential operation of said container-displacing means by enabling operation only when said plate is in said second position.

34. Apparatus according to claim 29 wherein said discharge means includes a supporting surface disposed to receive a container from said container supporting platform in said predetermined orientation, a support and tilt bar disposed in a horizontal place above said surface at a relative elevation to engage said container at the upper part thereof and support said container in said predetermined orientation, said support and tilt bar being supported at an elevation to permit passage of a container in a discharge orientation beneath said bar, and container displacing means egageable with a received container in said predetermined orientation for placing said container in said discharge orientation by causing rotation of said container about said bar and for subsequently displacing said container for discharge from the apparatus.

35. Apparatus according to claim 2 wherein said liquid discharge nozzle comprises an elongated, vertically disposed, liquid conducting tube having said discharge orifice formed at the lower end thereof, and an elongated, tubular shield telescopically receiving said liquid conducting tube interiorly thereof in longitudinal alignment, said shield being axially displaceable relative to said tube from a normal position covering the lower portion of said tube to a position exposing a length of said tube for insertion in a container.

36. Apparatus according to claim 35 wherein said liquid discharge nozzle includes an elongated, tubular shroud disposed to telescopically receive said shield when said shield is displaced from said normal position, said shroud telescopically receiving an upper marginal end portion of said shield when said shield is in said normal position to prevent entrance of contaminants at the upper end thereof.

37. Apparatus according to claim 35 wherein said tubular shield is engageable at the lower end with said container supporting platform for effecting upward displacement thereof concurrently with upward movement of said platform.

38. Apparatus according to claim 2 wherein said valved discharge orifice, said platform elevating mechanism and said cap chuck assembly are actuated by independently operable fluid actuators connected with respective elements with said control means including a fluid control system connected with said fluid actuators for effecting operation thereof and an electrical control system connected with said fluid control system for controlling operation thereof.

39. Apparatus for filling fo containers according to claim 2 which includes
- second similar liquid dispensing means,
- second similar container elevating means, and
- a second similar cap chuck assembly, and wherein
- said container transfer means is selectively operable to alternating transfer a container from said infeed station onto the container supporting platform of either of said container elevating means and said control means is connected with and effective in independently controlling operation of said second liquid dispensing means, container elevating means and cap chuck assembly in a same predetermined sequence to perform a container filling operation.

References Cited
UNITED STATES PATENTS

| | | | |
|---|---|---|---|
| 3,405,500 | 10/1968 | Rupert | 53—283 X |
| 3,445,984 | 5/1969 | Kelly | 53—59 |

THERON E. CONDON, Primary Examiner

R. L. SPRUILL, Assistant Examiner

U.S. Cl. X.R.

53—59, 67, 268